United States Patent
Yu et al.

(10) Patent No.: US 12,231,234 B2
(45) Date of Patent: Feb. 18, 2025

(54) DATA TRANSMISSION METHOD AND DEVICE, CHIP SYSTEM, AND COMPUTER-READABLE STORAGE MEDIUM

(71) Applicant: HUAWEI TECHNOLOGIES CO., LTD., GuangDong (CN)

(72) Inventors: Jian Yu, Shenzhen (CN); Mengshi Hu, Shenzhen (CN); Ming Gan, Shenzhen (CN); Dandan Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 17/941,624

(22) Filed: Sep. 9, 2022

(65) Prior Publication Data

US 2023/0006771 A1 Jan. 5, 2023

Related U.S. Application Data

(63) Continuation of application No. PCT/CN2021/080460, filed on Mar. 12, 2021.

(30) Foreign Application Priority Data

Mar. 12, 2020 (CN) .......................... 202010172790.7

(51) Int. Cl.
*H04L 1/00* (2006.01)
*H04L 5/00* (2006.01)
(Continued)

(52) U.S. Cl.
CPC .......... *H04L 1/0069* (2013.01); *H04L 5/0044* (2013.01); *H04W 72/0453* (2013.01)

(58) Field of Classification Search
CPC ... H04L 1/0069; H04L 5/0044; H04L 5/0048; H04L 5/0094; H04L 27/2602;
(Continued)

(56) References Cited

U.S. PATENT DOCUMENTS 6,888,804 B1 * 5/2005 Moon .................. H04B 7/2637
370/335
11,843,973 B2 * 12/2023 Tsujimaru ........... H04L 27/2602
(Continued)

FOREIGN PATENT DOCUMENTS

CN 109561433 A 4/2019
CN 110212212 A 9/2019
(Continued)

OTHER PUBLICATIONS

Dongguk Lim, et al., (LG Electronics): "Consideration for EHT-SIG transmission," IEEE 802.11-20/00200, Jan. 13, 2020 (Jan. 13, 2020); 31 total pages.
(Continued)

*Primary Examiner* — Ahmed Elallam
(74) *Attorney, Agent, or Firm* — Rimon PC

(57) ABSTRACT

This application discloses a data transmission method and device, a chip system, and a computer-readable storage medium. In the method, a station may receive preamble puncturing indication information that includes one or more indicators. An indicator of the one or more indicators corresponds to preamble puncturing information of a data packet. The station sends or receives the data packet based on the preamble puncturing indication information. The preamble puncturing information includes a size and location of preamble puncturing, or that there is no preamble puncturing. The preamble puncturing information may be an index indicated by the preamble puncturing indication information, to learn of a status of preamble puncturing in the data packet.

20 Claims, 24 Drawing Sheets

(51) Int. Cl.
*H04W 72/04* (2023.01)
*H04W 72/0453* (2023.01)
*H04L 27/26* (2006.01)

(58) Field of Classification Search
CPC ... H04L 27/261; H04L 1/0025; H04L 5/0007; H04L 1/0068; H04L 5/0053; H04L 27/2613; H04W 72/0453; H04W 84/12
See application file for complete search history.

(56) References Cited

U.S. PATENT DOCUMENTS

| | | | |
|---|---|---|---|
| 11,871,269 B2* | 1/2024 | Hu | H04L 5/0092 |
| 12,063,112 B2* | 8/2024 | Park | H04L 1/0052 |
| 2006/0035654 A1* | 2/2006 | Lee | H04L 27/261 |
| | | | 455/509 |
| 2019/0141570 A1 | 5/2019 | Verma et al. | |
| 2019/0141717 A1 | 5/2019 | Yang et al. | |
| 2022/0116858 A1* | 4/2022 | Sugaya | H04W 48/08 |
| 2022/0353025 A1* | 11/2022 | Gan | H04L 5/0007 |

FOREIGN PATENT DOCUMENTS

| | | |
|---|---|---|
| CN | 110312312 A | 10/2019 |
| CN | 110690939 A | 1/2020 |
| TW | 201935894 A | 9/2019 |
| WO | 2019149243 A1 | 8/2019 |
| WO | 2020040622 A1 | 2/2020 |

OTHER PUBLICATIONS

Eunsung Park, et al., (LG Electronics): "Consideration on 240/160+ 80 MHz and Preamble Puncturing," IEEE 801.11-20/0022r1, Jan. 13, 2020 (Jan. 13, 2020); 31 total pages.

LG Electronics, Resource configuration for NPRACH range enhancement, 3GPP TSG RAN WG1 Meeting #92bis, R1-1804527, Sanya, China, Apr. 16-20, 2018, 4 pages.

IEEE P802.11ax/D6.0, Draft Standard for Information technology—Telecommunications and Information Exchange Between Systems Local and Metropolitan Area Networks—Specific Requirements, Part 11: Wireless LAN Medium Access Control (MAC) and Physical Layer (PHY) Specifications, Amendment Enhancements for High Efficiency WLAN, Nov. 2019, 780 pages.

Edward Au, IEEE P802.11 Wireless LANs, doc .: IEEE 802.11-19/ 1262r7, Jan. 2020, 20 pages.

Lin Yang et al., Large RU Aggregation for 240 and 320 MHZ, doc .: IEEE 802.11-20/0048r0, Jan. 2020, 18 pages.

R1-1611700, Guangdong OPPO Mobile Telecom, "eMBB data transmission to support dynamic resource sharing between eMBB and URLLC," 3GPP TSG RAN WG1 Meeting #87, Reno, USA, Nov. 14-18, 2016, 4 pages.

* cited by examiner

| Data (Data) (STA 1) | Data (Data) (STA 2) | ... | Data (Data) (STA N) |
|---|---|---|---|
| Extremely high throughput long training field (EHT-LTF) | Extremely high throughput long training field (EHT-LTF) | | Extremely high throughput long training field (EHT-LTF) |
| Extremely high throughput short training field (EHT-STF) | Extremely high throughput short training field (EHT-STF) | | Extremely high throughput short training field (EHT-STF) |
| Universal signal field (U-SIG) ||||
| Repeated legacy signal field (RL-SIG) ||||
| Legacy signal field (L-SIG) ||||
| Legacy long training field (L-LTF) ||||
| Legacy short training field (L-STF) ||||

Trigger frame (Trigger frame)

FIG. 3

OFDMA: orthogonal frequency division multiple access
11be TB PPDU: 11be trigger-based physical layer protocol data unit

DATA TRANSMISSION METHOD AND DEVICE, CHIP SYSTEM, AND COMPUTER-READABLE STORAGE MEDIUM

CROSS-REFERENCE TO RELATED APPLICATIONS

This application is a continuation of International Application No. PCT/CN2021/080460, filed on Mar. 12, 2021, which claims priority to Chinese Patent Application No. 202010172790.7, filed on Mar. 12, 2020. The disclosures of the aforementioned applications are hereby incorporated by reference in their entireties.

TECHNICAL FIELD

This application generally relates to the field of communication technologies, and in particular, to a data transmission method and device, a chip system, and a computer-readable storage medium.

BACKGROUND

With the development of a wireless local area network (WLAN), an orthogonal frequency division multiple access (OFDMA) technology has recently been utilized and allows for an entire bandwidth to be divided into a plurality of resource units (RU). In other words, a band resource of a user is allocated by the RU instead of a channel. For example, a 20 MHz channel may include a plurality of RUs, which may be, for example, a 26-tone RU, a 52-tone RU, and a 106-tone RU. The tone indicates a quantity of subcarriers. In addition, the RU may also be a 242-tone RU, a 484-tone RU, a 996-tone RU, or the like.

Preamble puncture may also be referred to as preamble puncturing. For example, if a part of 20 MHz channels in an entire bandwidth is null, it may be understood as that there is a 20 MHz puncture hole in the entire bandwidth. For OFDMA transmission, discrete resources caused by puncturing may be allocated to different stations. For non-OFDMA transmission such as an orthogonal frequency division multiplexing (OFDM)transmission, if preamble puncturing is used, remaining resources that are not punctured also form a plurality of RUs, which are aggregated as a whole and are allocated to a station (STA) or a group of stations.

However, how to indicate which of the plurality of RUs for data transmission becomes an urgent problem to be resolved.

SUMMARY

Embodiments of this application provide a data transmission method, a data transmission device, a chip system, and a computer-readable storage medium, to transmit a data packet based on preamble puncturing information.

According to a first aspect, this application discloses a data transmission method. In the method, a station may receive preamble puncturing indication information, and send or receive a data packet based on the preamble puncturing indication information. The preamble puncturing indication information includes one or more indicators, an indicator of the one or more indicators corresponds to a piece of preamble puncturing information, and the preamble puncturing information includes a size and a location of the preamble puncturing, or that there is no preamble puncturing. The indicator may be an index corresponding to the preamble puncturing indication information and learns a status of preamble puncturing of the data packet.

It can be learned that in this application, the station obtains the status of the preamble puncturing of the data packet based on the preamble puncturing indication information and learns of an allocated multiple resource unit (RU). Compared with a current manner of directly indicating multiple RUs, the manner of indicating the status of preamble puncturing in this application can reduce signaling overheads.

In embodiments, sending or receiving the data packet based on the preamble puncturing indication information includes: if the preamble puncturing indication information indicates that there is no preamble puncturing, sending or receiving the data packet in a bandwidth of the data packet; or if the preamble puncturing indication information indicates a size and location of preamble puncturing, sending or receiving the data packet on a RU in bandwidth of the data packet other than the size and the location of preamble puncturing. It can be learned that when there is preamble puncturing in the data packet, the manner of indicating the size and location of preamble puncturing can reduce indication signaling overheads compared with a manner of directly indicating discrete RUs obtained through preamble puncturing.

For the preamble puncturing indication information, this application further provides several optional indication manners to indicate the preamble puncturing information. Descriptions are separately provided below.

In embodiments, the preamble puncturing indication information includes one or more indicators, where one indicator corresponds to one piece of preamble puncturing information, or where one indicator corresponds to an index of a status of the preamble puncturing.

In embodiments, the indicator indicates one or more pieces of the following preamble puncturing information in a 160 MHz channel: a 20 MHz subchannel in the 160 MHz channel; a 40 MHz subchannel formed by any two 20 MHz subchannels in the 160 MHz channel; a 60 MHz subchannel formed by any three 20 MHz subchannels in the 160 MHz channel; an 80 MHz subchannel formed by any four 20 MHz subchannels in the 160 MHz channel; or there is no preamble puncturing in the 160 MHz channel.

In embodiments, the indicator indicates one or more pieces of the following preamble puncturing information in the 160 MHz channel: a 20 MHz subchannel in the 160 MHz channel; a 40 MHz subchannel formed by any two adjacent 20 MHz subchannels in the 160 MHz channel; a 60 MHz subchannel formed by any three adjacent 20 MHz subchannels in the 160 MHz channel; an 80 MHz subchannel formed by any four adjacent 20 MHz subchannels in the 160 MHz channel; or there is no preamble puncturing in the 160 MHz channel.

In embodiments, the 160 MHz channel includes a highest frequency 80 MHz subchannel and a lowest frequency 80 MHz subchannel, and the indicator indicates one or more pieces of the following preamble puncturing information in the 160 MHz channel: a 20 MHz subchannel in the 160 MHz channel; a 40 MHz subchannel formed by two lowest frequency 20 MHz subchannels in the lowest frequency 80 MHz subchannel; a 40 MHz subchannel formed by two highest frequency 20 MHz subchannels in the lowest frequency 80 MHz subchannel; a 40 MHz subchannel formed by two lowest frequency 20 MHz subchannels in the highest frequency 80 MHz subchannel; a 40 MHz subchannel formed by two highest frequency 20 MHz subchannels in the highest frequency 80 MHz subchannel; a lowest frequency 80 MHz subchannel; a highest frequency 80 MHz subchannel; or there is no preamble puncturing in the 160 MHz channel. In this implementation, the size and location of the preamble puncturing may correspond to a RU obtained through channel division, so that the allocated RU is determined based on the preamble puncturing indication information.

The 160 MHz channel includes the highest frequency 80 MHz subchannel and the lowest frequency 80 MHz subchannel. Optionally, the indicator may further indicate that the following preamble puncturing information or another index is reserved: a first middle frequency 40 MHz subchannel in the highest frequency 80 MHz subchannel, or a second middle frequency 40 MHz subchannel in the lowest frequency 80 MHz subchannel. It can be learned that these embodiments support a case in which a same index corresponds to different meanings, so that different index tables may be used based on different cases. For example, the different index tables may be used for different locations of bandwidths or indicators in the preamble puncturing indication information. This reduces a quantity of required indexes and reduces a quantity of bits for indication.

Optionally, the indicator indicates indexes, respectively, corresponding to the one or more pieces of preamble puncturing information in the 160 MHz channel. This helps the station determine the status of preamble puncturing of the data packet based on the preamble puncturing indication information.

The bandwidth of the data packet is 320 MHz. The one or more indicators include a first indicator and a second indicator. The first indicator indicates a first piece of preamble puncturing information in a lowest frequency 160 MHz subchannel in the 320 MHz bandwidth; and the second indicator indicates a second piece of preamble puncturing information in a highest frequency 160 MHz subchannel in the 320 MHz bandwidth.

The bandwidth of the data packet is 160 MHz. The preamble puncturing indication information includes a first indicator. The first indicator indicates preamble puncturing information in the 160 MHz bandwidth.

Optionally, the indicator in the preamble puncturing indication information indicates one or more pieces of the following preamble puncturing information in an 80 MHz channel: a 20 MHz subchannel in the 80 MHz channel; a 40 MHz subchannel formed by any two 20 MHz subchannels in the 80 MHz channel; a 60 MHz subchannel formed by any three 20 MHz subchannels in the 80 MHz channel; or there is no preamble puncturing in the 80 MHz channel.

Optionally, the indicator in the preamble puncturing indication information indicates one or more pieces of the following preamble puncturing information in an 80 MHz channel: a 20 MHz subchannel in the 80 MHz channel; a 40 MHz subchannel formed by any two adjacent 20 MHz subchannels in the 80 MHz channel; a 60 MHz subchannel formed by any three adjacent 20 MHz subchannels in the 80 MHz channel; or there is no preamble puncturing in the 80 MHz channel.

Optionally, the indicator in the preamble puncturing indication information indicates one or more pieces of the following preamble puncturing information in an 80 MHz channel: a 20 MHz subchannel in the 80 MHz channel; a lowest frequency 40 MHz subchannel in the 80 MHz channel; a middle frequency 40 MHz subchannel in the 80 MHz channel; a highest frequency 40 MHz subchannel in the 80 MHz channel; the 80 MHz channel; or there is no preamble puncturing in the 80 MHz channel.

In other words, the indicator in the preamble puncturing indication information indicates indexes, respectively, corresponding to the one or more pieces of preamble puncturing information in the 80 MHz channel.

Optionally, the bandwidth of the data packet is 240 MHz. The one or more indicators include a first indicator and a second indicator. The first indicator indicates a first piece of preamble puncturing information in a lowest frequency 160 MHz subchannel in the 240 MHz bandwidth; and the second indicator indicates a second piece preamble puncturing information in a highest frequency 80 MHz subchannel in the 240 MHz bandwidth.

Optionally, the bandwidth of the data packet is 240 MHz. The one or more indicators include a first indicator and a second indicator. The first indicator indicates a first piece of preamble puncturing information in a lowest frequency 80 MHz subchannel in the 240 MHz bandwidth; and the second indicator indicates a second piece preamble puncturing information in a highest frequency 160 MHz subchannel in the 240 MHz bandwidth.

Optionally, the bandwidth of the data packet is 240 MHz. Based on the preamble puncturing information in the 80 MHz channel, the one or more indicators include a first indicator, a second indicator, and a third indicator. The first indicator indicates a first piece of preamble puncturing information in a lowest frequency 80 MHz subchannel in the 240 MHz bandwidth. The second indicator indicates a second piece of preamble puncturing information in a middle frequency 80 MHz subchannel in the 240 MHz bandwidth. The third indicator indicates a third piece of preamble puncturing information in a highest frequency 80 MHz subchannel in the 240 MHz bandwidth. It can be learned that the indicator included in the preamble puncturing indication information is related to the bandwidth of the data packet and a frequency range of the preamble puncturing information that can be indicated by the indicator.

Optionally, the bandwidth of the data packet is 320 MHz. Based on the preamble puncturing information in the 80 MHz channel, the one or more indicators include a first indicator, a second indicator, a third indicator, and a fourth indicator. One indicator may correspond to one piece of preamble puncturing information in an 80 MHz subchannel. For example, the 320 MHz bandwidth includes a lowest frequency 160 MHz subchannel and a highest frequency 160 MHz subchannel. The first indicator indicates a first piece of preamble puncturing information in a lowest frequency 80 MHz subchannel in the lowest frequency 160 MHz subchannel. The second indicator indicates a second piece of preamble puncturing information in a highest frequency 80 MHz subchannel in the lowest frequency 160 MHz subchannel. The third indicator indicates a third piece of preamble puncturing information in a lowest frequency 80 MHz subchannel in the highest frequency 160 MHz subchannel. The fourth indicator indicates a fourth piece of preamble puncturing information in a highest frequency 80 MHz subchannel in the highest frequency 160 MHz subchannel. It can be learned that a quantity of the indicators included in the preamble puncturing indication information may be related to the bandwidth of the data packet and a frequency range of the preamble puncturing information that can be indicated by the indicator. For example, if one of the indicators indicates preamble puncturing indication information in a 160 MHz subchannel, and a bandwidth of a data packet is 320 MHz, the preamble puncturing indication information may include a maximum of two such indicators.

Optionally, the bandwidth of the data packet is 160 MHz. The one or more indicators includes a first indicator and a second indicator. The first indicator indicates a first piece of preamble puncturing information in a lowest frequency 80 MHz subchannel in the 160 MHz bandwidth; and the second indicator indicates a second piece of preamble puncturing information in a highest frequency 80 MHz subchannel in the 160 MHz bandwidth.

Optionally, the bandwidth of the data packet is 160 MHz. The one or more indicators include a first indicator and a second indicator. The first indicator indicates a first piece of preamble puncturing information of a first hole in the 160 MHz bandwidth; and the second indicator indicates a second piece of preamble puncturing information of a second hole in the 160 MHz bandwidth. It can be learned that this application supports a case in which a data packet has one or two holes.

In embodiments, an indicator may indicate each index for each optional status of preamble puncturing in a bandwidth. In other words, each optional status of preamble puncturing in the bandwidth is in an index table of the preamble puncturing indication information. This helps reduce complexity of parsing out the preamble puncturing information by the station based on the index table.

In embodiments, the one or more indicators information include a first indicator and a second indicator. The first indicator indicates a size of preamble puncturing, and the second indicator indicates a location of preamble puncturing.

Optionally, the size of preamble puncturing indicated by the first indicator includes one or more of the following: 20 MHz, 40 MHz, 60 MHz, or 80 MHz.

Optionally, the size of preamble puncturing indicated by the first indicator is 20 MHz, and the location of preamble puncturing includes one or more of the following: a 20 MHz subchannel in the bandwidth of the data packet.

The size of preamble puncturing indicated by the first indicator is 40 MHz, and the location of preamble puncturing includes one or more of the following: a 40 MHz subchannel formed by any two 20 MHz subchannels in the bandwidth of the data packet.

The size of preamble puncturing indicated by the first indicator is 60 MHz, and the location of preamble puncturing includes one or more of the following: a 60 MHz subchannel formed by any three 20 MHz subchannels in the bandwidth of the data packet.

The size of preamble puncturing indicated by the first indicator is 80 MHz, and the location of preamble puncturing includes one or more of the following: an 80 MHz subchannel formed by any four 20 MHz subchannels in the bandwidth of the data packet.

Optionally, the size of preamble puncturing indicated by the first indicator is 20 MHz, and the location of preamble puncturing includes one or more of the following: a 20 MHz subchannel in the bandwidth of the data packet.

The size of preamble puncturing indicated by the first indicator is 40 MHz, and the location of preamble puncturing includes one or more of the following: a 40 MHz subchannel formed by any two adjacent 20 MHz subchannels in the bandwidth of the data packet.

The size of preamble puncturing indicated by the first indicator is 60 MHz, and the location of preamble puncturing includes one or more of the following: a 60 MHz subchannel formed by any three adjacent 20 MHz subchannels in the bandwidth of the data packet.

The size of preamble puncturing indicated by the first indicator is 80 MHz, and the location of preamble puncturing includes one or more of the following: an 80 MHz subchannel formed by any four adjacent 20 MHz subchannels in the bandwidth of the data packet.

It can be learned that different sizes of preamble puncturing correspond to different options of locations of preamble puncturing. Therefore, after determining the size of preamble puncturing based on the first indicator, the station may determine the location of preamble puncturing based on the index table of the location corresponding to the hole.

Optionally, the first indicator or the second indicator further indicates that there is no preamble puncturing.

The mode of performing data transmission based on the preamble puncturing indication information described in this application may be applicable to non-orthogonal frequency division multiple access (OFDMA) transmission, and a mode of performing data transmission based on a RU allocation subfield may be applicable to OFDMA transmission.

In other words, the station performs the step of sending or receiving the data packet based on the preamble puncturing indication information when the data packet is transmitted in a non-OFDMA mode. The station sends or receives the data packet based on the RU allocation subfield when the data packet is transmitted in an OFDMA mode.

Optionally, the index table of the preamble puncturing indication information and an index table of the RU allocation subfield may be aggregated into one index table, and the preamble puncturing indication information may reuse the RU allocation subfield. This helps the station determine a transmission mode of the data packet and the status of preamble puncturing based on an index indicated by the preamble puncturing indication information.

Optionally, the station may receive transmission mode indication information. The transmission mode indication information indicates the transmission mode of the data packet. The transmission mode indication information may be in a common signaling field, or in a common field in a trigger frame.

For a case in which data transmission is performed based on the RU allocation subfield, in an optional implementation, the RU allocation subfield includes a RU indicator and a RU aggregation indicator.

Optionally, when a first RU indicated by the RU indicator is a 2×996-tone RU, the RU aggregation indicator indicates one or more of the following RU aggregations: no RU is aggregated with the first RU; a second RU is aggregated with the first RU, where the second RU is a 484-tone RU adjacent to or not adjacent to the first RU; a third RU is aggregated with the first RU, where the third RU is a 996-tone RU adjacent to a low frequency of the first RU, or a 996-tone RU adjacent to a high frequency of the first RU; or a second RU and a third RU are aggregated with the first RU.

Optionally, when a first RU indicated by the RU indicator is a 996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU;

According to a second aspect, this application further provides a data transmission device. The data transmission device has a part of or all functions of implementing the station in the method example in the first aspect. For example, the data transmission device may have a function in a part of or all embodiments of this application, or may have a function of independently implementing any embodiment of this application. The function may be implemented by hardware, or may be implemented by hardware executing corresponding software. The hardware or the software includes one or more units or modules corresponding to the function.

In a possible design, a structure of the data transmission device may include a processing unit (e.g., processing circuit) and a communication unit (e.g., communication circuit). The processing unit is configured to support the data transmission device in performing a corresponding function in the foregoing method. The communication unit is configured to support communication between the data transmission device and another device. The data transmission device may further include a storage unit (e.g., storage circuit). The storage unit is configured to be coupled to the processing unit and a communication unit, and the storage unit stores program instructions and data that are needed by the data transmission device.

In embodiments, the data transmission device includes: the communication unit, configured to receive preamble puncturing indication information, where the preamble puncturing indication information includes one or more indicators, an indicator of the one or more indicators corresponds to a piece of preamble puncturing information, and the preamble puncturing information includes a size and location of preamble puncturing, or that there is no preamble puncturing.

The communication unit is further configured to send or receive a data packet based on the preamble puncturing indication information.

Optionally, the data transmission device further includes the processing unit. The processing unit is configured to determine a plurality of allocated RUs based on the preamble puncturing indication information.

For example, the processing unit may be a processor, the communication unit may be a transceiver or a communication interface, and the storage unit may be a memory.

In embodiments, the data transmission device includes: a transceiver, configured to receive preamble puncturing indication information, where the preamble puncturing indication information includes one or more indicators, an indicator of the one or more indicators corresponds to a piece of preamble puncturing information, and the preamble puncturing information includes a size and location of preamble puncturing, or that there is no preamble puncturing.

The transceiver is further configured to send or receive a data packet based on the preamble puncturing indication information.

Optionally, the data transmission device further includes a processor. The processor is configured to determine a plurality of allocated RUs based on the preamble puncturing indication information.

In embodiments of the process, the processor may be configured to perform, for example, but is not limited to, baseband-related processing, and the transceiver may be configured to perform, for example, but is not limited to, radio frequency sending and receiving. The foregoing components may be separately disposed on chips or circuits that are independent of each other, or at least a part or all of the components may be disposed on a same chip. For example, the processor may further be divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor may be integrated on a same chip with a plurality of application processors (for example, but is not limited to a graphics processor and a multimedia processor). The chip may be referred to as a system on chip. Whether all the components are separately disposed on different chips or integrated and disposed on one or more chips usually depends on a requirement of a product design. A form of the foregoing components is not limited to these embodiment of the present disclosure.

According to a third aspect, this application further provides a processor, configured to perform the methods in the first aspect. In a process of performing these methods, a process of sending the information and a process of receiving the information in the methods may be understood as a process of outputting the information by the processor and a process of receiving the input information by the processor. In other words, when outputting the information, the processor outputs the information to a transceiver, so that the transceiver transmits the information. Still further, after the information is output by the processor, other processing may further need to be performed before the information arrives at the transceiver. Similarly, when the processor receives the input information, the transceiver receives the information and inputs the information into the processor. Still further, after the transceiver receives the information, other processing may need to be performed on the information before the information is input into the processor.

Based on the foregoing principle, for example, receiving the preamble puncturing indication information mentioned in the foregoing method may be understood as inputting the preamble puncturing indication information by the processor. For another example, sending the data packet may be understood as outputting the data packet by the processor.

In this embodiment, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In embodiments, the processor may be a processor configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in embodiments of the present disclosure.

According to a fourth aspect, an embodiment of the present disclosure provides a computer-readable storage medium, configured to store computer software instructions used by the foregoing data transmission device. The computer-readable storage medium includes a program used to perform the first aspect of the foregoing method.

According to a fifth aspect, this application further provides a computer program product including instructions. When the computer program product runs on a computer, the computer is enabled to perform the method in the first aspect.

According to a sixth aspect, this application provides a chip system. The chip system includes a processor and an interface, and is configured to support a data transmission device in implementing functions in the first aspect, for example, at least one of determining or processing data and information related in the method. In a possible design, the chip system further includes a memory, and the memory is configured to store program instructions and data that are needed by a station. The chip system may include a chip, or may include a chip and another discrete component.

BRIEF DESCRIPTION OF DRAWINGS

FIG. 3 is another schematic flowchart of sending a data packet based on a trigger frame according to an embodiment of this application;

DESCRIPTION OF EMBODIMENTS

The following further describes embodiments of this application in detail with reference to accompanying drawings.

Figure 1:
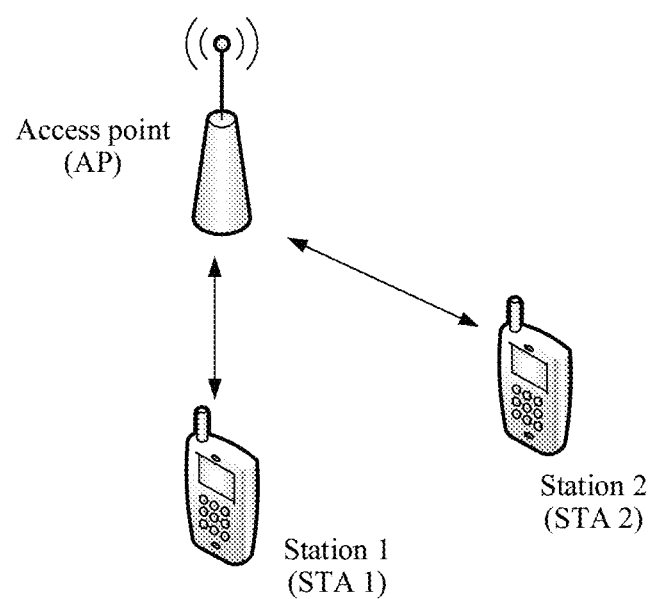
FIG. 1 is a schematic diagram depicting a network structure according to an embodiment of this application.

FIG. 1 is used as an example to describe a network structure to which a data transmission method in this application is applicable. FIG. 1 is a schematic diagram depicting a network structure according to an embodiment of this application. The network structure may include one or more access point (AP) stations and one or more non-access point stations (non-AP STA). For ease of description, the AP station may be referred to as an access point or an AP. For ease of description, a non-access point station may be referred to as a station (STA) in this specification. FIG. 1 is described by using an example in which the network structure includes an AP and two stations (e.g., a STA 1 and a STA 2).

The AP may be an AP used by a terminal device (e.g., such as a mobile phone) to access a wired (or wireless) network, and may be mainly deployed at home, in a building, or in a park. A typical coverage radius may be tens of meters to hundreds of meters. The AP may also alternatively be deployed outdoors. The AP may be equivalent to a bridge connecting a wired network and a wireless network. A main function of the AP is to connect wireless network clients, and then connect the wireless network to an Ethernet (e.g., such as a local area network (LAN)). In other words, the AP may be a terminal device (such as a mobile phone) or a network device (such as a router) with a wireless fidelity (Wi-Fi) chip. The AP may be a device that supports the 802.11be standard. Alternatively, the AP may be a device that supports a plurality of wireless local area network (WLAN) standards of the 802.11 family such as 802.11be, 802.11ax, 802.11ac, 802.11n, 802.11g, 802.11b, and 802.11a. The AP in this application may be a high efficiency (e.g., high efficient, HE) AP or an extremely high throughput (EHT) AP, or may be an AP applicable to a future Wi-Fi standard.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station may support the 802.11be standard. The station may also support a plurality of WLAN standards of the 802.11 family such as 802.11be, 802.11ax, 802.11ac, 802.11n, 802.11g, 802.11b, and 802.11a.

The AP in this application may be a HE STA or an EHT STA, or may be a STA applicable to a future Wi-Fi standard.

For example, the AP and the STA may be devices used in the Internet of Vehicles (IoT), IoT nodes or sensors in the IoT, smart cameras, smart remote controls, and smart water meters in smart home, and sensors in smart city.

Although embodiments of this application are mainly described by using a network deployed based on IEEE 802.11 as an example, a person skilled in the art easily understands that various aspects of this application may be extended to other networks using various standards or protocols such as Bluetooth, high performance radio LAN (HIPERLAN, a wireless standard that is similar to the IEEE 802.11 standard and that is mainly used in Europe), wide area network (WAN), WLAN, personal area network (PAN), or other networks currently known or later developed. Therefore, the various aspects provided in this application are applicable to any suitable wireless network regardless of coverage and a wireless access protocol (WAP).

The following describes embodiments of this application, and embodiments of this application do not limit the protection scope and applicability of the claims. A person skilled in the art may adaptively change functions and deployments of elements in this application, or omit, replace, or add various processes or components as appropriate without departing from the scope of embodiments of this application.

For ease of understanding related content in embodiments of this application, the following describes some concepts related to embodiments of this application.

1. Data Packet

The data transmission method in this application may be applicable to uplink transmission, or may be applicable to downlink transmission. In addition, the data transmission method is further applicable to point-to-point single-user transmission, downlink multi-user transmission, or uplink multi-user transmission. For uplink multi-user transmission, an uplink transmission method based on a trigger frame is used in the data transmission method. The following separately describes a trigger-based data packet and a non-trigger-based data packet.

1.1 Trigger-Based Data Packet

Figure 2:
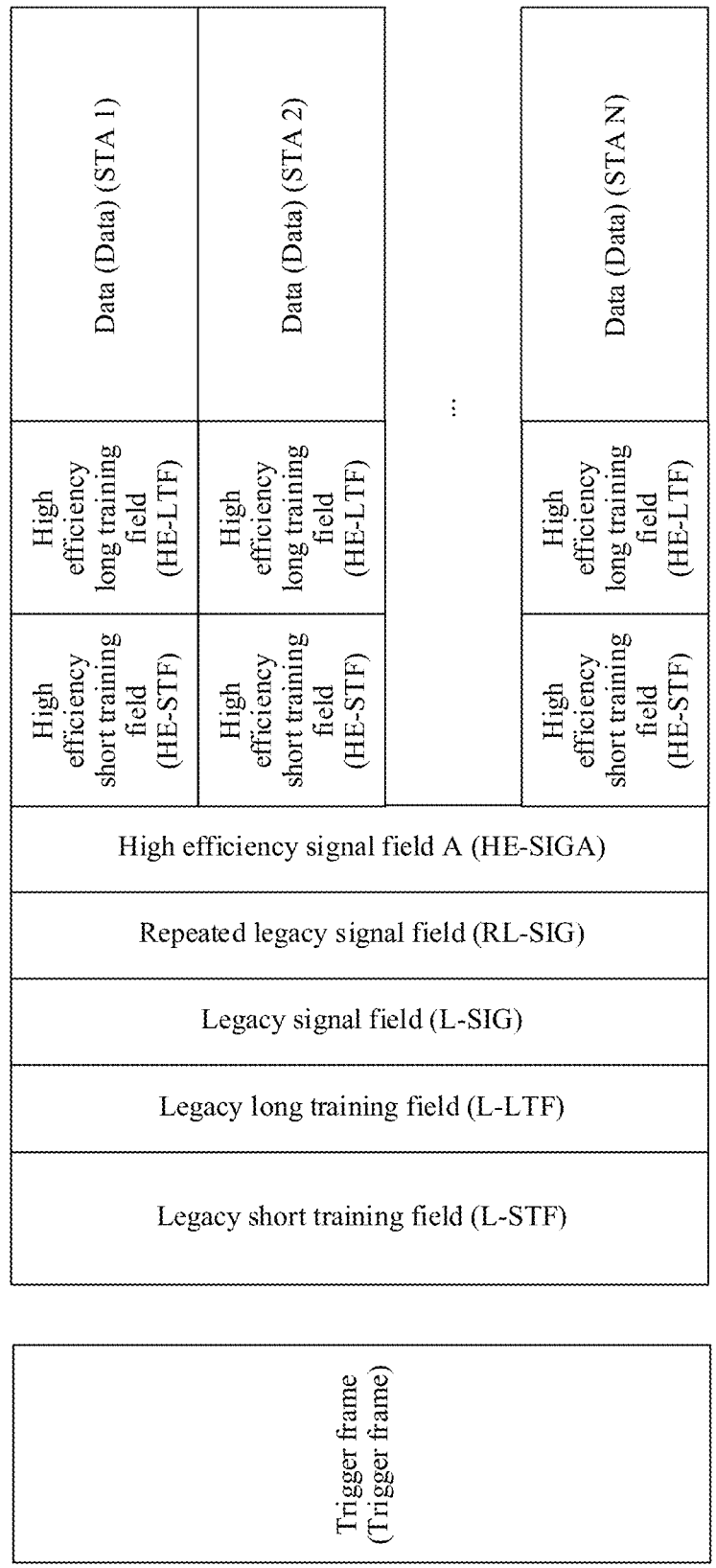
FIG. 2 is a schematic flowchart of sending a data packet based on a trigger frame according to an embodiment of this application.

The data packet may be a high efficiency trigger-based physical layer protocol data unit (HE TB PPDU). A procedure of sending an HE TB PPDU based on a trigger frame is shown in FIG. 2. After receiving a trigger frame, a station may send an HE TB PPDU based on the trigger frame. As shown in FIG. 2, after receiving the trigger frame, the station may parse out, from the trigger frame, a plurality of user fields that match an association identifier of the station, to send the HE TB PPDU on a plurality of resource units (RU) indicated by RU allocation subfields in the plurality of user fields. As shown in FIG. 2, from a HE-STF to Data, an entire bandwidth is divided into one or more RUs.

A function of each field in the HE TB PPDU structure shown in FIG. 2 is shown in Table 1.

TABLE 1

| Item | Description |
| --- | --- |
| Legacy short training field (Legacy Short Training Field, L-STF) | Performs PPDU discovery, coarse synchronization, and automatic gain control |
| Legacy long training field (Legacy Long Training Field, L-LTF) | Performs fine synchronization and channel estimation |
| Legacy signal field (Legacy Signal Field A, L-SIG) | Carries signaling information related to a PPDU length, to ensure coexistence |
| High efficiency signal field A (High Efficient Signal Field A, HE-SIGA) | Carries signaling used to demodulate subsequent data |
| High efficiency short training field (High Efficient Short Training Field, HE-STF) | Performs automatic gain control of a subsequent field |
| High efficiency long training field (High Efficient Long Training Field, HE-LTF) | Estimates a channel |
| Data (Data) | Carries data information |

The data packet may be an extremely high throughput trigger-based physical layer protocol data unit (EHT TB PPDU), a trigger-based physical layer protocol data unit in a future generation of Wi-Fi standards, or the like.

A procedure of sending an EHT TB PPDU based on a trigger frame is shown in FIG. 3. After receiving a trigger frame, a station may send an EHT TB PPDU based on the trigger frame. As shown in FIG. 3, after receiving the trigger frame, the station may parse out, from the trigger frame, a plurality of user fields that match an association identifier of the station, to send the EHT TB PPDU on a plurality of RUs indicated by RU allocation subfields in the plurality of user fields. As shown in FIG. 3, from an extremely high throughput short training field (EHT-STF) to Data, an entire bandwidth is divided into one or more RUs. A function of each field in the EHT TB PPDU in FIG. 3 is shown in Table 2.

TABLE 2

| Item | Description |
| --- | --- |
| Legacy short training field (Legacy Short Training Field, L-STF) | Performs PPDU discovery, coarse synchronization, and automatic gain control |
| Legacy long training field (Legacy Long | Performs fine synchronization and channel |

TABLE 2-continued

| Item | Description |
| --- | --- |
| Training Field, L-LTF) | estimation |
| Legacy signal field (Legacy Signal Field A, L-SIG) | Carries signaling information related to a PPDU length, to ensure coexistence |
| Universal signal field (Universal Signal Field, U-SIG) | Carries signaling used to demodulate subsequent data |
| Extremely high throughput short training field (Extremely High Throughput Short Training Field, EHT-STF) | Performs automatic gain control of a subsequent field |
| Extremely high throughput long training field (Extremely High Throughput Long Training Field, EHT-LTF) | Estimates a channel |
| Data (Data) | Carries data information |

Figure 4:
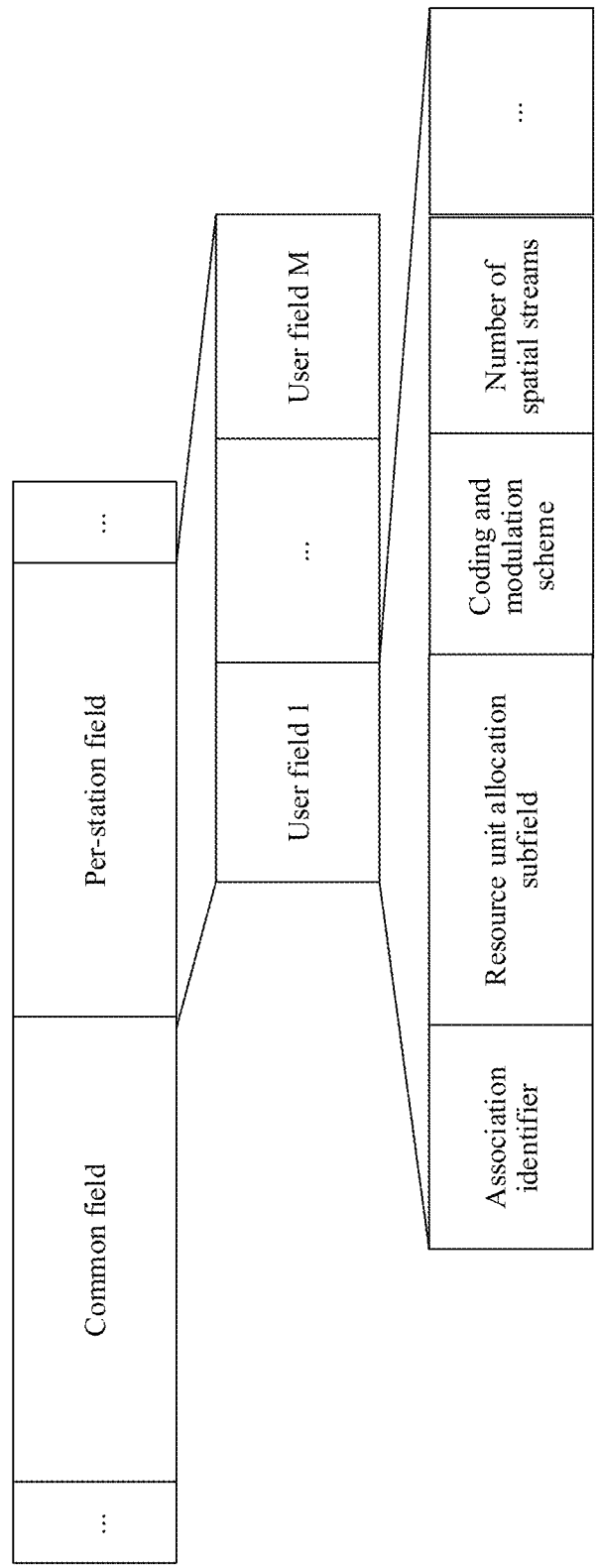
FIG. 4 is a schematic diagram of a structure of a trigger frame according to an embodiment of this application.

A frame format of the trigger frame is shown in FIG. 4. The trigger frame may include only a part of fields shown in FIG. 4, or the trigger frame may include more fields than the fields shown in FIG. 4. This is not limited to these embodiments of this application.

For example, the trigger frame includes a common information (e.g., common info) field and a user information list (e.g., user info list) field. The trigger frame may further include a frame control field, a duration field, a receive address (RA) field, a transmit address (TA) field, a padding field, a frame check sequence (FCS) field, and the like. The common information field may also be referred to as a common domain, a common information domain, or a common field. The common field includes common information that may need to be read by all stations. For example, a trigger type subfield, a length subfield, a cascade indication subfield, a carrier sensing required (e.g., CS Required) subfield, a bandwidth subfield, a guard interval and long training field (GI+LTF) subfield, and a trigger dependent common information (e.g., trigger dependent common info) subfield. The user information list field may also be referred to as a user information list domain, a per-station domain, a peer-station field, or the like. The user information list field includes one or more user information (e.g., user info) fields (which may also be referred to as user fields). Each user field includes information that needs to be read by each station, for example, an association identifier (AID) subfield, a RU allocation subfield, a coding type subfield, a modulation and coding scheme (MCS) subfield, a reserved subfield, and trigger dependent user information (e.g., trigger dependent user info) subfield.

The association identifier field indicates an association identifier of a station corresponding to the user information field. The RU allocation subfield indicates a RU (or a RU location) that is indicated by the user field and that is allocated to the station. The "field" described in this specification may also be referred to as a "domain", "information", or the like, and the "subfield" may be referred to as a "subdomain", "information", or the like.

1.2 High Efficiency Multi-User Physical Layer Protocol Data Unit (HE MU PPDU)

Figure 5:
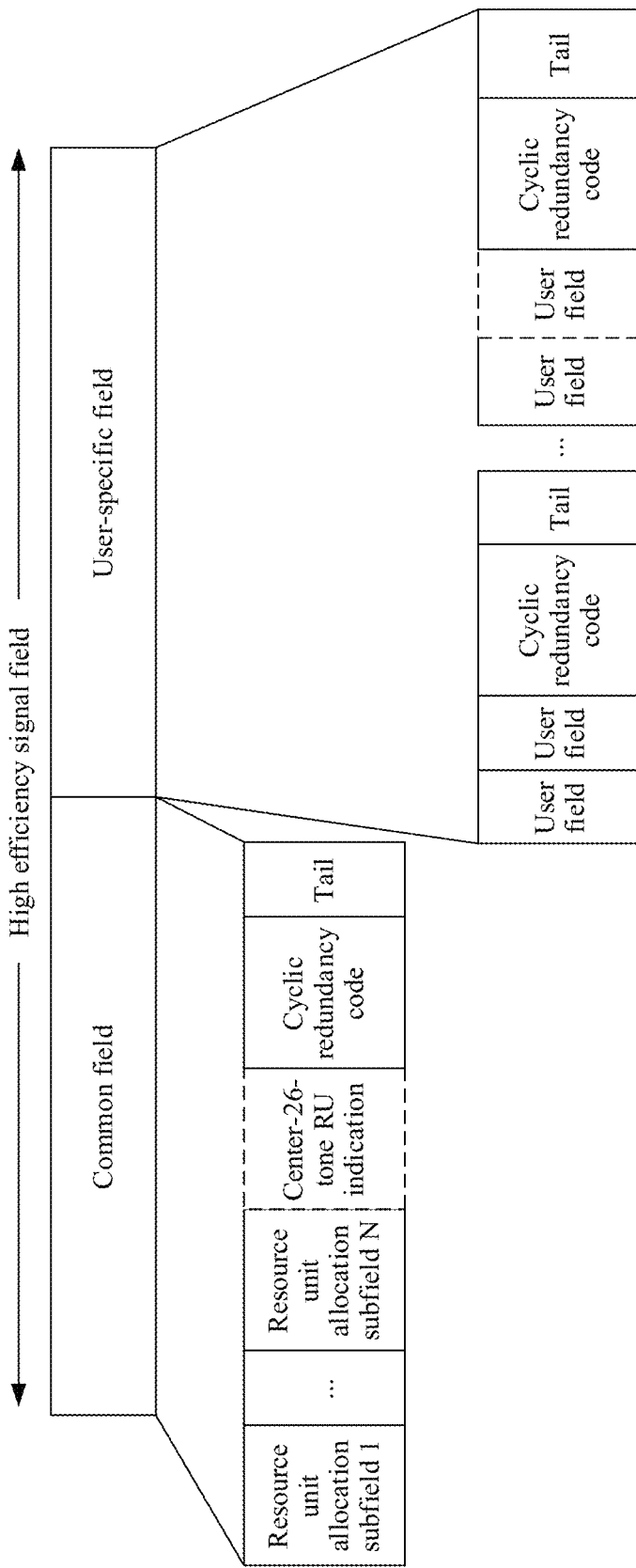
FIG. 5 is a schematic diagram depicting a structure of a high efficiency signal field according to an embodiment of this application.

The RU allocation manner of the HE TB PPDU is different from a RU allocation indication manner of an HE MU PPDU. In the HE TB PPDU, as shown in FIG. 4, RU allocation is indicated in a RU allocation subfield in each user field in the trigger frame. For example, each user field needs an 8-bit RU allocation subfield to indicate a RU allocated to the user field. However, in the RU allocation indication manner of the HE MU PPDU, RU allocation is indicated in the common field of the high efficiency signal field. For example, a structure of a high efficiency signal field B (HE-SIG-B) in a HE MU PPDU is shown in FIG. 5, and is divided into two parts. A first-part common field includes 1 to N RU allocation subfields, a center 26-tone RU indication field that exists when a bandwidth is greater than or equal to 80 MHz, a cyclic redundancy code (CRC) subfield for check, and a tail subfield for cyclic decoding. A second-part user-specific field includes 1 to M user fields based on a RU allocation sequence. Generally, two of the M user fields form a group. Every two user fields are followed by a CRC field and a Tail field. However, the last group should be excluded. The last group may have one or two user fields.

In addition to the EHT TB PPDU, an extremely high throughput physical layer protocol data unit (EHT PPDU) further includes an extremely high throughput non-trigger-based physical layer protocol data unit. The non-trigger-based physical layer protocol data unit may be similar to the HE MU PPDU, and may also be classified into an extremely high throughput single-user physical layer protocol data unit (EHT SU PPDU) and an extremely high throughput multi-user physical layer protocol data unit (EHT MU PPDU).

Figure 6:
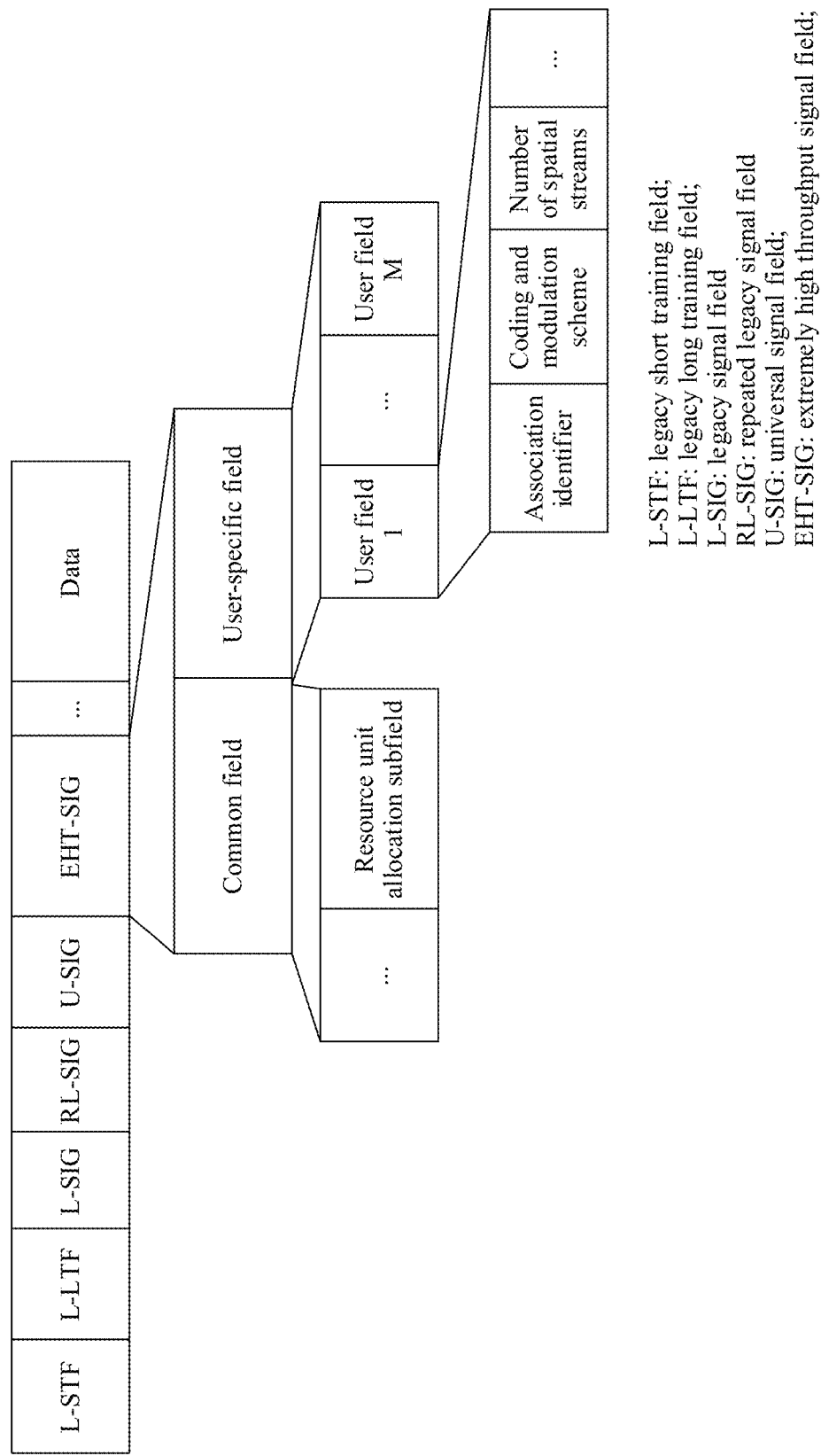
FIG. 6 is a schematic diagram depicting a structure of a non-trigger-based data packet according to an embodiment of this application.

It can be learned from FIG. 4 and FIG. 6 that a RU allocation manner of an EHT TB PPDU is different from a RU allocation indication manner of an extremely high throughput non-trigger-based physical layer protocol data unit. In the RU allocation manner of the EHT TB PPDU, as shown in FIG. 4, RU allocation is indicated in a RU allocation subfield in each user field. For example, each user field needs an 8-bit RU allocation subfield to indicate a RU allocated to the user field. In an extremely high throughput non-trigger-based physical layer protocol data unit, as shown in FIG. 6, RU allocation is indicated in a common field in an extremely high throughput signal field.

Refer to FIG. 6. FIG. 6 is a schematic diagram depicting a structure of an extremely high throughput non-trigger-based physical layer protocol data unit according to an embodiment of this application. As shown in FIG. 6, the data packet includes a L-STF, a L-LTF, a L-SIG, a repeated legacy signal field (RL-SIG), a universal signal field (U-SIG), an extremely high throughput signal field (EHT-SIG), and the like. The EHT-SIG is divided into two parts. A first-part common field includes 1 to N RU allocation subfields. A second-part user-specific field includes 1 to M user fields based on a RU allocation sequence.

2. Orthogonal Frequency Division Multiple Access (OFDMA) Transmission and Non-OFDMA Transmission OFDMA transmission is a multi-user communication mechanism, and is applicable to data frame exchange between an AP and a STA in the 802.11ax standard and later. An entire transmission bandwidth may be divided into a plurality of RUs, and the RUs are separately allocated to different users. In non-OFDMA transmission, an entire transmission bandwidth is used as a whole for single-user (SU) or a multi-user multiple input/multiple output (MU-MIMO) transmission. For non-OFDMA transmission, after preamble puncturing is performed, a remaining part, that is not punctured, forms a plurality of RUs. A multi-RU combination supported by non-OFDMA transmission is equivalent to a preamble puncturing combination supported by non-OFDMA transmission.

3. RU

Figure 7:
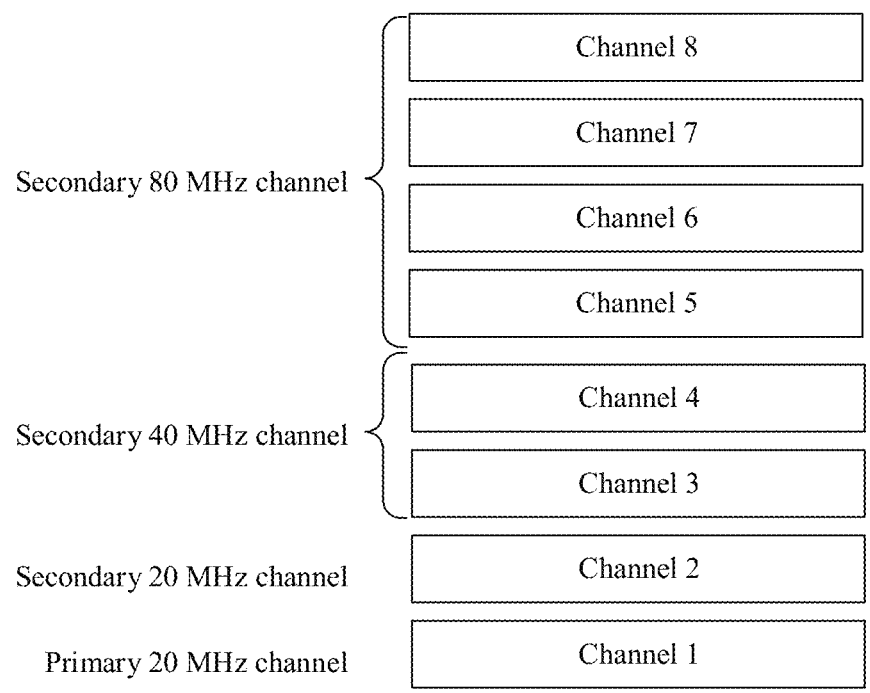
FIG. 7 is a schematic diagram of channel distribution according to an embodiment of this application.

A basic bandwidth is 20 MHz, and a bandwidth is an exponential integer multiple of 20 MHz (for example, 20, 40, 80, or 160 MHz). In embodiments, 20 MHz is used as a channel. Channel allocation in 802.11 is shown in FIG. 7. FIG. 7 is a schematic diagram of channel distribution according to an embodiment of this application. When the bandwidth is 160 MHz, the channel may be divided into a primary 20 MHz channel (or a primary channel, Primary 20 MHz, P20 for short), a secondary 20 MHz channel (Secondary 20 MHz, S20), a secondary 40 MHz channel (Secondary 40 MHz, S40), and a secondary 80 MHz channel (Secondary 80 MHz, S80). In embodiments, a channel 1 may correspond to a primary 20 MHz channel, a channel 2 may correspond to a secondary 20 MHz channel, a channel 3 and a channel 4 are aggregated into a secondary 40 MHz channel, and a channel 5 to a channel 8 are aggregated into a secondary 80 MHz channel. A primary 40 MHz channel (or a primary channel, primary 40 MHz, P40 for short) is a 40 MHz channel on which the primary 20 MHz channel is located, and a primary 80 MHz channel (or a primary channel, primary 80 MHz, P80 for short) is an 80 MHz channel on which the primary 20 MHz channel is located.

In embodiments, a bandwidth of a data packet may be divided into a plurality of RUs (RU, RU). RUs of different sizes may be aggregated by different quantities of subcarriers. For example, RUs of different sizes may include the following seven types: a 996-tone RU, a 484-tone RU, a 484-tone RU, a 106-tone RU, a 26-tone RU, a 52-tone RU, and a 2×996-tone RU.

Figure 8:
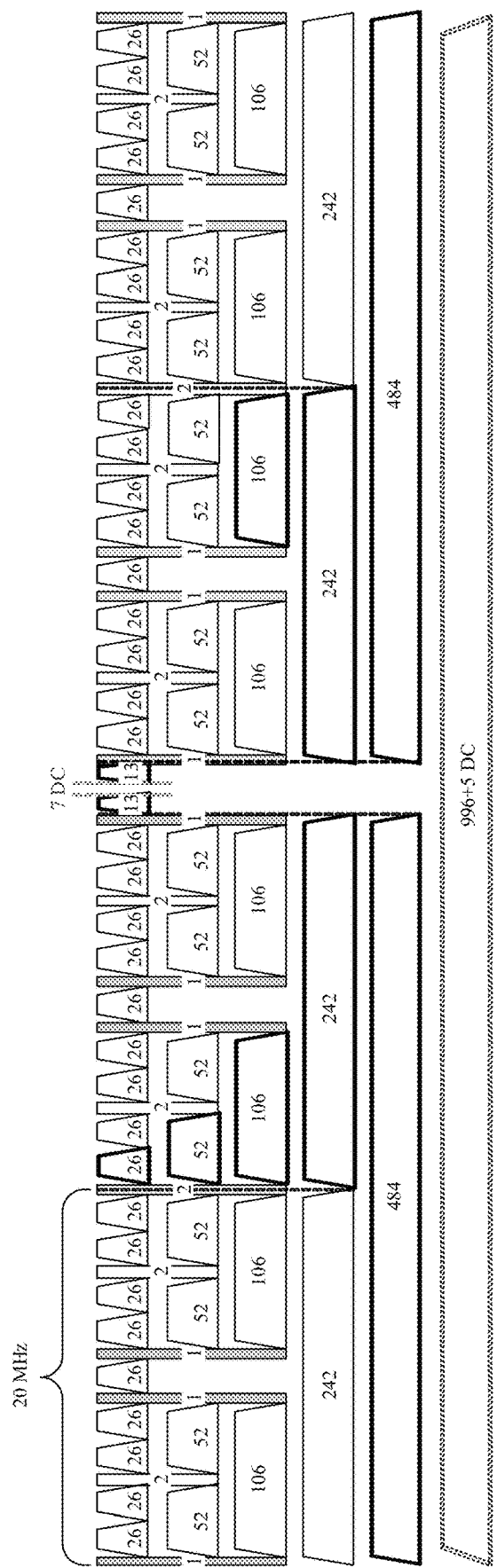
FIG. 8 is a schematic diagram of resource unit distribution according to an embodiment of this application.

Refer to FIG. 8. FIG. 8 is a schematic diagram of RU distribution in an 80 MHz channel according to embodiments of this application. As shown in FIG. 8, a first row indicates that the 80 MHz channel may include thirty-seven 26-tone RUs, a second row indicates that the 80 MHz channel may include sixteen 52-tone RUs, a third row indicates that the 80 MHz channel may include eight 106-tone RUs, a fourth row indicates that the 80 MHz channel may include four 242-tone RUs, a fifth row indicates that the 80 MHz channel may include two 484-tone RUs, and a sixth row indicates that the 80 MHz channel may include one 996-tone RU. In addition, as shown in FIG. 8, a center 26-tone RU formed by 13-tone subunits further exists in each row of 80 MHz channel. In addition, each row may include some guard subcarriers, null subcarriers (e.g., the shaded parts in FIG. 8), or direct current (DC) subcarriers.

As shown in FIG. 8, a 20 MHz subchannel may include nine 26-tone RUs, four 52-tone RUs, two 106-tone RUs, or one 242-tone RU. In addition, each row may include some guard subcarriers, null subcarriers (e.g., the shaded parts in FIG. 5), or DC subcarriers.

As shown in FIG. 8, a 40 MHz subchannel may include eighteen 26-tone RUs, eight 52-tone RUs, four 106-tone RUs, two 242-tone RUs, or one 484-tone RU. In addition, each row may include some guard subcarriers, null subcarriers (e.g., the shaded parts in FIG. 5), or DC subcarriers.

A 160 MHz bandwidth or a 160 MHz bandwidth formed by discrete 80 MHz+80 MHz channels may be considered as aggregation of RU distribution of two 80 MHz channels shown in FIG. 7. For example, the 160 MHz bandwidth may include one 2×996-tone RU, or may include various combinations of 26-tone RUs, 52-tone RUs, 106-tone RUs, 242-tone RUs, 484-tone RUs and 996-tone RUs.

In the RUs shown in FIG. 8, frequencies increase sequentially from left to right. A leftmost RU may be considered as a lowest frequency RU, and a rightmost RU may be considered as a highest frequency RU. As shown in FIG. 8, the four 242-tone RUs included in the 80 MHz channel may be separately numbered from left to right: a first 242-tone RU, a second 242-tone RU, a third 242-tone RU, and a fourth 242-tone RU. The first 242-tone RU and the second 242-tone RU one-to-one correspond to two lowest frequency 20 MHz subchannels in the 80 MHz channel in an ascending order of frequencies. The third 242-tone RU and the fourth 242-tone RU one-to-one correspond to two highest frequency 20 MHz subchannels in the 80 MHz channel in an ascending order of frequencies. There is a center 26-tone RU in every 80 MHz channel. Therefore, the 242-tone RU does not completely overlap the corresponding 20 MHz subchannel in frequency.

Correspondingly, two 484-tone RUs included in the 80 MHz channel may be separately numbered from left to right: a first 484-tone RU and a second 484-tone RU. A lowest frequency 40 MHz subchannel and a highest frequency 40 MHz subchannel in the 80 MHz channel one-to-one correspond to the first 484-tone RU and the second 484-tone RU in an ascending order of frequencies.

It can be learned from the foregoing content that, for a trigger-based data packet, a RU allocation subfield in each user field in the trigger frame may indicate an allocated RU. The station may identify a user field whose association identifier is the same as an association identifier of the station, and learn of the allocated RU from the user field, to transmit the trigger-based data packet. For a non-trigger-based data packet, an allocated RU may be learned of by using a RU allocation subfield in a common field in a signaling field, to receive the data packet. For example, it is assumed that the RUs allocated to the station may be the first 484-tone RU and the fourth 242-tone RU in the 80 MHz channel shown in FIG. 8.

However, if preamble puncturing exists in the bandwidth of the data packet, discrete resources caused by puncturing are all indicated by using the RU allocation subfield. Signaling overheads may be high because a large quantity of RUs need to be indicated.

To reduce the overhead, preamble puncturing indication information is used to indicate preamble puncturing information of a data packet in embodiments of this application, to send or receive the data packet. The preamble puncturing indication information includes one or more indicators, one indicator corresponds to one piece of preamble puncturing information, and the preamble puncturing information includes a size and location of preamble puncturing, or there is no preamble puncturing. In other words, a part of channels in the bandwidth of the data packet is null, or there is a hole in the bandwidth of the data packet. A size and location of the hole are indicated, so that the station can receive or send a data packet on a RU or a channel other than the hole in the bandwidth, to reduce signaling overheads.

For example, it is assumed that the size and location of preamble puncturing are the second 242-tone RU in FIG. 8, namely, the second 20 MHz subchannel that is in the 80 MHz channel and that corresponds to the second 242-tone RU. Discrete resources caused by puncturing are the first 242-tone RU, the third 242-tone RU, and the fourth 242-tone RU. It is assumed that for non-OFDMA transmission, the first 242-tone RU, the third 242-tone RU, and the fourth 242-tone RU are all allocated to one station or one group of stations. In this case, the RU allocation subfield corresponding to the station needs to indicate the first 242-tone RU, the third 242-tone RU, and the fourth 242-tone RU, or separately indicate the first 484-tone RU and the fourth 242-tone RU. In this application, the size and location of preamble puncturing may be indicated as the second 20 MHz subchannel of the 80 MHz channel. The station determines the allocated RU based on the preamble puncturing indication information. In comparison with a manner in which at least two RUs need to be indicated, this indication manner reduces overhead for RU allocation.

With reference to the accompanying drawings and the foregoing related concepts, the following further describes related content of this application or preamble puncturing indication information newly added in this application.

Figure 9:
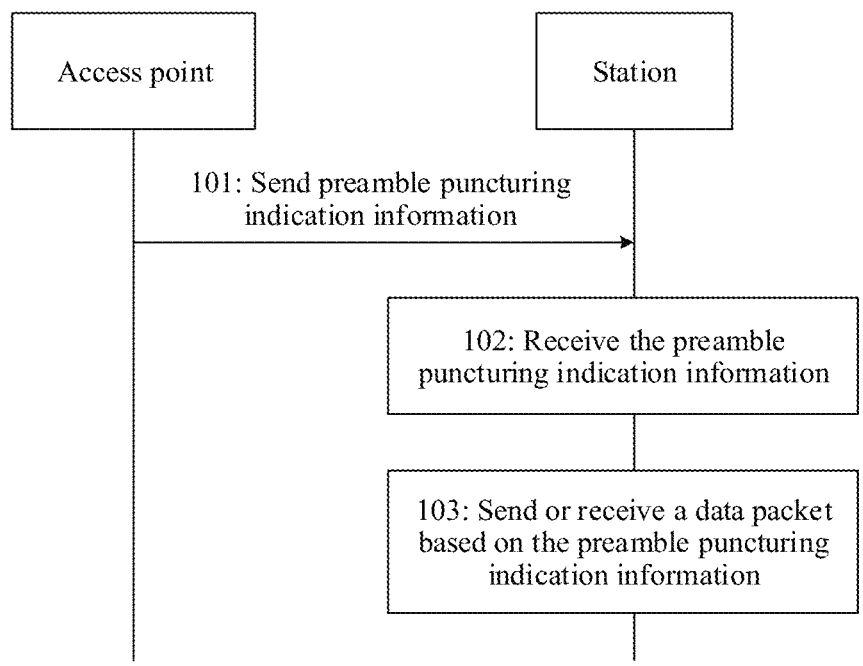
FIG. 9 is a schematic flowchart of a data transmission method according to an embodiment of this application.

Refer to FIG. 9. FIG. 9 is a schematic flowchart of a data transmission method according to an embodiment of this application. The data transmission method shown in FIG. 9 is described by using an example in which an AP sends preamble puncturing indication information. Optionally, in the data transmission method in this application, a station may send preamble puncturing indication information, and an AP receives or sends a data packet based on the preamble puncturing indication information. As shown in FIG. 9, the data transmission method includes the following steps.

101: An AP sends preamble puncturing indication information.

The preamble puncturing indication information includes one or more indicators, where one indicator corresponds to one piece of preamble puncturing information. In this application, the preamble puncturing indication information is used by a receive end to determine an allocated RU based on preamble puncturing information corresponding to a receive end. In other words, a function of the preamble puncturing indication information is the same as a function of the RU allocation subfield described above. Therefore, for a trigger-based data packet, the preamble puncturing indication information may be included in each user field in a trigger frame. For a non-trigger-based data packet, the preamble puncturing indication information may be included in a common field in a signaling field of the data packet.

Optionally, the preamble puncturing indication information may be a newly added field in a user field in the trigger frame or a reused reserved field, or may be a newly added field in the common field in the signaling field in the data packet or a reused reserved field.

Figure 10:
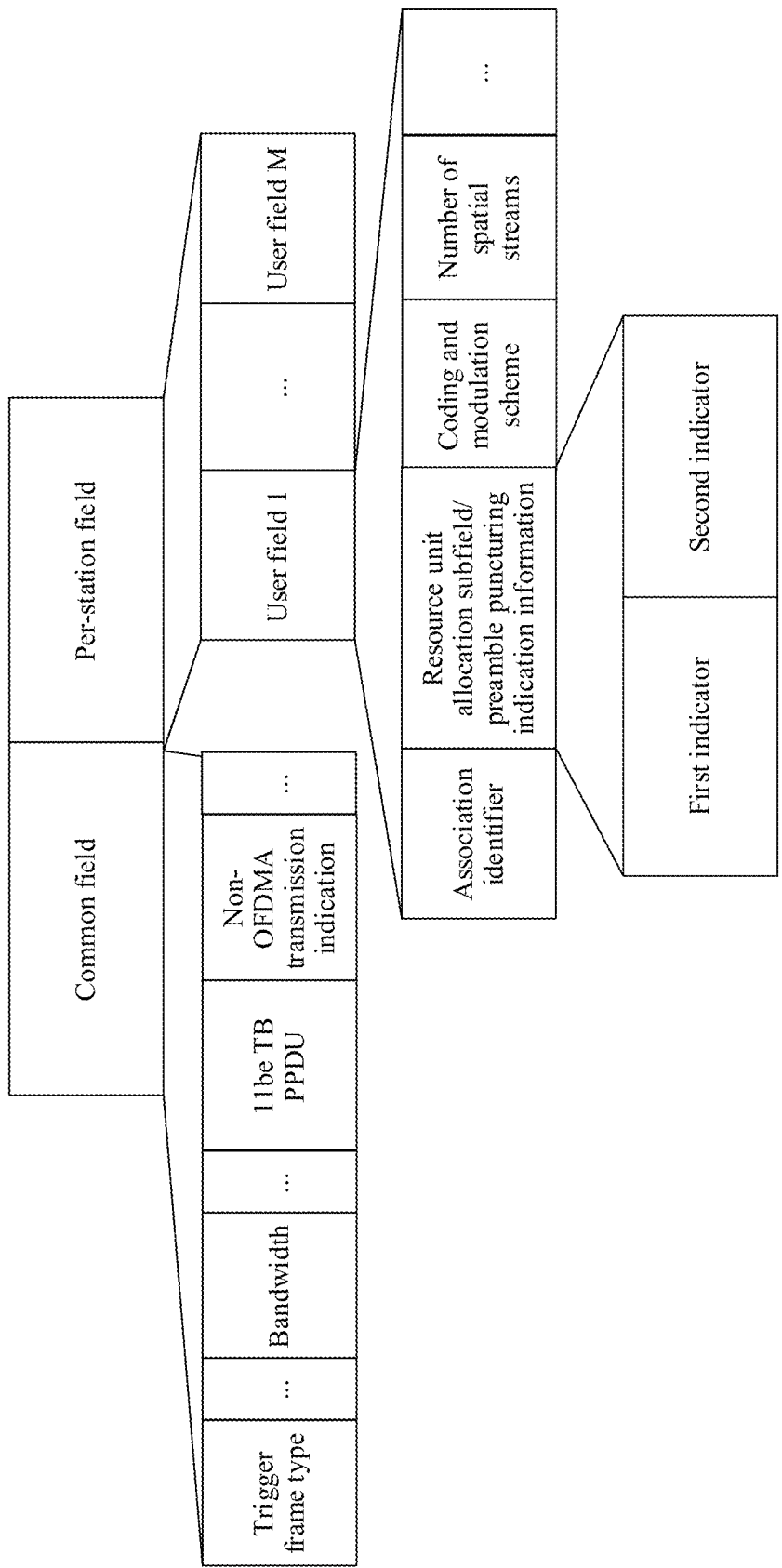
FIG. 10 is a schematic diagram depicting a structure of a trigger frame according to an embodiment of this application.
Figure 11:
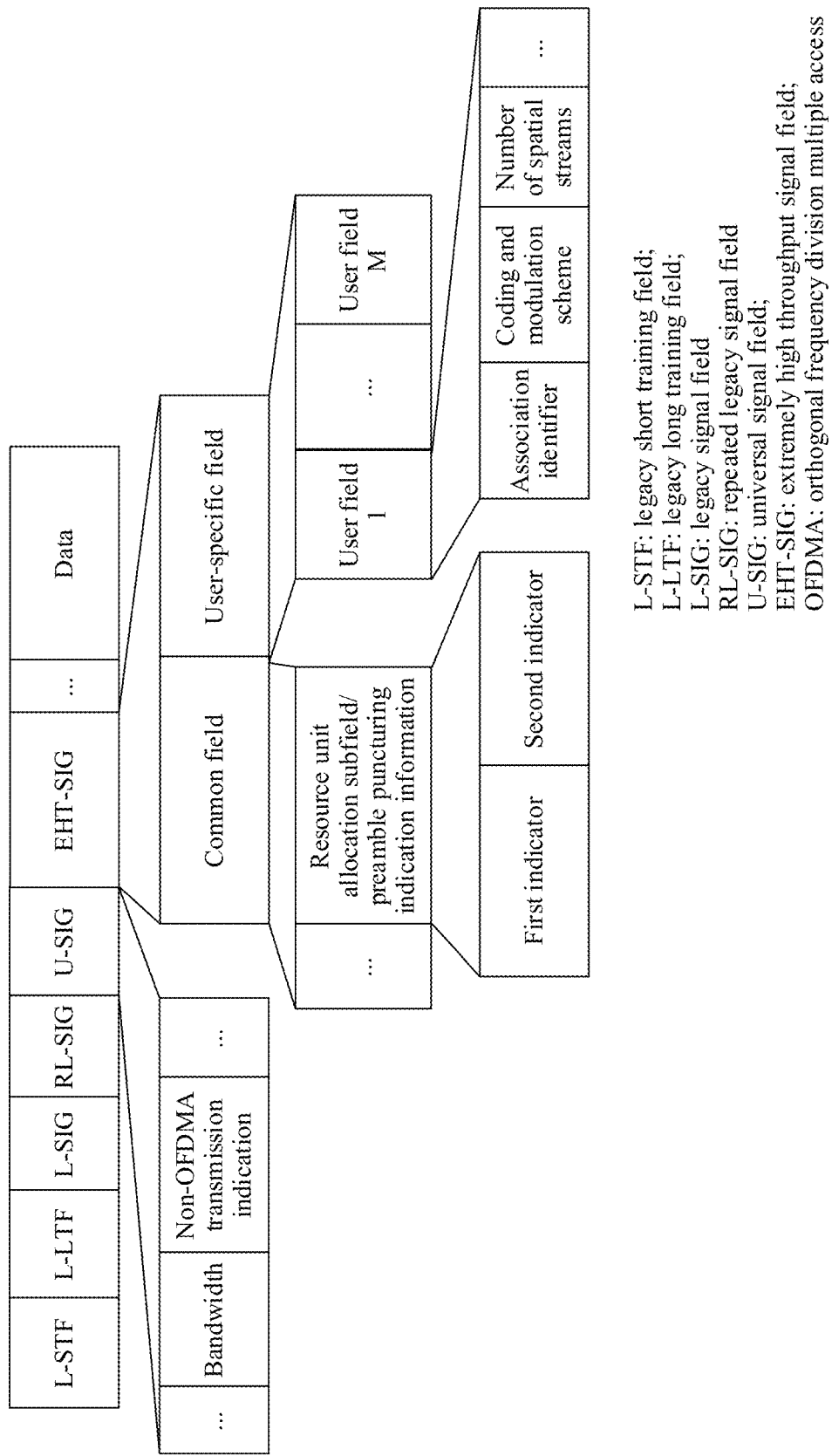
FIG. 11 is a schematic diagram depicting a structure of another non-trigger-based data packet according to an embodiment of this application.

Optionally, as shown in FIG. 10, compared with FIG. 4, the preamble puncturing indication information may reuse a RU allocation subfield in a user field in the trigger frame. For example, as shown in FIG. 10, it is assumed that the preamble puncturing indication information includes a first indicator and a second indicator, and the two indicators indicate two pieces of preamble puncturing information. Optionally, as shown in FIG. 11, compared with FIG. 6, the preamble puncturing indication information may reuse a RU allocation subfield in the EHT-SIG. For example, as shown in FIG. 11, it may be assumed that the preamble puncturing indication information includes a first indicator and a second indicator, and the two indicators indicate two pieces of preamble puncturing information.

102: A station receives the preamble puncturing indication information.

103: The station sends or receives a data packet based on the preamble puncturing indication information.

If the preamble puncturing indication information is in a signaling field, for example, in an EHT-SIG shown in FIG. 11, the station may receive or send the preamble puncturing indication information and the data packet as a whole.

Step 103 may include: when the preamble puncturing indication information indicates that there is no preamble puncturing, sending or receiving the data packet in a bandwidth of the data packet; or when the preamble puncturing indication information indicates a size and location of preamble puncturing, sending or receiving the data packet on a RU in the bandwidth of the data packet other than the size and location of preamble puncturing.

In addition, embodiments of this application further provides several optional manners of indicating preamble puncturing information. For details, refer to the following descriptions.

It can be learned that in this application, the allocated RU can be indirectly indicated based on the preamble puncturing indication information, to send or receive a data packet. Compared with a manner in which the allocated RU is directly indicated based on only the RU allocation subfield, this application helps reduce signaling overheads for RU allocation.

Figure 12:
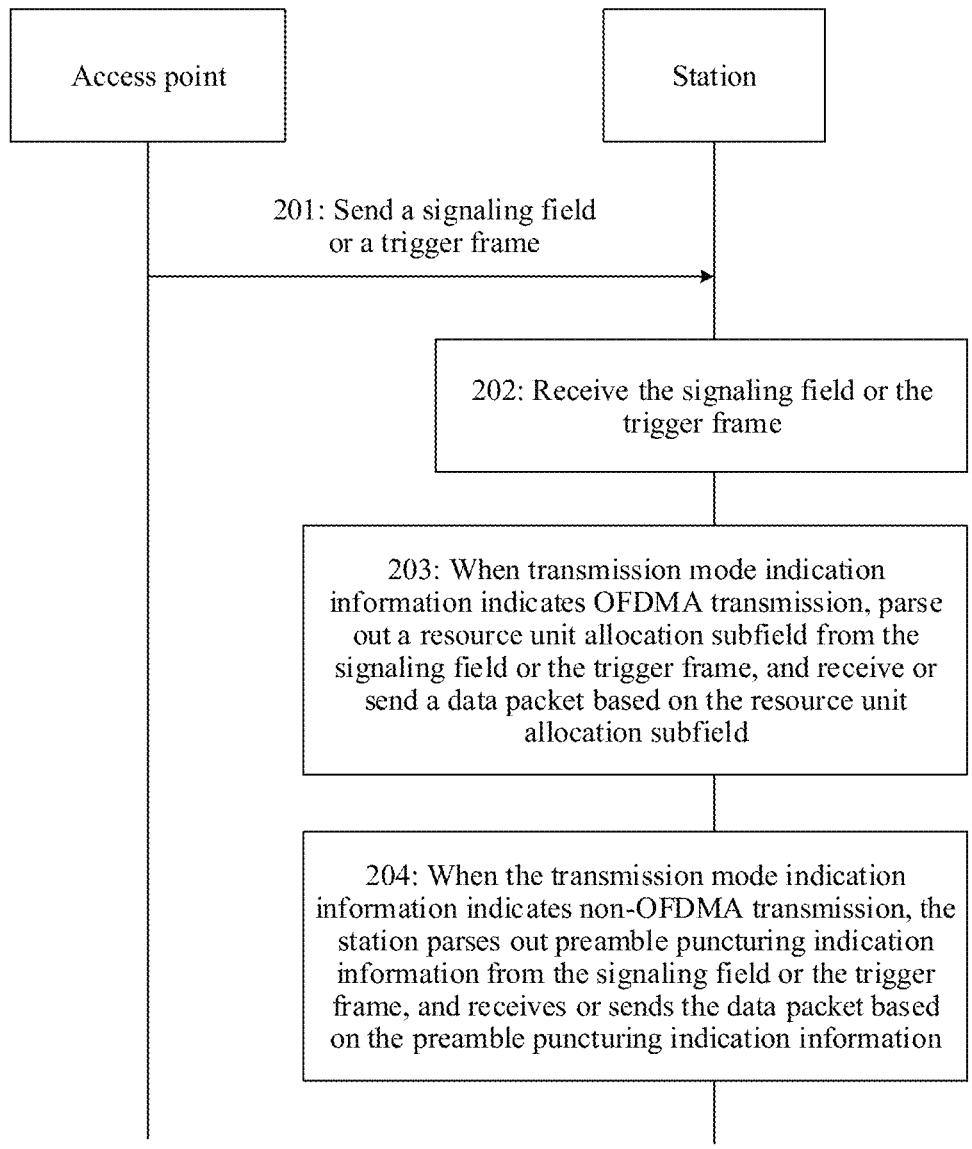
FIG. 12 is a schematic flowchart of another data transmission method according to an embodiment of this application.

Refer to FIG. 12. FIG. 12 is a schematic flowchart of another data transmission method according to an embodiment of this application. Compared with the data transmission method shown in FIG. 9, in the data transmission method shown in FIG. 12, an AP further sends transmission mode indication information. The transmission mode indication information indicates a transmission mode of a data packet. For example, a station may determine, based on the transmission mode indication information, whether the data packet is transmitted in an OFDMA mode or a non-OFDMA mode. For a non-OFDMA transmission, a plurality of discrete RUs caused by preamble puncturing are uniformly allocated to one user or one group of users. In other words, a same quantity of RUs are usually allocated to each user. Therefore, compared with a manner in which the RU allocation subfield indicates the plurality of discrete RUs, the preamble puncturing indication information is used in this application. This can reduce signaling overhead for RU indication. For an OFDMA transmission, a plurality of discrete RUs caused by preamble puncturing are allocated to different users. In other words, a RU allocated to a user is a part of these discrete RUs. In this case, the RU allocation subfield is used for indication, and low signaling overhead are needed. Therefore, in the data transmission method in FIG. 12, different RU indication methods may be used based on different transmission modes.

As shown in FIG. 12, the data transmission method includes the following steps.

201: An AP sends a signaling field or a trigger frame. The signaling field or the trigger frame includes transmission mode indication information and preamble puncturing indication information, or includes transmission mode indication information and a RU allocation subfield.

The signaling field may include the U-SIG and the EHT-SIG shown in FIG. 10, but is not limited to the signaling fields shown in FIG. 10. The trigger frame may be of the structure shown in FIG. 11, but is not limited to the structure of the trigger frame shown in FIG. 11. As shown in FIG. 10, the signaling field is in a PPDU. Therefore, for a non-trigger-based PPDU, the AP may send a signaling field and a data packet as a whole to a receive end, for example, a station.

As shown in FIG. 10, the transmission mode indication information may be in a common field in the trigger frame, and a bandwidth of the data packet may also be in the common field. The transmission mode indication information indicates a non-OFDMA transmission, and a location of a RU allocation subfield is the same as that of the preamble puncturing indication information. In addition, for non-OFDMA transmission, content of preamble puncturing indication information in the M user fields of the per-station field may be the same. The preamble puncturing indication information may also be referred to as a preamble puncturing indication subfield.

As shown in FIG. 11, transmission mode indication information may be in a U-SIG of the data packet. The transmission mode indication information indicates a non-OFDMA transmission, and a RU allocation subfield in a common field in an EHT-SIG is preamble puncturing indication information. The preamble puncturing indication information may also be referred to as a preamble puncturing indication subfield. The bandwidth of the data packet may also be in the U-SIG. For a non-OFDMA transmission, content of the preamble puncturing indication subfields corresponding to the M user fields may be the same. An order in which user fields in a user-specific field appear is consistent with preamble puncturing information indicated by corresponding preamble puncturing indication subfields. The station may identify, by reading a station identifier (STA ID) in a user field, whether the user field belongs to the station. With reference to a location at which the user field appears and the corresponding preamble puncturing indication subfield, the station may learn preamble puncturing information of the station.

Figure 13:
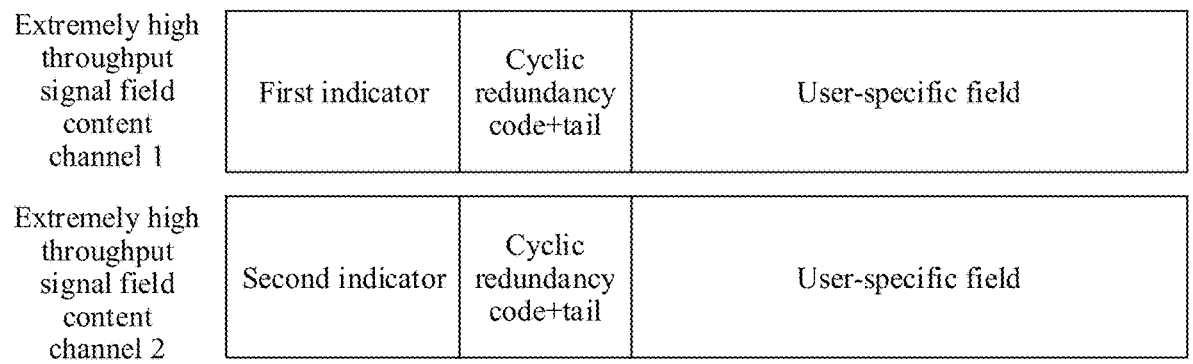
FIG. 13 is a schematic diagram depicting a structure of a multi-content channel according to an embodiment of this application.

For effective resource reuse, in a case of a bandwidth greater than or equal to 40 MHz, a manner of content channel (CC) 1 or CC2 may be used to represent content in an EHT-SIG or a field of a future-generation Wi-Fi standard. For example, when the bandwidth of the data packet is 40 MHz, there are two EHT-SIG content channels: a CC1 and a CC2. As shown in FIG. 13, a first EHT-SIG CC1 may include a first indicator in preamble puncturing indication information and a corresponding user field, and a second EHT-SIG CC2 includes a second indicator in the preamble puncturing indication information and a corresponding user field. The first indicator and the second indicator correspond to a same user field.

Optionally, the CC1 and the CC2 may include same preamble puncturing indication information and a corresponding user field. By reading information on the CC1 and the CC2, a user can fully know the preamble puncturing information in the bandwidth. This helps improve transmission reliability of the preamble puncturing information. Optionally, the preamble puncturing indication information may alternatively appear on one of the CCs.

202: The station receives the signaling field or the trigger frame.

Correspondingly, as shown in FIG. 10, the signaling field is in a PPDU structure. Therefore, for a non-trigger-based physical layer protocol data unit, a receive end such as a station may receive the signaling field and the data packet as a whole.

203: When the transmission mode indication information indicates OFDMA transmission, the station parses out the RU allocation subfield from the signaling field or the trigger frame, and receives or sends the data packet based on the RU allocation subfield.

204: When the transmission mode indication information indicates non-OFDMA transmission, the station parses out the preamble puncturing indication information from the signaling field or the trigger frame, and receives or sends the data packet based on the preamble puncturing indication information.

It should be noted that step 203 and step 204 are not subject to a specific sequence. In addition, embodiments of this application further provides several optional manners of indicating preamble puncturing information. For details, refer to the following descriptions.

It can be learned that in embodiments of this application, for non-OFDMA transmission, the data packet may be received or sent based on the preamble puncturing indication information; and for OFDMA transmission, the data packet may be received or sent based on the RU allocation subfield. This can reduce overheads for indicating an allocated RU.

In the data transmission methods shown in FIG. 9 and FIG. 12, if an AP sends a non-trigger-based data packet, for example, an EHT PPDU, as shown in FIG. 10, the data packet may carry preamble puncturing indication information, and a station may receive the preamble puncturing indication information and the data packet as a whole. If an AP sends a trigger-based data packet, for example, an EHT TB PPDU, a trigger frame is sent before sending trigger-based data packet. As shown in FIG. 11, the trigger frame may carry preamble puncturing indication information, and a station may receive the data packet based on the preamble puncturing indication information.

Embodiments of this application further provides several optional manners of indicating preamble puncturing information.

Manner 1: The preamble puncturing indication information includes one or more indicators, and one indicator indicates one piece of preamble puncturing information.

Manner 2: The preamble puncturing indication information includes at least two indicators. One indicator indicates a size of preamble puncturing, and the other one or more indicators indicate a location of preamble puncturing.

Manner 3: The preamble puncturing indication information indicates a status of preamble puncturing in a bandwidth based on bandwidth indication information. The bandwidth indication information may be a bandwidth field shown in FIG. 10 or FIG. 11, and indicates the bandwidth of the data packet.

The preamble puncturing information described in this specification may be a specific status of preamble puncturing, for example, a size and location, or no puncturing, or may be an index corresponding to a status of preamble puncturing, or the like. The following describes the three optional indication manners.

Manner 1: One Indicator in the Preamble Puncturing Indication Information Corresponds to One Piece of Preamble Puncturing Information In embodiments, through configuring or predefining by using signaling, the indicator indicates one or more pieces of the following preamble puncturing information in a 160 MHz channel: a 20 MHz subchannel in the 160 MHz channel; a 40 MHz subchannel formed by any two 20 MHz subchannels in the 160 MHz channel; a 60 MHz subchannel formed by any three 20 MHz subchannels in the 160 MHz channel; an 80 MHz subchannel formed by any four 20 MHz subchannels in the 160 MHz channel; or there is no preamble puncturing in the 160 MHz channel.

In these embodiments, the indicator may indicate all possible preamble puncturing information in the 160 MHz channel, that is, may indicate statuses of puncturing a 40 MHz, a 60 MHz, or an 80 MHz subchannel formed by contiguous or non-contiguous (e.g., adjacent or non-adjacent) 20 MHz subchannels. This helps improve flexibility of preamble puncturing.

In embodiments, through configuring or predefining by using signaling, the indicator indicates one or more pieces of the following preamble puncturing information in the 160 MHz channel: a 20 MHz subchannel in the 160 MHz channel; a 40 MHz subchannel formed by any two adjacent 20 MHz subchannels in the 160 MHz channel; a 60 MHz subchannel formed by any three adjacent 20 MHz subchannels in the 160 MHz channel; an 80 MHz subchannel formed by any four adjacent 20 MHz subchannels in the 160 MHz channel; or there is no preamble puncturing in the 160 MHz channel.

In these embodiments, the indicator may indicate preamble puncturing information of a puncturing status with a highest or high possibility in the 160 MHz channel. This helps improve flexibility of preamble puncturing indication and reduce bit overheads for indication.

In embodiments, the 160 MHz channel includes a highest frequency 80 MHz subchannel and a lowest frequency 80 MHz subchannel, and the indicator indicates one or more pieces of the following preamble puncturing information in the 160 MHz channel: a 20 MHz subchannel in the 160 MHz channel; a 40 MHz subchannel formed by two lowest frequency 20 MHz subchannels in the lowest frequency 80 MHz subchannel; a 40 MHz subchannel formed by two highest frequency 20 MHz subchannels in the lowest frequency 80 MHz subchannel; a 40 MHz subchannel formed by two lowest frequency 20 MHz subchannels in the highest frequency 80 MHz subchannel; a 40 MHz subchannel formed by two highest frequency 20 MHz subchannels in the highest frequency 80 MHz subchannel; a lowest frequency 80 MHz subchannel; a highest frequency 80 MHz subchannel; or there is no preamble puncturing in the 160 MHz channel.

In these embodiments, the indicator may indicate a part of possible preamble puncturing information in the 160 MHz channel. For example, a size and location of preamble puncturing may correspond to a RU obtained through channel division. This helps determine an allocated RU based on the preamble puncturing indication information, and reduce a quantity of bits of the indicator.

Figure 14:
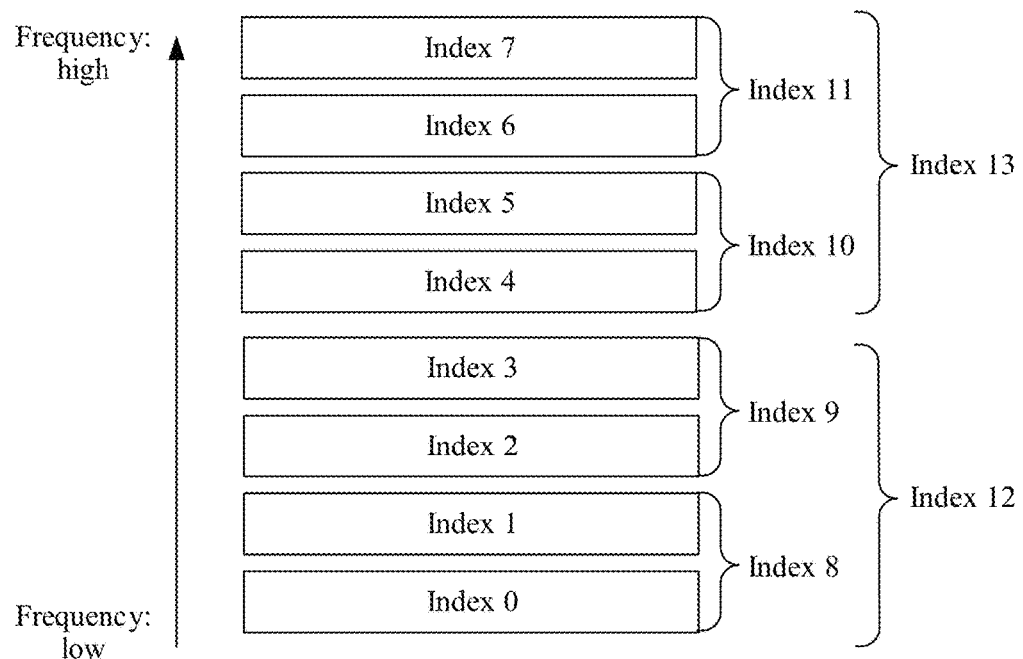
FIG. 14 is a schematic diagram of preamble puncturing information corresponding to indexes in Table 3 according to an embodiment of this application.

Refer to FIG. 14. FIG. 14 is a schematic diagram of another channel distribution according to this application. As shown in FIG. 14, the channel distribution of the 160 MHz channel shown in FIG. 7 is divided into indexes corresponding to optional sizes and locations of preamble puncturing. In other words, in FIG. 14, one or more channels corresponding to one index are a size and location of preamble puncturing in the 160 MHz channel.

Therefore, preamble puncturing information in one 20 MHz subchannel in the 160 MHz channel is preamble puncturing information corresponding to one of indexes 0 to 7 in FIG. 14. Preamble puncturing information in the 40 MHz subchannel formed by two lowest frequency 20 MHz subchannels in the lowest frequency 80 MHz subchannel is preamble puncturing information corresponding to an index 8 in FIG. 14. Preamble puncturing information in the 40 MHz subchannel formed by two highest frequency 20 MHz subchannels in the lowest frequency 80 MHz subchannel is preamble puncturing information corresponding to an index 9 in FIG. 14. Preamble puncturing information in the 40 MHz subchannel formed by two lowest frequency 20 MHz subchannels in the highest frequency 80 MHz subchannel is preamble puncturing information corresponding to an index 10 in FIG. 14. Preamble puncturing information in the 40 MHz subchannel formed by two highest frequency 20 MHz subchannels in the highest frequency 80 MHz subchannel is preamble puncturing information corresponding to an index 11 in FIG. 14. Preamble puncturing information in the lowest frequency 80 MHz subchannel is preamble puncturing information corresponding to an index 12 in FIG. 14. Preamble puncturing information in the highest frequency 80 MHz subchannel is preamble puncturing information corresponding to an index 13 in FIG. 14.

As shown in Table 3, each index in the first column corresponds to each piece of preamble puncturing information. The indicator needs to indicate any one of 15 types of preamble puncturing information in the 160 MHz channel. Therefore, the indicator may occupy four bits.

In Table 3, as shown in FIG. 14, the indexes 0 to 7 correspond to preamble puncturing information whose size of preamble puncturing is 20 MHz. For example, if the indicator is 0000, it may indicate that a location and size of preamble puncturing are preamble puncturing information corresponding to an index 0. If the indicator is 0001, it may indicate that a location and size of preamble puncturing are preamble puncturing information corresponding to an index 1. Indexes 8 to 11 in Table 3 may respectively indicate preamble puncturing information whose size of preamble puncturing is 40 MHz. Indexes 12 to 13 in Table 3 may respectively indicate preamble puncturing information whose size of preamble puncturing is 80 MHz. An index 14 in Table 3 may indicate that there is no preamble puncturing, and an index 15 is reserved. A quantity of indexes represents a total quantity of the described statuses of preamble puncturing. For example, a quantity of indexes in the first row is 8. It indicates that the indexes 0 to 7 correspond to total eight pieces of preamble puncturing information whose size of preamble puncturing is 20 MHz. Correspondingly, indexes in quantities of the first row to the third row in Table 3 may be expanded, and each row corresponds to one index.

It can be learned that the index may indicate the location and size of preamble puncturing in this indication manner. Compared with a manner of directly indicating discrete multiple RUs obtained after preamble puncturing, the preamble puncturing indication information can reduce signaling overheads.

In embodiments, the 160 MHz channel includes a highest frequency 80 MHz subchannel and a lowest frequency 80 MHz subchannel. The indicator further indicates one or more of the following preamble puncturing information in the 160 MHz channel: a middle frequency 40 MHz subchannel in the highest frequency 80 MHz subchannel, or a middle frequency 40 MHz subchannel in the 80 MHz subchannel.

In an example, the following may be added to FIG. 14 for Table 3: the index 15 corresponds to a size and a location of preamble puncturing on the middle frequency 40 MHz subchannel in the lowest frequency 80 MHz subchannel. The middle frequency 40 MHz subchannel in the lowest frequency 80 MHz subchannel is a 40 MHz subchannel formed by the channel 2 and the channel 3 shown in FIG. 7.

In another example, the following may be added to FIG. 14 or Table 3: the index 15 corresponds to a size and a location of preamble puncturing on the middle frequency 40 MHz subchannel in the highest frequency 80 MHz subchannel. The middle frequency 40 MHz subchannel in the highest frequency 80 MHz subchannel is a 40 MHz subchannel formed by the channel 5 and the channel 6 shown in FIG. 7.

In still another example, a quantity of bits indicated in the preamble puncturing indication information may be extended, for example, to five bits. In this case, the following may be added to FIG. 14 or Table 3: the index 15 corresponds to a size and a location of preamble puncturing on the middle frequency 40 MHz subchannel in the lowest frequency 80 MHz subchannel, and an index 16 corresponds to a size and a location of preamble puncturing of the middle frequency 40 MHz subchannel in the highest frequency 80 MHz subchannel

TABLE 3

Index table of preamble puncturing indication information in a 160 MHz channel (with an example of 4 bits)

| Entry index | Description | Quantity of Entries |
|---|---|---|
| 0-7 | A size of preamble puncturing is 20 MHz | 8 |
| 8-11 | A size of preamble puncturing is 40 MHz | 4 |
| 12-13 | A size of preamble puncturing is 80 MHz | 2 |
| 14 | No puncturing | 1 |
| 15 | Reserved | 1 |

Figure 15:
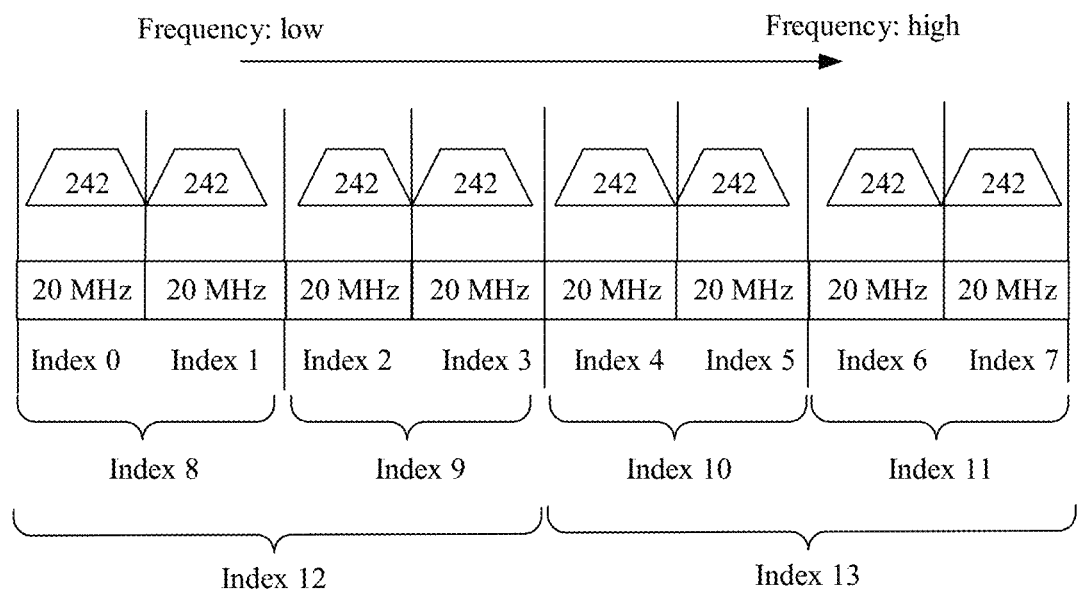
FIG. 15 is another schematic diagram of preamble puncturing information corresponding to indexes in Table 3 according to an embodiment of this application.

Based on the schematic diagram of RU distribution in FIG. 8, a correspondence between a RU and a channel in a 160 MHz channel may be obtained. For example, as shown in FIG. 15, a 20 MHz subchannel corresponds to a 242-tone RU in the 160 MHz channel from left to right, and in an ascending order of frequencies. Sizes and locations of preamble puncturing corresponding to the indexes in Table 3 are shown in FIG. 15. With reference to FIG. 14 or FIG. 15 and the indexes shown in Table 3, the following describes preamble puncturing information corresponding to the preamble puncturing indication information.

The bandwidth of the data packet is 160 MHz. The preamble puncturing indication information may include a first indicator. The first indicator indicates one piece of preamble puncturing information in the 160 MHz bandwidth.

Figure 16:
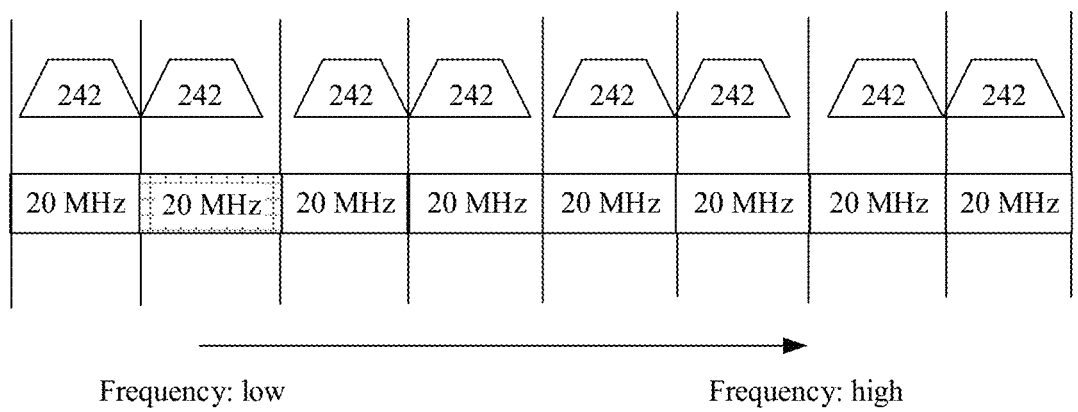
FIG. 16 is a schematic diagram of a location and size of preamble puncturing according to an embodiment of this application.

For example, as shown in FIG. 16, the 160 MHz bandwidth includes eight 20 MHz subchannels or eight 242-tone RUs. It is assumed that the first indicator is 0001. The station may determine, based on Table 3, that a size and a location of preamble puncturing in the data packet are a 20 MHz subchannel filled with grids in FIG. 16. The station may receive or send the data packet on seven 20 MHz subchannels other than the 20 MHz subchannel filled with grids or on seven 242-tone RUs corresponding to the seven 20 MHz subchannels.

Figure 17:
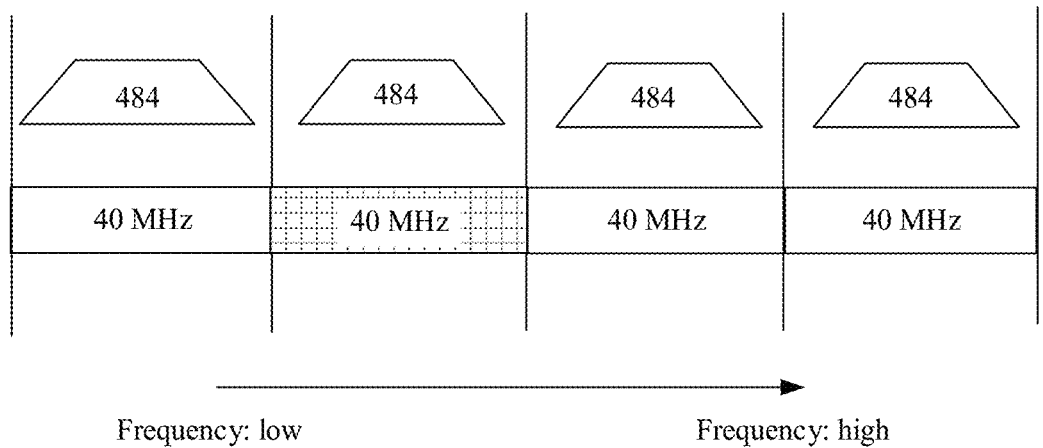
FIG. 17 is a schematic diagram of another location and size of preamble puncturing according to an embodiment of this application.

For another example, as shown in FIG. 17, the 160 MHz bandwidth includes four 40 MHz subchannels. It is assumed that the first indicator is 0101. The station may determine, based on Table 3, that a size and location of preamble puncturing in the data packet are a 40 MHz subchannel filled with grids in FIG. 17. The station may receive or send the data packet on three 40 MHz subchannels other than the 40 MHz subchannel filled with grids or on three 484-tone RUs corresponding to the three 40 MHz subchannels.

The bandwidth of the data packet is 320 MHz. The preamble puncturing indication information includes a first indicator and a second indicator. The first indicator indicates preamble puncturing information in a lowest frequency 160 MHz subchannel in the 320 MHz bandwidth, and the second indicator indicates preamble puncturing information in a highest frequency 160 MHz subchannel in the 320 MHz bandwidth. It can be learned that for a plurality of RUs in the 320 MHz bandwidth, 8-bit preamble puncturing indication information is used for indication based on Table 3.

Figure 18:
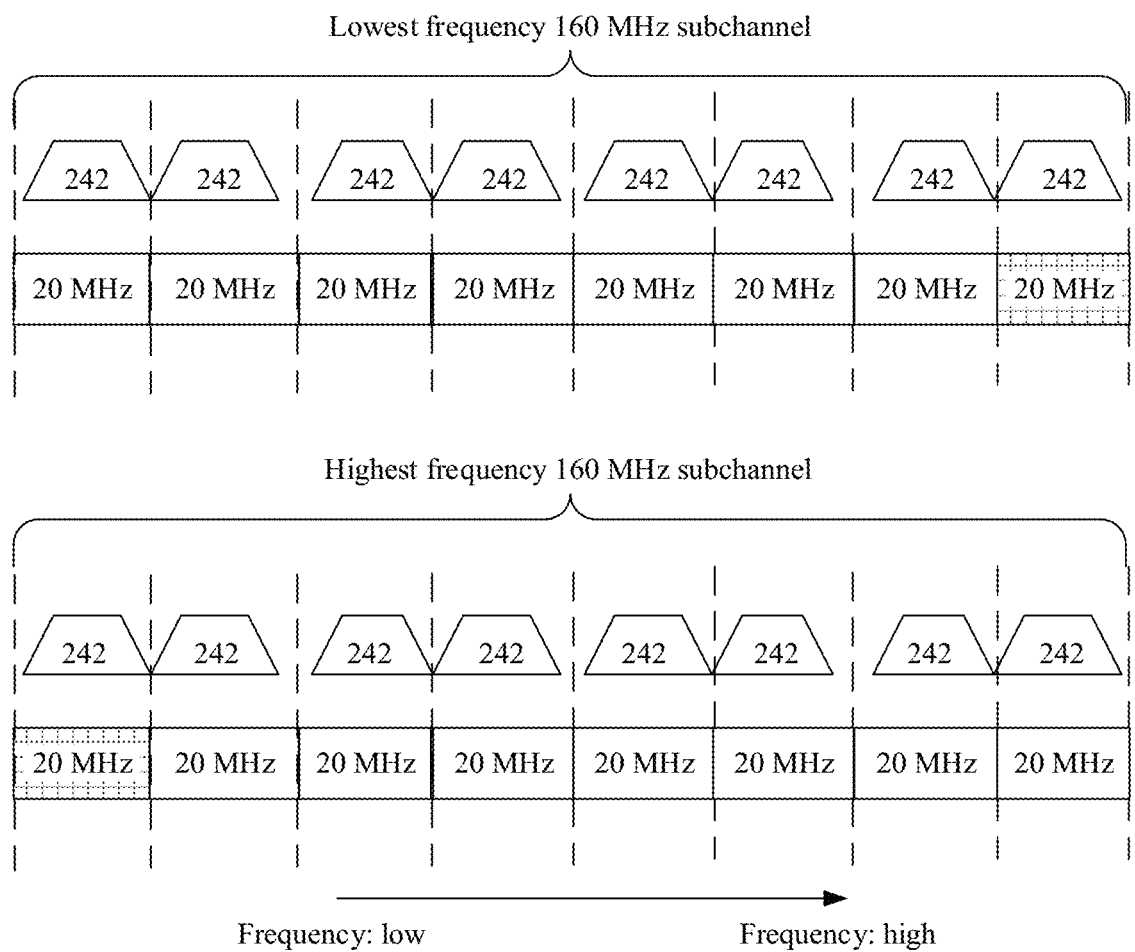
FIG. 18 is a schematic diagram of still another location and size of preamble puncturing according to an embodiment of this application.

For example, as shown in FIG. 18, the 320 MHz bandwidth includes sixteen 20 MHz subchannels or sixteen 242-tone RUs. It is assumed that the first indicator in the preamble puncturing indication information is 0111, and the second indicator is 0000. The station may determine that a size and location of preamble puncturing are a 20 MHz subchannel filled with grids in the lowest frequency 160 MHz subchannel and a 20 MHz subchannel filled with grids in the highest frequency 160 MHz subchannel shown in FIG. 18. In this way, the station may send or receive the data packet on remaining channels or RUs in the 320 MHz bandwidth, for example, fourteen 20 MHz subchannels other than the 20 MHz subchannel filled with grids, or fourteen 242-tone RUs corresponding to the fourteen 20 MHz subchannels in FIG. 18. In this case, an equivalent bandwidth is 280 MHz.

Figure 19:
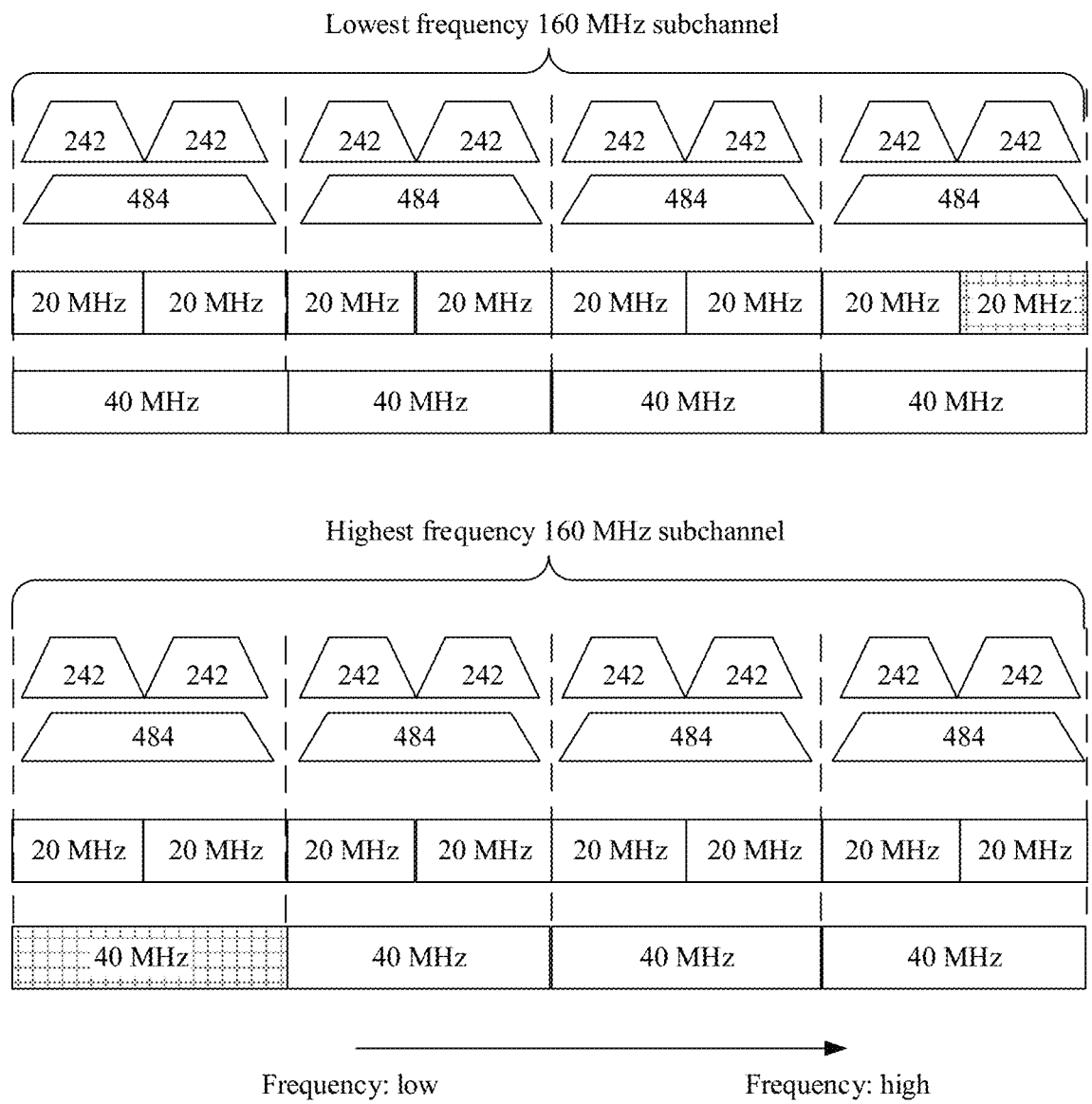
FIG. 19 is a schematic diagram of yet another location and size of preamble puncturing according to an embodiment of this application.

For another example, as shown in FIG. 19, the 320 MHz bandwidth includes sixteen 20 MHz subchannels, or sixteen 242-tone RUs, or eight 242-tone RUs and four 484-tone RUs. It is assumed that the first indicator in the preamble puncturing indication information is 0111, and the second indicator is 1000. The station may determine that a size and location of preamble puncturing are a 20 MHz subchannel filled with grids in the lowest frequency 160 MHz subchannel and a 40 MHz subchannel filled with grids in the highest frequency 160 MHz subchannel shown in FIG. 19. In this way, the station may send or receive the data packet on each 20 MHz subchannel or a corresponding 242-tone RU or 484-tone RU other than the 20 MHz and the 40 MHz that are filled with grids in the 320 MHz bandwidth. In other words, an equivalent bandwidth is 260 MHz.

Figure 20:
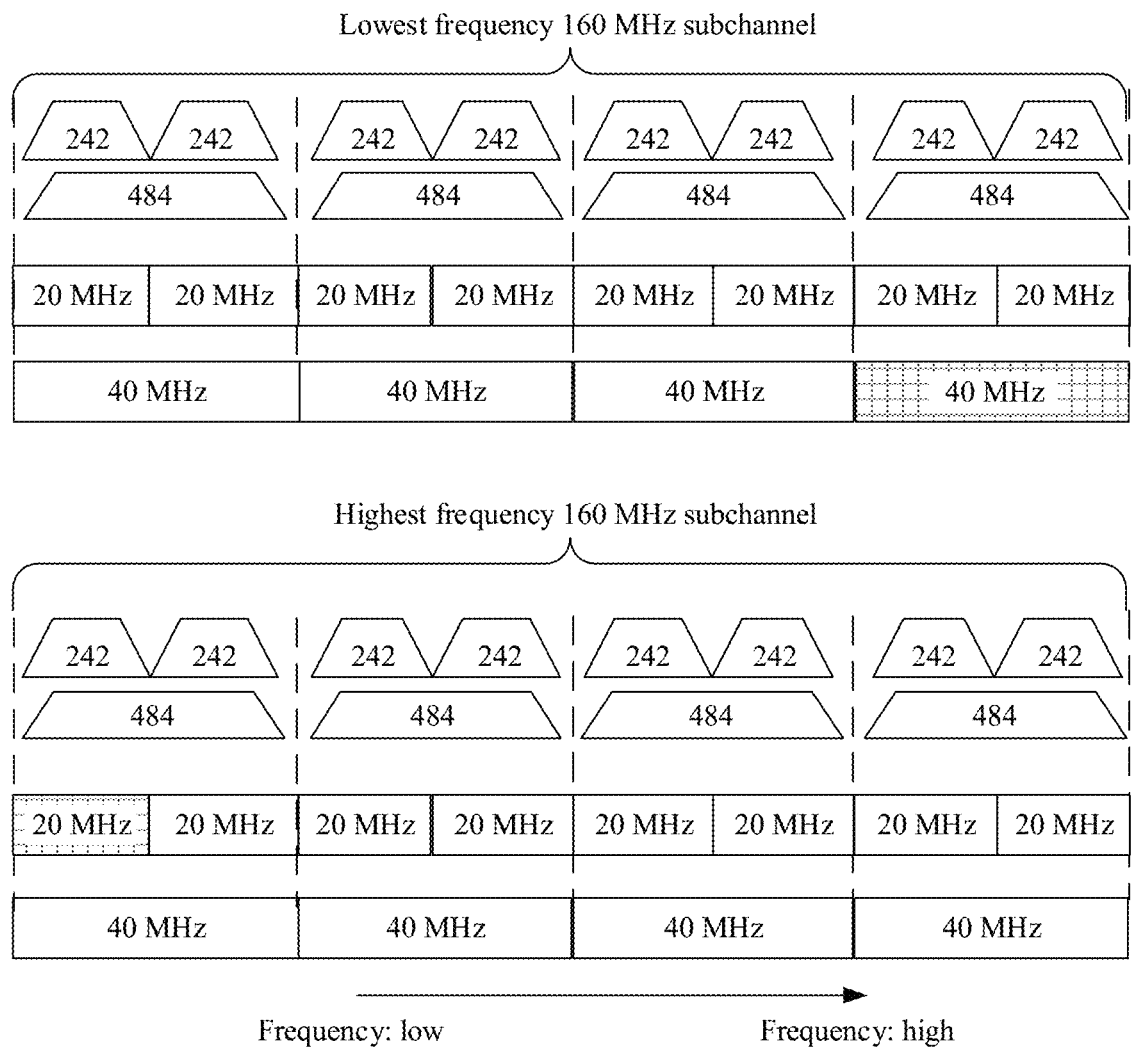
FIG. 20 is a schematic diagram of still yet another location and size of preamble puncturing according to an embodiment of this application.

For still another example, as shown in FIG. 20, the 320 MHz bandwidth includes sixteen 20 MHz subchannels, sixteen 242-tone RUs, or eight 484-tone RUs. It is assumed that the first indicator in the preamble puncturing indication information is 1000, and the second indicator is 0000. The station may determine that a size and location of preamble puncturing are a 40 MHz subchannel filled with grids in the lowest frequency 160 MHz subchannel and a 20 MHz subchannel filled with grids in the highest frequency 160 MHz subchannel shown in FIG. 20. In this way, the station may send or receive the data packet on each 20 MHz subchannel or a corresponding 242-tone RU or 484-tone RU other than the 20 MHz and the 40 MHz that are filled with grids in the 320 MHz bandwidth.

Figure 21:
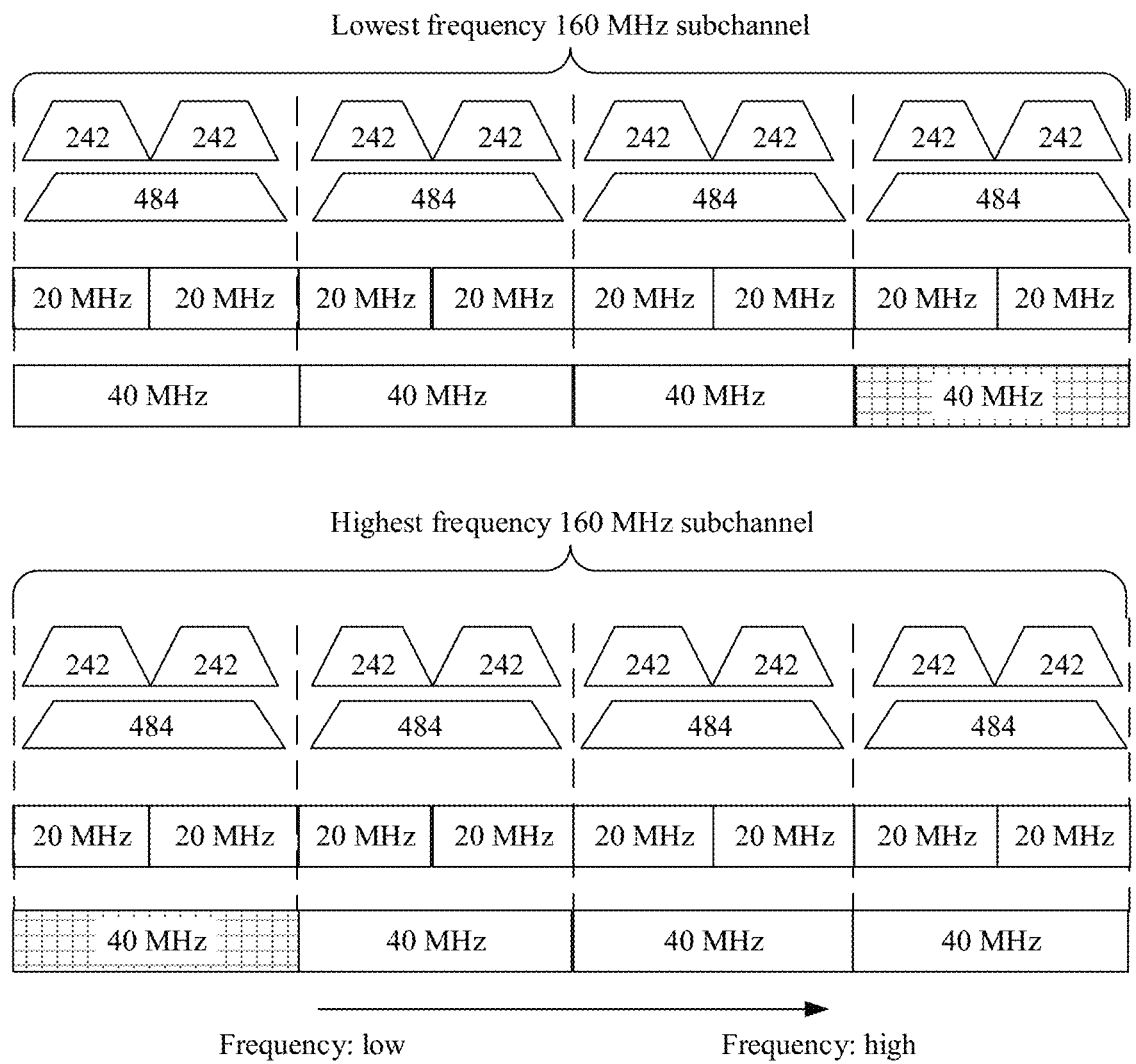
FIG. 21 is a schematic diagram of a further location and size of preamble puncturing according to an embodiment of this application.

For yet another example, as shown in FIG. 21, the 320 MHz bandwidth includes sixteen 20 MHz subchannels, sixteen 242-tone RUs, or eight 484-tone RUs. It is assumed that the first indicator in the preamble puncturing indication information is 1011, and the second indicator is 1000. The station may determine that a size and location of preamble puncturing are a 40 MHz subchannel filled with grids in the lowest frequency 160 MHz subchannel and a 40 MHz subchannel filled with grids in the highest frequency 160

MHz subchannel shown in FIG. 21. In this way, the station may send or receive the data packet on remaining channels or RUs on the 320 MHz bandwidth with no preamble puncturing, that is, on an equivalent bandwidth of 240 MHz.

In embodiments, a same indicator corresponds to different preamble puncturing information in different bandwidths. This helps reduce a quantity of pieces of preamble puncturing information that needs to be indicated by the preamble puncturing indication information, and reduces a quantity of bits needed by the preamble puncturing indication information.

In embodiments, the indicator in the preamble puncturing indication information indicates one or more pieces of the following preamble puncturing information in an 80 MHz channel: a 20 MHz subchannel in the 80 MHz channel; a 40 MHz subchannel formed by any two 20 MHz subchannels in the 80 MHz channel; a 60 MHz subchannel formed by any three 20 MHz subchannels in the 80 MHz channel; or there is no preamble puncturing in the 80 MHz channel.

In these embodiments, the indicator may indicate all possible preamble puncturing information in the 80 MHz channel, that is, may indicate statuses of puncturing a 40 MHz or a 60 MHz subchannel formed by contiguous or non-contiguous (e.g., adjacent or non-adjacent) 20 MHz subchannels. This helps improve flexibility of preamble puncturing.

In embodiments, through configuring and predefining by using signaling, the preamble puncturing information in the 80 MHz channel includes one or more of the following: a 20 MHz subchannel in the 80 MHz channel; a 40 MHz subchannel formed by any two adjacent 20 MHz subchannels in the 80 MHz channel; a 60 MHz subchannel formed by any three adjacent 20 MHz subchannels in the 80 MHz channel; or there is no preamble puncturing in the 80 MHz channel.

In embodiments, the indicator may indicate preamble puncturing information of a puncturing status with a highest or high possibility in the 80 MHz channel. This helps improve flexibility of preamble puncturing indication and reduce bit overhead for indication.

In embodiments, through configuring and predefining by using signaling, the preamble puncturing information in the 80 MHz channel includes one or more of the following: a 20 MHz subchannel in the 80 MHz channel; a lowest frequency 40 MHz subchannel in the 80 MHz channel; a middle frequency 40 MHz subchannel in the 80 MHz channel; a highest frequency 40 MHz subchannel in the 80 MHz channel; the 80 MHz channel; or there is no preamble puncturing in the 80 MHz channel.

In embodiments, the indicator may indicate preamble puncturing information of puncturing with a highest or high possibility in the 80 MHz channel. This can further reduce bit overhead for indication.

Figure 22:
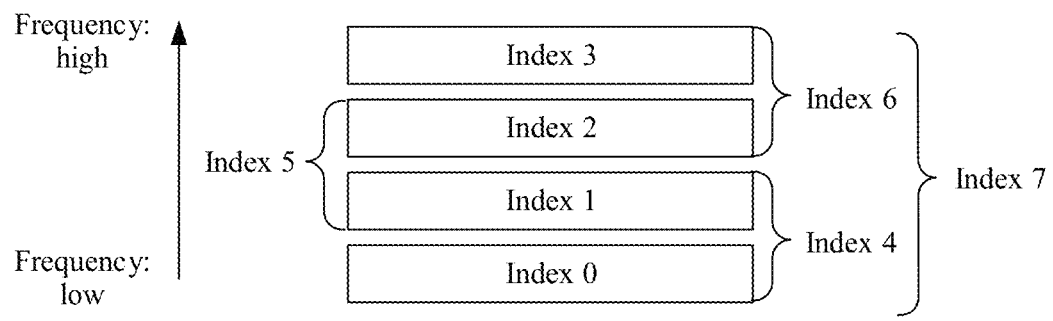
FIG. 22 is a schematic diagram of preamble puncturing information corresponding to indexes in Table 4 according to an embodiment of this application.
Figure 23:
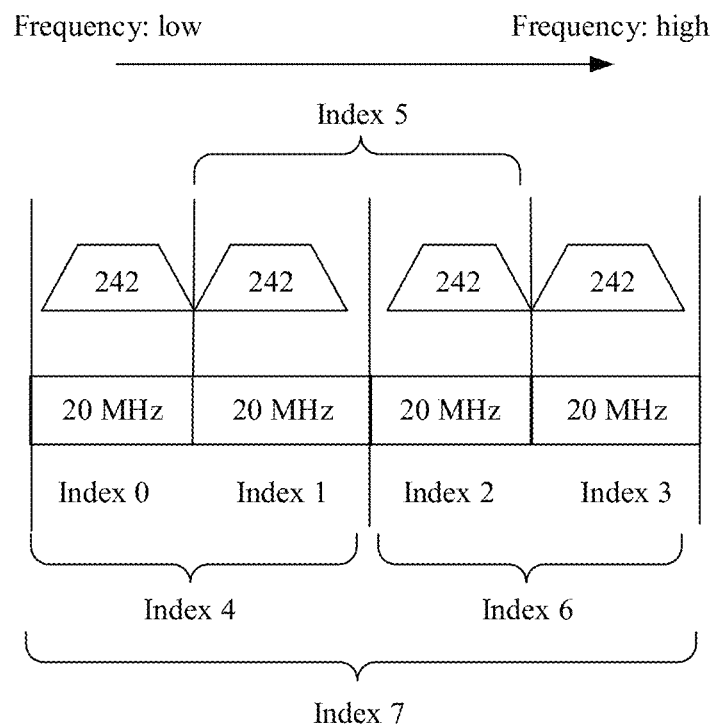
FIG. 23 is another schematic diagram of preamble puncturing information corresponding to indexes in Table 4 according to an embodiment of this application.

As shown in Table 4, each indicator in the preamble puncturing indication information may separately indicate a status of preamble puncturing corresponding to each index in Table 4. For example, based on the schematic diagram of channel distribution shown in FIG. 7, a size and location of preamble puncturing corresponding to each index in Table 4 are shown in FIG. 22. A size and location of preamble puncturing corresponding to an index 6 are the channel 2 and the channel 3, and may also be the middle frequency 40 MHz subchannel in the 80 MHz channel. Correspondingly, based on the schematic diagram of RU distribution shown in FIG. 8, sizes and locations of preamble puncturing corresponding to indexes in Table 4 are shown in FIG. 23. Optionally, if the preamble puncturing indication information does not indicate no puncturing, the preamble puncturing information shown in Table 4 may be indicated by using 3-bit preamble puncturing indication information.

TABLE 4

Index table of preamble puncturing indication information in an 80 MHz channel

| Index | Description | Quantity of entries (entry) |
|---|---|---|
| 0-3 | A size of preamble puncturing is 20 MHz | 4 |
| 4-6 | A size of preamble puncturing is 40 MHz | 3 |
| 7 | A size of preamble puncturing is 80 MHz | 1 |
| 8 | No puncturing | 1 |
| 9-15 | Reserved | 7 |

With reference to FIG. 22 or FIG. 23 and the indexes shown in Table 3 and Table 4, the following describes preamble puncturing information corresponding to the preamble puncturing indication information.

The bandwidth of the data packet is 240 MHz. The preamble puncturing indication information includes a first indicator and a second indicator. The first indicator indicates preamble puncturing information in a lowest frequency 160 MHz subchannel in the 240 MHz bandwidth; and the second indicator indicates preamble puncturing information in a highest frequency 80 MHz subchannel in the 240 MHz bandwidth. It can be learned that, based on Table 3 and Table 4, for a plurality of RUs in the 240 MHz bandwidth, only preamble puncturing indication information occupying 8 bits needs to be used for indication.

Figure 24:
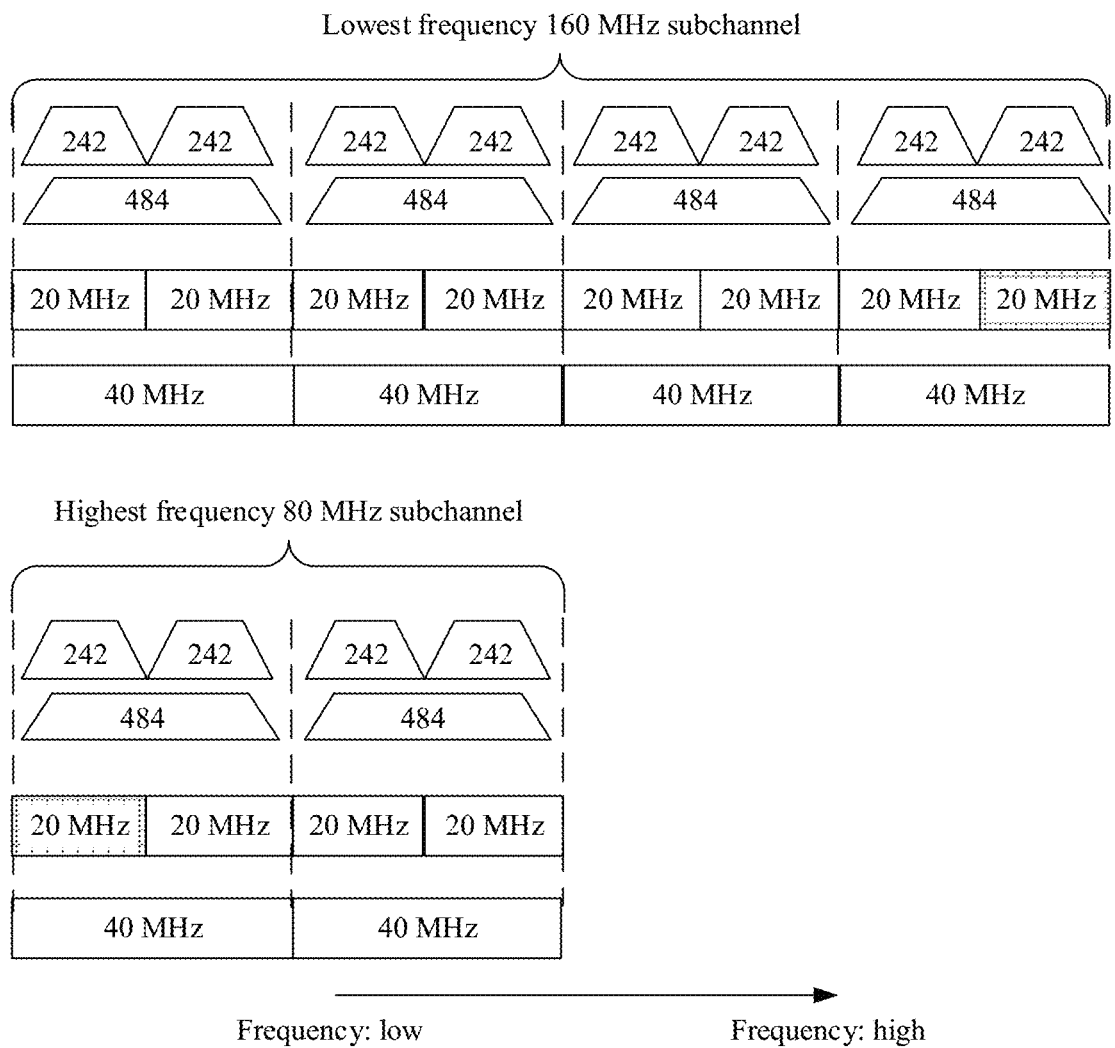
FIG. 24 is a schematic diagram of a still further location and size of preamble puncturing according to an embodiment of this application.

For example, based on Table 3 and Table 4, the bandwidth of the data packet is 240 MHz. As shown in FIG. 24, the first indicator in the preamble puncturing information is 0111, and the second indicator is 0000. The station may determine, based on the first indicator and Table 3, that a size and location of preamble puncturing in the lowest frequency 160 MHz subchannel are a fourth 20 MHz subchannel in the lowest frequency 160 MHz subchannel shown in FIG. 24. The station may determine, based on the second indicator and Table 4, that a size and location of preamble puncturing in the highest frequency 80 MHz subchannel are a first 20 MHz subchannel in the highest frequency 80 MHz subchannel shown in FIG. 24. In this way, the station may send or receive the data packet on remaining channels or RUs in the 240 MHz bandwidth.

Figure 25:
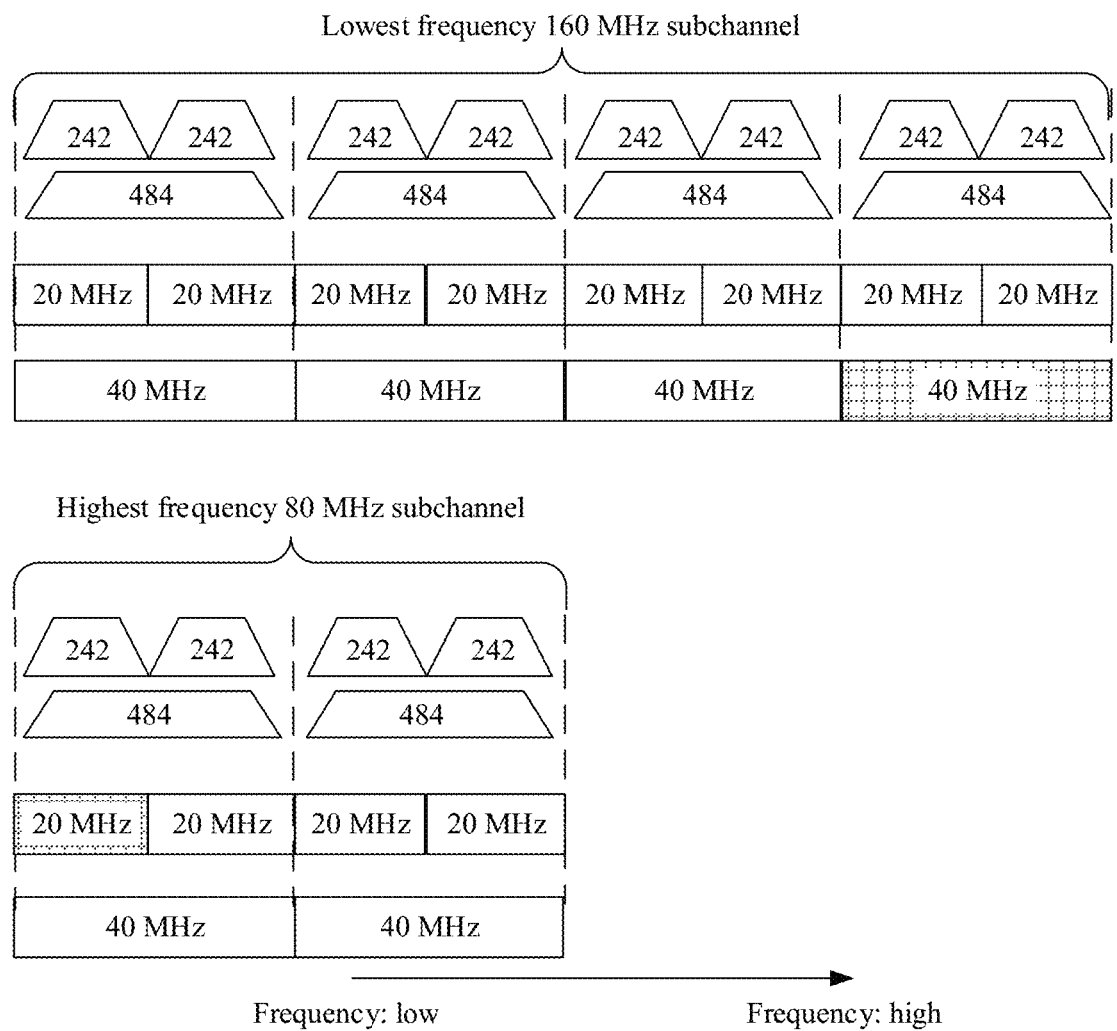
FIG. 25 is a schematic diagram of a yet further location and size of preamble puncturing according to an embodiment of this application.

For another example, as shown in FIG. 25, it is assumed that the first indicator in the preamble puncturing indication information is 1000 and the second indicator is 0000. The station may determine, based on the first indicator and Table 3, that a size and location of preamble puncturing are a 40 MHz subchannel filled with grids in the lowest frequency 160 MHz subchannel shown in FIG. 25. The station may further determine, based on the second indicator and Table 4, that a size and location of preamble puncturing are a 20 MHz subchannel filled with grids in the highest frequency 80 MHz subchannel shown in FIG. 25. In this way, the station may send or receive the data packet on remaining channels or RUs in the 240 MHz bandwidth, for example, channels or RUs in FIG. 25 that are not filled with grids.

Figure 26:
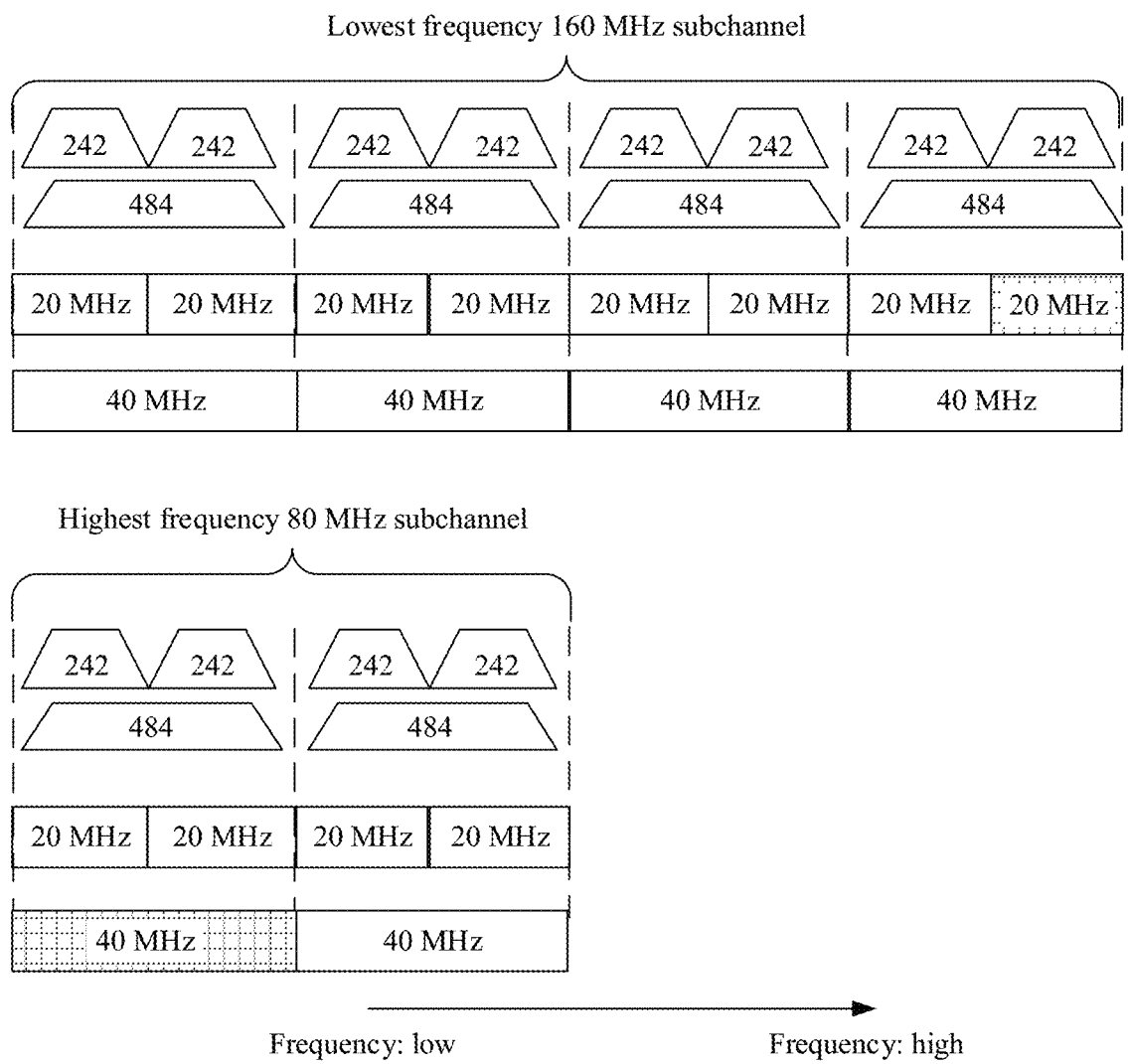
FIG. 26 is a schematic diagram of a still yet further location and size of preamble puncturing according to an embodiment of this application.

For still another example, as shown in FIG. 26, it is assumed that the first indicator in the preamble puncturing indication information is 0111 and the second indicator is 0100. The station may determine, based on the first indicator and Table 3, that a size and location of preamble puncturing are a 20 MHz subchannel filled with grids in the lowest frequency 160 MHz subchannel shown in FIG. 26. The station may further determine, based on the second indicator and Table 2, that a size and location of preamble puncturing are a 40 MHz subchannel filled with grids in the highest frequency 80 MHz subchannel shown in FIG. 26. In this way, the station may send or receive the data packet on remaining channels or RUs in the 240 MHz bandwidth, for example, channels or RUs in FIG. 26 that are not filled with grids.

Optionally, the bandwidth of the data packet is 240 MHz. A first indicator in the preamble puncturing indication information indicates preamble puncturing information in a lowest frequency 160 MHz subchannel in the 240 MHz bandwidth; and a second indicator indicates preamble puncturing information in a highest frequency 80 MHz subchannel in the 240 MHz bandwidth.

The first indicator may indicate preamble puncturing information in a lowest frequency 80 MHz subchannel in the 240 MHz bandwidth, and the second indicator indicates preamble puncturing information in a highest frequency 160 MHz subchannel in the 240 MHz bandwidth.

When the bandwidth of the data packet is 160 MHz, the preamble puncturing indication information may be indicated in the following several optional implementations.

In embodiments, the preamble puncturing indication information may include one indication, for example, a first indicator. The first indicator may indicate preamble puncturing information based on Table 3. This helps reduce indication overheads.

In embodiments, the preamble puncturing indication information may include two indicators. Preamble puncturing information is also indicated based on Table 3. In this way, one of the indicators may be a reserved value or any value, or the station may ignore a value of the indicator. It can be learned that this implementation helps use a uniform structure of preamble puncturing indication information for different bandwidths.

In embodiments, the preamble puncturing indication information includes two indicators. The two indicators may respectively indicate a size and location of a hole on an 80 MHz subchannel. For example, the preamble puncturing indication information includes a first indicator and a second indicator. The first indicator indicates preamble puncturing information in a lowest frequency 80 MHz subchannel in the 160 MHz bandwidth; and the second indicator indicates preamble puncturing information in a highest frequency 80 MHz subchannel in the 160 MHz bandwidth.

In embodiments of this application, the bandwidth may support one or more holes in preamble, that is, there is one or more holes in the bandwidth. Each hole may be indicated by using the indication method in embodiments of this application. Optionally, the plurality of holes may be limited to contiguous holes. For example, the bandwidth of the data packet is 160 MHz, and the preamble puncturing indication information includes a first indicator and a second indicator. The first indicator indicates preamble puncturing information of a first hole in the 160 MHz bandwidth; and the second indicator indicates preamble puncturing information of a second hole in the 160 MHz bandwidth. Preamble puncturing information of the first hole and the second hole may be determined by using Table 3 or Table 4.

In the foregoing implementations, one indicator in the preamble puncturing indication information corresponds to one piece of preamble puncturing information, and how the preamble puncturing indication information indicates a bandwidth of 320 MHz, 240 MHz, 160 MHz, or 80 MHz is described.

In addition, this application further provides a manner of indicating preamble puncturing information, namely, the foregoing second manner. Details are described below.

Optionally, for the entries shown in Table 3 or Table 4, a quantity of entry indexes that can be indicated by the preamble puncturing indication information is related to a quantity of bits of the preamble puncturing indication information. For example, the preamble puncturing indication information may occupy a smaller quantity of bits, to indicate a part of the entry indexes in Table 3 or Table 4. The entry indexes shown in Table 3 or Table 4 may be further extended. For example, preamble puncturing information that may be indicated by the preamble puncturing indication information may include a hole formed by any 20 MHz subchannel in the bandwidth, a 40 MHz subchannel formed by any two 20 MHz subchannels in the bandwidth, a 60 MHz subchannel formed by any three 20 MHz subchannels, an 80 MHz subchannel formed by any four 20 MHz subchannels, and the like.

Manner 2: A Size and Location of Preamble Puncturing are Separately Indicated

It is assumed that there is only one hole in the bandwidth. The preamble puncturing indication information includes a first indicator and a second indicator. The first indicator indicates a size of preamble puncturing, and the second indicator indicates a location of preamble puncturing.

Optionally, the size of preamble puncturing indicated by the first indicator includes one or more of the following: 20 MHz, 40 MHz, 60 MHz, or 80 MHz. For example, the size of preamble puncturing indicated by the first indicator may be a hole size corresponding to each index in Table 3. In addition, as shown in Table 5, the first indicator may further indicate that there is no preamble puncturing in the bandwidth. Optionally, that there is no preamble puncturing may alternatively be indicated by the second indicator. This is not limited to these embodiments of this application.

TABLE 5

| | Hole sizes | |
|---|---|---|
| Entry index | Description | Quantity of entries (entry) |
| 0 | A size of preamble puncturing is 20 MHz | 1 |
| 1 | A size of preamble puncturing is 40 MHz | 1 |
| 2 | A size of preamble puncturing is 60 MHz | 1 |
| 3 | A size of preamble puncturing is 80 MHz | 1 |
| 4 | No preamble puncturing | 1 |

Based on the hole sizes shown in Table 5, hole locations are also different for bandwidths of different sizes. Details are described below.

In embodiments, the size of preamble puncturing indicated by the first indicator is 20 MHz, and the location of preamble puncturing includes one or more of the following: a 20 MHz subchannel in the bandwidth of the data packet. For example, for a 320 MHz bandwidth, as shown in FIG. 18, there are 16 cases of locations of a 20 MHz hole. As shown in Table 6, each index corresponds to a location of a 20 MHz hole, so that the second indicator may indicate the index, to notify the station of the location of the 20 MHz hole in the 320 MHz bandwidth.

TABLE 6

Hole locations

| Entry index | Description | Quantity of entries (entry) |
|---|---|---|
| 0-15 | Locations of holes in preamble puncturing | 16 |

For example, for a 240 MHz bandwidth, there are 12 cases of locations of a 20 MHz hole. Each index corresponds to a location, so that the second indicator may indicate the index, to notify the station of the location of the 20 MHz hole in the 240 MHz bandwidth. A location of a 20 MHz hole in a 160 MHz bandwidth or an 80 MHz bandwidth may alternatively be indicated by the second indicator.

In embodiments, the size of preamble puncturing indicated by the first indicator is 40 MHz, and the location of preamble puncturing includes one or more of the following: a 40 MHz subchannel formed by any two 20 MHz subchannels in the bandwidth of the data packet.

In embodiments, the size of preamble puncturing indicated by the first indicator is 40 MHz, and the location of preamble puncturing includes one or more of the following: a 40 MHz subchannel formed by any two adjacent 20 MHz subchannels in the bandwidth of the data packet. It can be learned that for a 320 MHz bandwidth, there are 15 cases of a location of a 40 MHz hole formed by any two adjacent 20 MHz subchannels. Each index corresponds to a location, so that the second indicator may indicate the index, to notify the station of the location of the 40 MHz hole in the 320 MHz bandwidth.

For a 240 MHz bandwidth, there are 11 cases of locations of a 40 MHz hole formed by any two adjacent 20 MHz subchannels. Each index corresponds to a location, so that the second indicator may indicate the index, to notify the station of the location of the 40 MHz hole in the 240 MHz bandwidth. A location of a 40 MHz hole in a 160 MHz bandwidth or an 80 MHz bandwidth may alternatively be indicated by the second indicator.

In embodiments, the size of preamble puncturing indicated by the first indicator is 60 MHz, and the location of preamble puncturing includes one or more of the following: a 60 MHz subchannel formed by any two 20 MHz subchannels in the bandwidth of the data packet.

In embodiments, the size of preamble puncturing indicated by the first indicator is 60 MHz, and the location of preamble puncturing includes one or more of the following: a 60 MHz subchannel formed by any three adjacent 20 MHz subchannels in the bandwidth of the data packet.

For example, for a 320 MHz bandwidth, there are 14 cases of locations of a 60 MHz hole. Each index corresponds to a location, so that the second indicator may indicate the index, to notify the station of the location of the 60 MHz hole in the 320 MHz bandwidth. A location of a 60 MHz hole in a 240 MHz bandwidth, a 160 MHz bandwidth, or an 80 MHz bandwidth may alternatively be indicated by the second indicator.

In embodiments, the size of preamble puncturing indicated by the first indicator is 80 MHz, and the location of preamble puncturing includes one or more of the following: an 80 MHz subchannel formed by any four 20 MHz subchannels in the bandwidth of the data packet.

In embodiments, the size of preamble puncturing indicated by the first indicator is 80 MHz, and the location of preamble puncturing includes one or more of the following: an 80 MHz subchannel formed by any four adjacent 20 MHz subchannels in the bandwidth of the data packet. For example, for a 320 MHz bandwidth, there are 13 cases of locations of an 80 MHz hole formed by any four adjacent 20 MHz subchannels. Each index corresponds to a location, and the second indicator may indicate the index, to notify the station of the location of the 80 MHz hole in the 320 MHz bandwidth.

For entries described in Table 5, a quantity of entry indexes that can be indicated by the first indicator, that is, a size and a quantity of holes that can be indicated, is related to a quantity of bits of the first indicator. For example, the first indicator may occupy a smaller quantity of bits, and indicate a part of entry indexes in Table 5. Correspondingly, for holes of different sizes, a quantity of entry indexes of locations of preamble puncturing that can be indicated by the second indicator is also related to a quantity of bits of the second indicator. The second indicator may indicate a part or all of the entry indexes in Table 6.

In embodiments, an index table of the preamble puncturing indication information includes various possible preamble puncturing information. In other words, a quantity of bits needed by the indicator in the preamble puncturing indication information needs to be capable of separately indicating various possible preamble puncturing information.

For example, Table 7 includes preamble puncturing information of any 20 MHz subchannel in the 320 MHz bandwidth, a 40 MHz subchannel formed by any two adjacent 20 MHz subchannels, a 60 MHz subchannel formed by any three adjacent 20 MHz subchannels, and an 80 MHz subchannel formed by any four adjacent 20 MHz subchannels.

TABLE 7

Index table of preamble puncturing indication information

| Index | Description | Quantity of entries (entry) |
|---|---|---|
| 0-15 | A size of preamble puncturing is 20 MHz | 15 or 16 (when there are 15 entries, it is assumed that a primary 20 MHz channel is not punctured, and any one of the other fifteen 20 MHz channels may be punctured). If flexible puncturing on a 20 MHz subchannel in a 160 MHz subchannel is supported, only 7 or 8 entries are needed. |
| 16-30 | A size of preamble puncturing is 40 MHz | 15 |
| 31-44 | A size of preamble puncturing is 60 MHz | 14 |
| 45-57 | A size of preamble puncturing is 80 MHz | 13 |
| 58 | No preamble puncturing | 1 |
| ... | ... | ... |

Optionally, a status of preamble puncturing information that may be included in Table 7 is related to a quantity of bits of the preamble puncturing indication information. If two holes in a bandwidth are supported, preamble puncturing information included in Table 7 may be correspondingly extended. Optionally, the preamble puncturing indication information may occupy a smaller quantity of bits, to indicate a part of the entries in Table 7.

Optionally, the second indicator may indicate a status of no preamble puncturing based on Table 7. Optionally, the status of no preamble puncturing may be indicated by the first indicator. In other words, an index may be added to Table 6 to correspond to the case of no preamble puncturing Manner 3: The Preamble Puncturing Indication Information Indicates Preamble Puncturing Information with Reference to the Bandwidth Indication Information Different from the foregoing implementations in which the preamble puncturing indication information indicates the preamble puncturing information in the bandwidth, this application further provides another preamble puncturing information indication method. In the indication method, the bandwidth indication information and the preamble puncturing indication information jointly indicate the preamble puncturing information in the bandwidth.

In embodiments, the bandwidth indication information indicates whether preamble puncturing exists in the data packet. If the preamble puncturing exists, the bandwidth indication information may indicate a status of preamble puncturing on a primary 80 MHz channel. The preamble puncturing indication information indicates another status of preamble puncturing in the data packet, to support a larger quantity of holes. For example, a bandwidth field indicates a specific hole, and the preamble puncturing indication information further indicates one or two holes. In a case of no preamble puncturing or a non-puncturing mode, the preamble puncturing information does not need to be indicated in the trigger frame or the data packet.

With reference to the embodiment described in FIG. 12, whether the trigger frame or the data packet includes the preamble puncturing indication information or whether the preamble puncturing information is indicated by using the RU allocation subfield is related to a transmission mode of the data packet, or is related to a transmission mode of the data packet and the bandwidth indication information, or is related to the bandwidth indication information.

The bandwidth indication information may be a bandwidth field in the trigger frame or the data packet.

For example, statuses of preamble puncturing in the data packet indicated by the bandwidth indication information is shown in Table 8. Each index not only corresponds to the bandwidth of the data packet, but also corresponds to the status of preamble puncturing of the primary 80 MHz channel. "80 MHz non-puncturing mode (no puncturing)" indicates that there is no preamble puncturing in a bandwidth. "80+80 MHz" indicates a non-contiguous 160 MHz bandwidth formed by two 80 MHz subchannels. "160+80 MHz" indicates a non-contiguous 240 MHz bandwidth formed by a 160 MHz subchannel and an 80 MHz subchannel. Bandwidths of the data packet corresponding to indexes 6, 8, 10, and 12 and statuses of preamble puncturing on the primary 80 MHz channel are overall statuses of preamble puncturing in the data packet. When the bandwidth indication information is 6, the data packet may not be sent or received with reference to the preamble puncturing indication information. When the bandwidth indication information is 0, 1, 2, 3, 4, or 5, it is clearly indicated that there is no preamble puncturing in the data packet. Therefore, the data packet does not need to be sent or received with reference to the preamble puncturing indication information. When the bandwidth indication information is 7, 8, 9, 10, 11, 12, or 13, preamble puncturing information of the data packet further needs to be determined with reference to the preamble puncturing indication information. When the bandwidth indication information is 8, 10, or 12, a status of preamble puncturing on the P80 may be determined based on Table 8, and a status of preamble puncturing on another channel may be determined with reference to the preamble puncturing indication information.

It can be learned that the preamble puncturing information indication method in this implementation can reduce overheads of the preamble puncturing indication information, or can indicate when to receive or send the data packet based on the preamble puncturing indication information and when not to receive or send the data packet based on the preamble puncturing indication information. This helps reduce signaling overheads.

TABLE 8

Index table of bandwidth indication information

| Entry Index | Meaning |
|---|---|
| 0 | 20 MHz |
| 1 | 40 MHz |
| 2 | 80 MHz non-puncturing mode (no puncturing) |
| 3 | 160 MHz or 80 + 80 MHz non-puncturing mode |
| 4 | 240 MHz or 160 + 80 MHz non-puncturing mode |
| 5 | 320 MHz or 160 + 160 MHz non-puncturing mode |

TABLE 8-continued

Index table of bandwidth indication information

| Entry Index | Meaning |
|---|---|
| 6 | 80 MHz puncturing mode, in which only a secondary 20 MHz (secondary 20 MHz, S20) is punctured. |
| 7 | 80 MHz puncturing mode, in which only a 20 MHz subchannel of a secondary 40 MHz (secondary 40 MHz, S40) is punctured. |
| 8 | 160 MHz puncturing mode, in which only a secondary 20 MHz (secondary 20 MHz, S20) in a P80 (an 80 MHz subchannel in which a P20 is located) is punctured. |
| 9 | 160 MHz puncturing mode, in which a P40 exists in a P80 (an 80 MHz subchannel in which a P20 is located), and at least one 20 MHz subchannel of a non-P40 MHz part is punctured. |
| 10 | 240 MHz puncturing mode, in which only a secondary 20 MHz (secondary 20 MHz, S20) in a P80 (an 80 MHz subchannel in which a P20 is located) is punctured. |
| 11 | 240 MHz puncturing mode, in which a P40 exists in a P80 (an 80 MHz subchannel in which a P20 is located), and at least one 20 MHz subchannel of a non-P40 MHz part is punctured. |
| 12 | 320 MHz puncturing mode, in which only a secondary 20 MHz (secondary 20 MHz, S20) in a P80 (an 80 MHz subchannel in which a P20 is located) is punctured. |
| 13 | 320 MHz puncturing mode, in which a P40 exists in a P80 (an 80 MHz subchannel in which a P20 is located), and at least one 20 MHz subchannel of a non-P40 MHz part is punctured. |
| 14 | Reserved |
| 15 | Reserved |

For entries described in Table 8, the bandwidth indication information may determine, based on a quantity of bits of the bandwidth indication information, a quantity of entry indexes that can be indicated. For example, the bandwidth indication information may occupy a smaller quantity of bits to indicate a part of entries in Table 8.

In embodiments of this application, the data packet is transmitted in an OFDMA mode, and the station determines the plurality of allocated RUs based on the RU allocation subfield. In an OFDMA transmission, discrete RUs obtained after preamble puncturing need to be allocated to a plurality of different stations. Therefore, a RU allocation subfield in a trigger frame or a signaling field needs to be used to indicate a possible RU aggregation. As shown in Table 9, RUs corresponding to index numbers 0 to 67 are single RU, and RUs corresponding to index numbers 68 to 130 are a combination or integration of a plurality of RUs. It can be learned that for OFDMA transmission, the RU allocation subfield may indicate these indexes, to notify each station of a RU allocated to the station.

In Table 9, corresponding to indexes 72 to 79, on a 20 MHz subchannel in an 80 MHz band range, in a combination solution of a 52-tone RU and a same-side adjacent 26-tone RU on the 20 MHz subchannel, "same-side adjacent" is related to a location of the 20 MHz subchannel in the 80 MHz band range. Frequencies of the 80 MHz band range ascend from left to right. If the 20 MHz subchannel is on the left side of the central location in the 80 MHz band range, the "same-side adjacent" is "left-side adjacent". If the 20 MHz subchannel is on the right side of the central location in the 80 MHz band range, the "same-side adjacent" is "right-side adjacent". For example, with reference to the schematic diagram of RU distribution shown in FIG. 8, it is assumed that the 20 MHz subchannel is the lowest frequency 20 MHz subchannel in the 80 MHz band range. Therefore, "same-side adjacent" means "left-side adjacent", and the 52-tone RU is the second 52-tone RU on the 20 MHz subchannel. In this case, the 26-tone RU that is on the 20 MHz subchannel and that is same-side adjacent to the 52-tone RU is the second 26-tone RU on the 20 MHz subchannel. Therefore, on the lowest frequency 20 MHz subchannel in the 80 MHz band range, the combination solution of a 52-tone RU and a same-side adjacent 26-tone RU on the 20 MHz subchannel is: combining the second 26-tone RU and the second 52-tone RU on the 20 MHz subchannel.

RU combination solutions indicated by other indexes may be determined with reference to FIG. 8, and details are not described herein again.

TABLE 9

Index table of resource unit allocation subfields

| Entry index | Description | Quantity of entries (entry) |
|---|---|---|
| 0-36 | Possible 26-tone RUs on an 80 MHz subchannel | 37 |
| 37-52 | Possible 52-tone RUs on an 80 MHz subchannel | 16 |
| 53-60 | Possible 106-tone RUs on an 80 MHz subchannel | 8 |
| 61-64 | Possible 242-tone RUs on an 80 MHz subchannel | 4 |
| 65-66 | Possible 484-tone RUs on an 80 MHz subchannel | 2 |
| 67 | 996-tone RU on an 80 MHz subchannel | 1 |
| 68-70 | Two 996-tone RUs | 3 |
| 71 | Four 996-tone RUs | 1 |
| 72-79 | Combination of a 106-tone RU on a 20 MHz subchannel in an 80 MHz subchannel and a center 26-tone RU on the 20 MHz subchannel | 8 |
| 80-87 | Combination of a 52-tone RU and a same-side adjacent 26-tone RU on a 20 MHz subchannel in an 80 MHz subchannel | 8 |
| 88-89 | Combination of a 484-tone RU and an adjacent 242-tone RU on an 80 MHz subchannel | 2 |
| 90-91 | Combination of a 484-tone RU and a non-adjacent 242-tone RU on an 80 MHz subchannel | 2 |
| 92 | Combination of two 242-tone RUs on two sides of an 80 MHz subchannel | 1 |
| 93-94 | Combination of a currently indicated 996-tone RU and a 484-tone RU on an adjacent 80 MHz subchannel | 2 |

TABLE 9-continued

Index table of resource unit allocation subfields

| Entry index | Description | Quantity of entries (entry) |
|---|---|---|
|  | 996 + 484 (a lowest frequency or leftmost 484-tone RU) | |
|  | 996 + 484 (a highest frequency or rightmost 484-tone RU) | |
| 95-98 | Combination of a currently indicated 996-tone RU and 484-tone RU + 242-tone RU on an adjacent 80 MHz subchannel | 4 |
| 99-101 | Combination of a current 996-tone RU and two of the other three 996-tone RUs | 3 |
| 102-117 | Combination of 484-tone RU + 242-tone RU on a currently indicated 80 MHz subchannel and a 484-tone RU + 242-tone RU on an adjacent 80 MHz subchannel | 16 |
| 118 | Combination of a currently indicated 996-tone RU and two far side 242-tone RUs on an adjacent 80 MHz subchannel | 1 |
| 119-122 | Combination of a 996-tone RU on a current 80 MHz subchannel and 996-tone RU + 484-tone RU on the other two 80 MHz subchannels when a bandwidth is 240 MHz | 4 |
| 123-128 | Combination of a 996-tone RU on a current 80 MHz subchannel and 2 × 996 + 484-tone RU on the other three 80 MHz subchannels when a bandwidth is 320 MHz | 6 |
| 129-130 | Combination of a 106-tone RU + center 26-tone RU on an 80 MHz subchannel | 2 |

When the RU allocation subfield occupies 7 bits, the RU allocation subfield may indicate a part of the entries or a case of RU combination in Table 9. In other words, for the entries described in Table 9, the RU allocation subfield may determine, based on a quantity of bits of the RU allocation subfield, a quantity of entry indexes that can be indicated. For example, the RU allocation subfield may occupy a smaller quantity of bits, to indicate a part of the entries in Table 9.

For a non-OFDMA transmission, various types of preamble puncturing information may alternatively be configured in an index table of the preamble puncturing indication information, for example, as shown in Table 10. In addition, for entries described in Table 10, the preamble puncturing indication information may determine, based on a quantity of bits of the bandwidth indication information, a quantity of entry indexes that can be indicated. For example, the preamble puncturing indication information may occupy a smaller quantity of bits to indicate a part of entries in Table 10.

TABLE 10

Index table of preamble puncturing indication information

| Entry index | Description | Quantity of entries (entry) |
|---|---|---|
| 0-15 | A size of preamble puncturing is 20 MHz | 15 or 16 (when there are 15 entries, it is assumed that a primary 20 MHz channel is not punctured, and any one of the other fifteen 20 MHz channels may be punctured). If flexible puncturing on a 20 MHz subchannel in a 160 MHz subchannel is supported, only 7 or 8 entries are needed. |
| 16-30 | A size of preamble puncturing is 40 MHz | 15 |
| 31-44 | A size of preamble puncturing is 60 MHz | 14 |
| 45-57 | A size of preamble puncturing is 80 MHz | 13 |
| 58 | No preamble puncturing | 1 |
| ... | ... | ... |

Optionally, the RU allocation solution for a OFDMA transmission in Table 9 and preamble puncturing information for a non-OFDMA transmission in Table 10 may be located in one index table, as shown in Table 11. Table 11 includes preamble puncturing information in Table 10 when there is one hole in preamble puncturing. Optionally, Table 11 may also include all preamble puncturing information in Table 10. The preamble puncturing indication in formation may reuse the RU allocation subfield, so that the station can determine a transmission mode of the data packet and a status of preamble puncturing based on an index indicated by the preamble puncturing indication information.

TABLE 11

| Entry index | Description | Quantity of entries (entry) |
|---|---|---|
| 0-36 | Possible 26-tone RUs on an 80 MHz subchannel | 37 |
| 37-52 | Possible 52-tone RUs on an 80 MHz subchannel | 16 |
| 53-60 | Possible 106-tone RUs on an 80 MHz subchannel | 8 |
| 61-64 | Possible 242-tone RUs on an 80 MHz subchannel | 4 |
| 65-66 | Possible 484-tone RUs on an 80 MHz subchannel | 2 |
| 67 | 996-tone RU on an 80 MHz subchannel | 1 |
| 68-70 | Two 996-tone RUs | 3 |
| 71 | Four 996-tone RUs | 1 |
| 72-79 | Combination of a 106-tone RU on a 20 MHz subchannel in an 80 MHz subchannel and a center 26-tone RU on the 20 MHz subchannel | 8 |
| 80-87 | Combination of a 52-tone RU and a same-side contiguous 26-tone RU on a 20 MHz subchannel in an 80 MHz subchannel | 8 |
| 88-89 | Combination of a 484-tone RU and a contiguous 242-tone RU on an 80 MHz subchannel | 2 (The two entries indicate a lowest frequency 484-tone RU of a highest frequency 484-tone RU) |
| 90-91 | Combination of a 484-tone RU and a non-contiguous 242-tone RU on an 80 MHz subchannel | 2 (The two entries indicate a lowest frequency 484-tone RU of a highest frequency 484-tone RU) |
| 92 | Combination of two 242-tone RUs on two sides of an 80 MHz subchannel | 1 |
| 93-94 | Combination of a currently indicated 996-tone RU and a 484-tone RU on an adjacent 80 MHz subchannel:<br>996-tone RU + 484-tone RU (the 484-tone RU is a leftmost or a lowest frequency 484-tone RU)<br>996-tone RU + 484-tone RU (the 484-tone RU is a rightmost or a highest frequency 484-tone RU) | 2 |
| 95-98 | Combination of a currently indicated 996-tone RU and 484-tone RU + 242-tone RU on an adjacent 80 MHz subchannel | 4 |
| 99-101 | Combination of a current 996-tone RU and two of the other three 996-tone RUs | 3 |
| 102 | BW = 320, 140 + 140<br>For example, a 60 MHz hole formed by the 20 MHz subchannel filled with grids and the 40 MHz subchannel shown in FIG. 19 | 1 (one hole, if one hole) |
| 103-104 | BW = 320, 140 + 120<br>For an example, a 60 MHz hole formed by the 20 MHz subchannel and the 40 MHz subchannel filled with grids shown in FIG. 19; for another example, a hole formed by a 40 MHz subchannel in the lowest frequency 160 MHz subchannel and a 20 MHz subchannel in the highest frequency 160 MHz subchannel | 2 (one hole, if one hole) |
| 105-106 | BW = 320, 160 + 100<br>With reference to the foregoing preamble puncturing information in each bandwidth, preamble puncturing information corresponding to the two indexes may be correspondingly obtained. Details are not described herein again. | 2 (one hole, if one hole) |
| 107 | BW = 320, 120 + 120<br>With reference to the foregoing preamble puncturing information in each bandwidth, preamble puncturing information corresponding to the two indexes may be correspondingly obtained. Details are not described herein again. | 1 (one hole, if one hole) |
| 108-109 | BW = 240, 140 + 60<br>For an example, a 40 MHz hole formed by the 20 MHz subchannels filled with grids shown in FIG. 24; for another example, a hole formed by a 20 MHz subchannel in a lowest frequency 80 MHz subchannel and a 40 MHz subchannel in a highest frequency 160 MHz subchannel | 2 (one hole, if one hole) |
| 110-111 | BW = 240, 120 + 60<br>For example, a 60 MHz hole formed by the 40 MHz subchannel and the 20 MHz subchannel filled with grids shown in FIG. 25 and FIG. 26 | 2 (one hole, if one hole) |
| 112-113 | BW = 240, 140 + 40<br>With reference to the foregoing preamble puncturing information in each bandwidth, preamble puncturing information corresponding to the two indexes may be correspondingly obtained. Details are not described herein again. | 2 (one hole, if one hole) |

TABLE 11-continued

| Entry index | Description | Quantity of entries (entry) |
|---|---|---|
| 114-115 | BW = 240, 120 + 40 With reference to the foregoing preamble puncturing information in each bandwidth, preamble puncturing information corresponding to the two indexes may be correspondingly obtained. Details are not described herein again. | 2 (one hole, if one hole) |
| 116-117 | Combination of a currently indicated 996-tone RU and two far side 242-tone RUs on an adjacent 80 MHz subchannel | 1 |
| 118-121 | Combination of 996 + 484-tone RU on a current 80 MHz subchannel and 996 + 484-tone RU on the other two 80 MHz subchannels when a bandwidth is 240 MHz | 4 |
| 122-127 | Combination of a 996-tone RU on a current 80 MHz subchannel and 2 × 996 + 484-tone RU on the other three 80 MHz subchannels when a bandwidth is 320 MHz | 6 |
| 128-131 | Combination of 106-tone RU + center 26-tone RU on an 80 MHz subchannel | 2 |

For the entries described in Table 11, the RU allocation subfield or the preamble puncturing indication information may determine, based on a quantity of bits of the RU allocation subfield or the preamble puncturing indication information, a quantity of entry indexes that can be indicated. For example, a smaller quantity of bits may be occupied, to indicate a part of the entries in Table 11.

For a case in which data transmission is performed based on the RU allocation subfield, in addition to directly indicating a RU allocation manner corresponding to each index as shown in Table 9, in this application, the RU allocation subfield includes a RU indicator and a RU aggregation indicator.

Optionally, when a first RU indicated by the RU indicator is a 2×996-tone RU, the RU aggregation indicator indicates one or more of the following RU aggregations: no RU is aggregated with the first RU; a second RU is aggregated with the first RU, where the second RU is a 484-tone RU adjacent to or not adjacent to the first RU; a third RU is aggregated with the first RU, where the third RU is a 996-tone RU adjacent to a low frequency of the first RU, or a 996-tone RU adjacent to a high frequency of the first RU; or a second RU and a third RU are aggregated with the first RU.

The "RU adjacent to a low frequency of the first RU" refers to a RU that is adjacent to the first RU and whose frequency is lower than that of the first RU. As shown in FIG. 8, a 52-tone RU adjacent to a low frequency of the second 106-tone RU is the second 52-tone RU shown in FIG. 8. The "RU adjacent to a high frequency of the first RU" refers to a RU that is adjacent to the first RU and whose frequency is higher than that of the first RU. As shown in FIG. 8, a 52-tone RU adjacent to a high frequency of the second 106-tone RU is the fifth 52-tone RU shown in FIG. 8.

Optionally, when a first RU indicated by the RU indicator is a 996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU.

The foregoing embodiments describe manners of indicating the preamble puncturing information. In the embodiment shown in FIG. 12, for non-OFDMA transmission, the data packet is sent or received based on the preamble puncturing indication information. Therefore, in an optional implementation, in a case of a non-OFDMA transmission, the user field in the trigger frame shown in FIG. 10 may not include a RU allocation subfield, and include preamble puncturing indication information (or preamble puncturing information, preamble puncture info). The common field in the extremely high throughput signal field shown in FIG. 11 may also not include a RU allocation subfield, and include preamble puncturing indication information (or preamble puncturing information, preamble puncture info).

In embodiments, in a case of a non-OFDMA transmission, the user field in the trigger frame shown in FIG. 10 may use a RU allocation subfield to indicate preamble puncturing indication information (or preamble puncturing information, preamble puncture info). Correspondingly, the common field in the extremely high throughput signal field shown in FIG. 11 may also use a RU allocation subfield to indicate preamble puncturing indication information (or preamble puncturing information, preamble puncture info).

The foregoing embodiments of this application describe the method provided in embodiments of this application from perspectives of the AP and the station. To implement functions in the method provided in embodiments of this application, the AP and the station may include a hardware structure and a software module, and implement the functions in a form of the hardware structure, the software module, or a combination of the hardware structure and the software module. A function in the foregoing functions may be performed in a form of the hardware structure, the software module, or a combination of the hardware structure and the software module.

Figure 27:
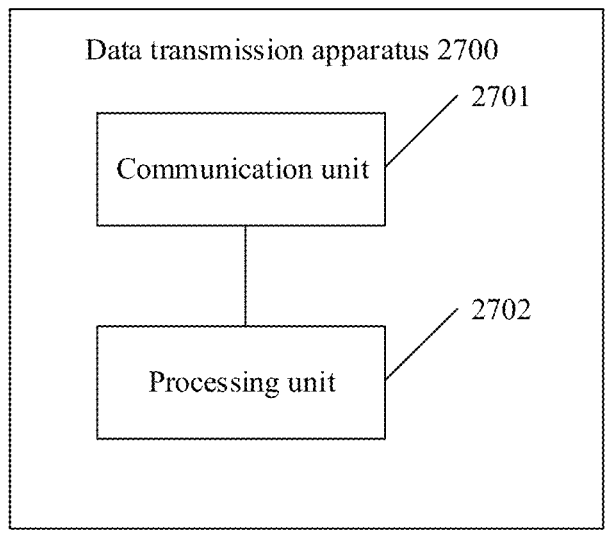
FIG. 27 is a schematic diagram depicting a structure of a data transmission apparatus according to an embodiment of this application.

Refer to FIG. 27. FIG. 27 is a schematic diagram depicting a structure of a data transmission apparatus according to an embodiment of this application. The data transmission apparatus 2700 shown in FIG. 27 may include a communication unit (e.g., a communication circuit) 2701 and a processing unit (e.g., processing circuit) 2702. The communication unit 2701 may include a sending unit (e.g., a sending circuit) and a receiving unit (e.g., a receiving circuit). The sending unit is configured to implement a sending function, the receiving unit is configured to implement a receiving function, and the communication unit 2701 may implement a sending function and/or a receiving function. The communication unit may also be described as a transceiver unit (e.g., a transceiver circuit).

The data transmission apparatus 2700 may be a station, an apparatus in a station, an AP, or an apparatus in an AP.

In embodiments, the data transmission apparatus 2700 includes a communication unit 2701 and a processing unit 2702.

The communication unit 2701 is configured to receive preamble puncturing indication information. The preamble puncturing indication information includes one or more indicators, one indicator corresponds to one piece of preamble puncturing information, and the preamble puncturing information includes a size and location of preamble puncturing, or there is no preamble puncturing.

The communication unit 2701 is further configured to send or receive a data packet based on the preamble puncturing indication information.

Optionally, the data transmission apparatus further includes the processing unit 2702. The processing unit 2702 is configured to determine a plurality of allocated RUs based on the preamble puncturing indication information.

It can be learned that the data transmission apparatus may indicate a status of preamble puncturing in the data packet based on the preamble puncturing indication information, to learn of the allocated multiple RUs. Compared with a current manner of directly indicating a multiple RU, the preamble puncturing indication information in this application can reduce signaling overhead.

In embodiments, the indicator indicates one or more pieces of the following preamble puncturing information in a 160 MHz channel: a 20 MHz subchannel in the 160 MHz channel; a 40 MHz subchannel formed by any two 20 MHz subchannels in the 160 MHz channel; a 60 MHz subchannel formed by any three 20 MHz subchannels in the 160 MHz channel; an 80 MHz subchannel formed by any four 20 MHz subchannels in the 160 MHz channel; or there is no preamble puncturing in the 160 MHz channel.

It can be learned that this implementation can indicate a case in which a 40 MHz subchannel, a 60 MHz subchannel, or an 80 MHz subchannel formed by contiguous or non-contiguous (e.g., adjacent or non-adjacent) 20 MHz subchannels is punctured. This helps improve flexibility of preamble puncturing.

In embodiments, the 160 MHz channel includes a highest frequency 80 MHz subchannel and a lowest frequency 80 MHz subchannel. The indicator further indicates the following piece of preamble puncturing information in the 160 MHz channel: a middle frequency 40 MHz subchannel in the highest frequency 80 MHz subchannel, or a middle frequency 40 MHz subchannel in the lowest frequency 80 MHz subchannel.

In embodiments, a bandwidth of the data packet is 320 MHz. The preamble puncturing indication information includes a first indicator and a second indicator.

The first indicator indicates preamble puncturing information in a lowest frequency 160 MHz channel in the 320 MHz bandwidth.

The second indicator indicates preamble puncturing information in a highest frequency 160 MHz subchannel in the 320 MHz bandwidth.

In embodiments, the indicator indicates one or more pieces of the following preamble puncturing information in an 80 MHz channel: a 20 MHz subchannel in the 80 MHz channel; a 40 MHz subchannel formed by any two 20 MHz subchannels in the 80 MHz channel; a 60 MHz subchannel formed by any three 20 MHz subchannels in the 80 MHz channel; or there is no preamble puncturing in the 80 MHz channel.

It can be learned that this implementation can indicate a case in which a 40 MHz subchannel or a 60 MHz subchannel formed by contiguous or non-contiguous (e.g., adjacent or non-adjacent) 20 MHz subchannels is punctured. This helps improve flexibility of preamble puncturing.

In embodiments, the bandwidth of the data packet is 240 MHz. The preamble puncturing indication information includes a first indicator and a second indicator. The first indicator indicates preamble puncturing information in a lowest frequency 160 MHz subchannel in the 240 MHz bandwidth; and the second indicator indicates preamble puncturing information in a highest frequency 80 MHz subchannel in the 240 MHz bandwidth.

In embodiments, the bandwidth of the data packet is 160 MHz. The preamble puncturing indication information includes a first indicator. The first indicator indicates preamble puncturing information in the 160 MHz bandwidth.

In embodiments, the bandwidth of the data packet is 160 MHz. The preamble puncturing indication information includes a first indicator and a second indicator. The first indicator indicates preamble puncturing information in a lowest frequency 80 MHz subchannel in the 160 MHz bandwidth; and the second indicator indicates preamble puncturing information in a highest frequency 80 MHz subchannel in the 160 MHz bandwidth.

In embodiments, the bandwidth of the data packet is 160 MHz. The preamble puncturing indication information includes a first indicator and a second indicator. The first indicator indicates preamble puncturing information of a first hole in the 160 MHz bandwidth; and the second indicator indicates preamble puncturing information of a second hole in the 160 MHz bandwidth.

In embodiments, the preamble puncturing indication information includes a first indicator and a second indicator. The first indicator indicates a size of preamble puncturing, and the second indicator indicates a location of preamble puncturing.

In embodiments, the size of preamble puncturing indicated by the first indicator is 20 MHz, and the location of preamble puncturing includes one or more of the following: a 20 MHz subchannel in the bandwidth of the data packet.

The size of preamble puncturing indicated by the first indicator is 40 MHz, and the location of preamble puncturing includes one or more of the following: a 40 MHz subchannel formed by any two 20 MHz subchannels in the bandwidth of the data packet.

The size of preamble puncturing indicated by the first indicator is 60 MHz, and the location of preamble puncturing includes one or more of the following: a 60 MHz subchannel formed by any three 20 MHz subchannels in the bandwidth of the data packet.

The size of preamble puncturing indicated by the first indicator is 80 MHz, and the location of preamble puncturing includes one or more of the following: an 80 MHz subchannel formed by any four 20 MHz subchannels in the bandwidth of the data packet.

In embodiments, the first indicator or the second indicator further indicates that there is no preamble puncturing.

In embodiments, the station performs a step of sending or receiving the data packet based on the preamble puncturing indication information when the data packet is transmitted in a non-OFDMA mode.

In embodiments, the station sends or receives the data packet based on a RU allocation subfield when the data packet is transmitted in an OFDMA mode. Correspondingly, the communication unit 2701 is further configured to receive transmission mode indication information. The transmission mode indication information indicates a transmission mode of the data packet.

It can be learned that the data transmission apparatus may receive or send the data packet based on the preamble puncturing indication information for non-OFDMA transmission; and receive or send the data packet based on the RU allocation subfield for OFDMA transmission. This can reduce overhead for indicating an allocated RU.

In embodiments, the RU allocation subfield includes a RU indicator and a RU aggregation indicator. When a first RU indicated by the RU indicator is a 2×996-tone RU, the RU aggregation indicator indicates one or more of the following RU aggregations: no RU is aggregated with the first RU; a second RU is aggregated with the first RU, where the second RU is a 484-tone RU adjacent to or not adjacent to the first RU; a third RU is aggregated with the first RU, where the third RU is a 996-tone RU adjacent to a low frequency of the first RU, or a 996-tone RU adjacent to a high frequency of the first RU; or a second RU and a third RU are aggregated with the first RU.

In embodiments, when the first RU indicated by the RU indicator is a 996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU.

It can be learned that the foregoing two embodiments can indicate aggregation of RUs crossing 160 MHz subchannels. This helps improve flexibility of allocating a resource to a user.

For related content of the foregoing embodiments, refer to related content of the foregoing method embodiments. Details are not described herein again.

Figure 28:
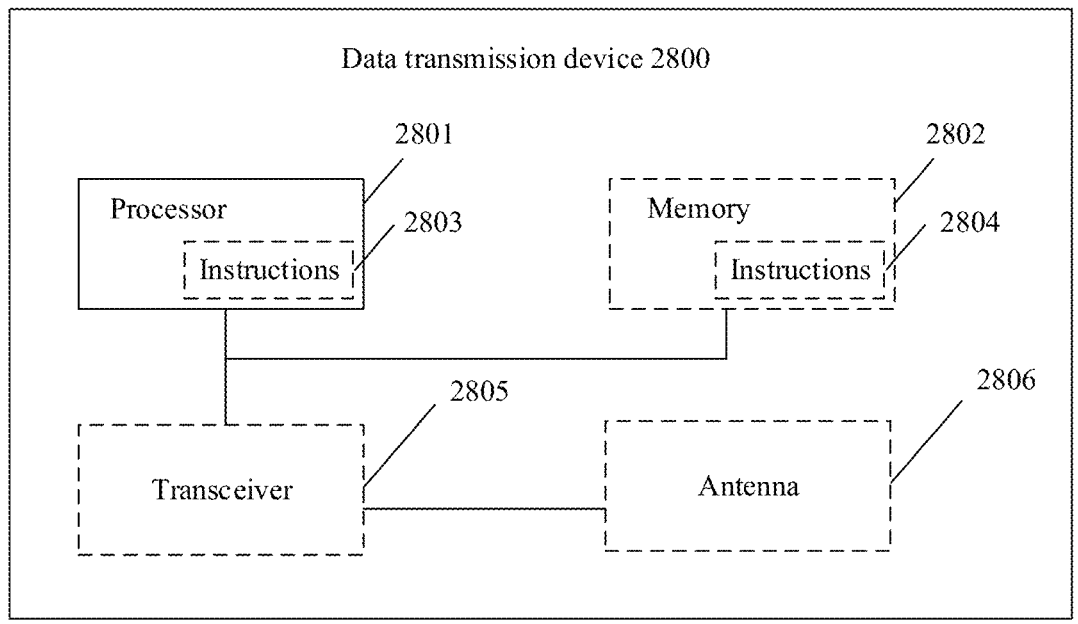
FIG. 28 is a schematic diagram depicting a structure of a data transmission device according to an embodiment of this application.

Refer to FIG. 28. FIG. 28 is a schematic diagram depicting a structure of another data transmission device according to an embodiment of this application. The data transmission device 2800 may be an AP, a station, or a chip, a chip system, a processor, or the like that supports an AP in implementing the foregoing method, or a chip, a chip system, a processor, or the like that supports a station in implementing the foregoing method. The data transmission device may be configured to implement the methods described in the foregoing method embodiments. For details, refer to the descriptions in the foregoing method embodiments.

The data transmission device 2800 may include one or more processors 2801. The processor 2801 may be a general-purpose processor, a dedicated processor, or the like. The processor 2801 may be configured to control a communication apparatus (for example, an AP, an AP chip, a station, or a station chip), execute a software program, and process data in the software program.

Optionally, the data transmission device 2800 may include one or more memories 2802. The memory 2802 may store instructions 2804. The instructions may be executed on the processor 2801, so that the data transmission device 2800 performs the methods described in the foregoing method embodiments. Optionally, the memory 2802 may further store data. The processor 2801 and the memory 2802 may be separately disposed, or may be integrated together.

Optionally, the data transmission device 2800 may further include a transceiver 2805 and an antenna 2806. The transceiver 2805 may be referred to as a transceiver unit, a transceiver machine, a transceiver circuit, or the like, and is configured to implement a transceiver function. The transceiver 2805 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

In the data transmission device 2800, the transceiver 2805 is configured to perform operations in steps 101 to 103 in FIG. 9, and perform operations of receiving or sending related information in steps 201 to 204 in FIG. 12. The processor 2801 is configured to perform related operations of parsing in steps 203 and 204 in FIG. 12.

It can be learned that the data transmission device may indicate a status of preamble puncturing in a data packet based on preamble puncturing indication information, to learn of allocated multiple RUs. Compared with a current manner of directly indicating a multiple RU, the preamble puncturing indication information in this application can reduce signaling overheads.

In embodiments, the indicator indicates one or more pieces of the following preamble puncturing information in a 160 MHz channel: a 20 MHz subchannel in the 160 MHz channel; a 40 MHz subchannel formed by any two 20 MHz subchannels in the 160 MHz channel; a 60 MHz subchannel formed by any three 20 MHz subchannels in the 160 MHz channel; an 80 MHz subchannel formed by any four 20 MHz subchannels in the 160 MHz channel; or there is no preamble puncturing in the 160 MHz channel.

It can be learned that this implementation can indicate a case in which a 40 MHz subchannel, a 60 MHz subchannel, or an 80 MHz subchannel formed by contiguous or non-contiguous (e.g., adjacent or non-adjacent) 20 MHz subchannels is punctured. This helps improve flexibility of preamble puncturing.

In embodiments, the 160 MHz channel includes a highest frequency 80 MHz subchannel and a lowest frequency 80 MHz subchannel. The indicator further indicates the following piece of preamble puncturing information in the 160 MHz channel: a middle frequency 40 MHz subchannel in the highest frequency 80 MHz subchannel, or a middle frequency 40 MHz subchannel in the lowest frequency 80 MHz subchannel.

In embodiments, a bandwidth of the data packet is 320 MHz. The preamble puncturing indication information includes a first indicator and a second indicator.

The first indicator indicates preamble puncturing information in a lowest frequency 160 MHz channel in the 320 MHz bandwidth.

The second indicator indicates preamble puncturing information in a highest frequency 160 MHz subchannel in the 320 MHz bandwidth.

In embodiments, the indicator indicates one or more pieces of the following preamble puncturing information in an 80 MHz channel: a 20 MHz subchannel in the 80 MHz channel; a 40 MHz subchannel formed by any two 20 MHz subchannels in the 80 MHz channel; a 60 MHz subchannel formed by any three 20 MHz subchannels in the 80 MHz channel;

there is no preamble puncturing in the 80 MHz channel.

It can be learned that this implementation can indicate a case in which a 40 MHz subchannel or a 60 MHz subchannel formed by contiguous or non-contiguous (e.g., adjacent or non-adjacent) 20 MHz subchannels is punctured. This helps improve flexibility of preamble puncturing.

In embodiments, the bandwidth of the data packet is 240 MHz. The preamble puncturing indication information includes a first indicator and a second indicator. The first indicator indicates preamble puncturing information in a lowest frequency 160 MHz subchannel in the 240 MHz bandwidth; and the second indicator indicates preamble puncturing information in a highest frequency 80 MHz subchannel in the 240 MHz bandwidth.

In embodiments, the bandwidth of the data packet is 160 MHz. The preamble puncturing indication information includes a first indicator. The first indicator indicates preamble puncturing information in the 160 MHz bandwidth.

In embodiments, the bandwidth of the data packet is 160 MHz. The preamble puncturing indication information includes a first indicator and a second indicator. The first indicator indicates preamble puncturing information in a lowest frequency 80 MHz subchannel in the 160 MHz bandwidth; and the second indicator indicates preamble puncturing information in a highest frequency 80 MHz subchannel in the 160 MHz bandwidth.

In embodiments, the bandwidth of the data packet is 160 MHz. The preamble puncturing indication information includes a first indicator and a second indicator. The first indicator indicates preamble puncturing information of a first hole in the 160 MHz bandwidth; and the second indicator indicates preamble puncturing information of a second hole in the 160 MHz bandwidth.

In embodiments, the preamble puncturing indication information includes a first indicator and a second indicator. The first indicator indicates a size of preamble puncturing, and the second indicator indicates a location of preamble puncturing.

In embodiments, the size of preamble puncturing indicated by the first indicator is 20 MHz, and the location of preamble puncturing includes one or more of the following: a 20 MHz subchannel in the bandwidth of the data packet.

The size of preamble puncturing indicated by the first indicator is 40 MHz, and the location of preamble puncturing includes one or more of the following: a 40 MHz subchannel formed by any two 20 MHz subchannels in the bandwidth of the data packet.

The size of preamble puncturing indicated by the first indicator is 60 MHz, and the location of preamble puncturing includes one or more of the following: a 60 MHz subchannel formed by any three 20 MHz subchannels in the bandwidth of the data packet.

The size of preamble puncturing indicated by the first indicator is 80 MHz, and the location of preamble puncturing includes one or more of the following: an 80 MHz subchannel formed by any four 20 MHz subchannels in the bandwidth of the data packet.

In embodiments, the first indicator or the second indicator further indicates that there is no preamble puncturing.

In embodiments, the station performs a step of sending or receiving the data packet based on the preamble puncturing indication information when the data packet is transmitted in a non-OFDMA mode.

In embodiments, the station sends or receives the data packet based on a RU allocation subfield when the data packet is transmitted in an OFDMA mode.

It can be learned that the data transmission apparatus may receive or send the data packet based on the preamble puncturing indication information for non-OFDMA transmission; and receive or send the data packet based on the RU allocation subfield for OFDMA transmission. This can reduce overheads for indicating an allocated RU.

In embodiments, the RU allocation subfield includes a RU indicator and a RU aggregation indicator. When a first RU indicated by the RU indicator is a 2×996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU; a third RU is aggregated with the first RU, where the third RU is a 996-tone RU adjacent to a low frequency of the first RU, or a 996-tone RU adjacent to a high frequency of the first RU; or a second RU and a third RU are aggregated with the first RU.

In embodiments, when the first RU indicated by the RU indicator is a 996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU.

It can be learned that the foregoing two implementations can indicate aggregation of RUs crossing 160 MHz subchannels. This helps improve flexibility of allocating a resource to a user.

For related content of the foregoing embodiments, refer to related content of the foregoing method embodiments. Details are not described herein again.

In embodiments, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In embodiments, optionally, the processor 2801 may store instructions 2803. When the instructions 2803 are executed on the processor 2801, the communication apparatus 2800 is enabled to perform the methods described in the foregoing method embodiments. The instructions 2803 may be built into the processor 2801. In this case, the processor 2801 may be implemented by hardware.

In embodiments, the communication apparatus 2800 may include a circuit. The circuit may implement the sending, receiving, or communication function in the foregoing method embodiments.

The processor and the transceiver that are described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like.

The communication apparatus described in the foregoing embodiments may be an AP or a station. However, a scope of the communication apparatus described in this application is not limited thereto, and a structure of the communication apparatus may not be limited by FIG. 28. The communication apparatus may be an independent device or may be a part of a larger device. For example, the communication apparatus may be: (1) an independent IC, a chip, or a chip system or subsystem; (2) a set including one or more ICs, where optionally, the IC set may further include a storage component configured to store data and instructions; (3) an ASIC, for example, a modem; (4) a module that can be embedded in another device; (5) a receiver, an intelligent terminal, a wireless device, a handheld device, a mobile unit, a vehicle-mounted device, a cloud device, an artificial intelligence device, and the like; or (6) others.

Figure 29:
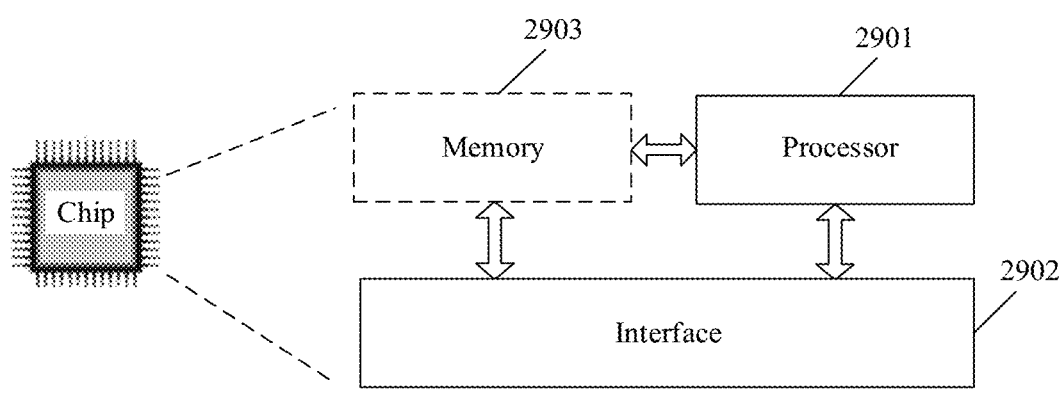
FIG. 29 is a schematic diagram depicting a structure of a chip according to an embodiment of this application.

For a case in which the communication apparatus may be a chip or a chip system, refer to a schematic diagram of a structure of a chip shown in FIG. 29. The chip 2900 shown in FIG. 29 includes a processor 2901 and an interface 2902. There may be one or more processors 2901, and there may be a plurality of interfaces 2902.

For a case in which the chip is configured to implement functions of a station in embodiments of this application, refer to the following descriptions.

In embodiments, the interface 2902 is configured to receive preamble puncturing indication information. The preamble puncturing indication information includes one or more indicators, one indicator corresponds to one piece of preamble puncturing information, and the preamble puncturing information includes a size and location of preamble puncturing, or there is no preamble puncturing.

The interface 2902 is further configured to send or receive a data packet based on the preamble puncturing indication information.

Optionally, the data transmission device further includes the processor 2901. The processor 2901 is configured to determine a plurality of allocated RUs based on the preamble puncturing indication information.

Optionally, the chip further includes a memory 2903 coupled to the processor 2901. The memory 2903 is configured to store program instructions and data that are necessary for a terminal device.

It can be learned that the chip may indicate a status of preamble puncturing in the data packet based on the preamble puncturing indication information, to learn of the allocated multiple RUs. Compared with a current manner of directly indicating a multiple RU, the preamble puncturing indication information in this application can reduce signaling overheads.

In embodiments, the indicator indicates one or more pieces of the following preamble puncturing information in a 160 MHz channel: a 20 MHz subchannel in the 160 MHz channel; a 40 MHz subchannel formed by any two 20 MHz subchannels in the 160 MHz channel; a 60 MHz subchannel formed by any three 20 MHz subchannels in the 160 MHz channel; an 80 MHz subchannel formed by any four 20 MHz subchannels in the 160 MHz channel; or there is no preamble puncturing in the 160 MHz channel.

It can be learned that this implementation can indicate a case in which a 40 MHz subchannel, a 60 MHz subchannel, or an 80 MHz subchannel formed by contiguous or non-contiguous (e.g., adjacent or non-adjacent) 20 MHz subchannels is punctured. This helps improve flexibility of preamble puncturing.

In embodiments, the 160 MHz channel includes a highest frequency 80 MHz subchannel and a lowest frequency 80 MHz subchannel. The indicator further indicates the following piece of preamble puncturing information in the 160 MHz channel: a middle frequency 40 MHz subchannel in the highest frequency 80 MHz subchannel, or a middle frequency 40 MHz subchannel in the lowest frequency 80 MHz subchannel.

In embodiments, a bandwidth of the data packet is 320 MHz. The preamble puncturing indication information includes a first indicator and a second indicator.

The first indicator indicates preamble puncturing information in a lowest frequency 160 MHz channel in the 320 MHz bandwidth.

The second indicator indicates preamble puncturing information in a highest frequency 160 MHz subchannel in the 320 MHz bandwidth.

In embodiments, the indicator indicates one or more pieces of the following preamble puncturing information in an 80 MHz channel: a 20 MHz subchannel in the 80 MHz channel; a 40 MHz subchannel formed by any two 20 MHz subchannels in the 80 MHz channel; a 60 MHz subchannel formed by any three 20 MHz subchannels in the 80 MHz channel; there is no preamble puncturing in the 80 MHz channel.

It can be learned that these embodiments can indicate a case in which a 40 MHz subchannel or a 60 MHz subchannel formed by contiguous or non-contiguous (e.g., adjacent or non-adjacent) 20 MHz subchannels is punctured. This helps improve flexibility of preamble puncturing.

In embodiments, the bandwidth of the data packet is 240 MHz. The preamble puncturing indication information includes a first indicator and a second indicator. The first indicator indicates preamble puncturing information in a lowest frequency 160 MHz subchannel in the 240 MHz bandwidth; and the second indicator indicates preamble puncturing information in a highest frequency 80 MHz subchannel in the 240 MHz bandwidth.

In embodiments, the bandwidth of the data packet is 160 MHz. The preamble puncturing indication information includes a first indicator. The first indicator indicates preamble puncturing information in the 160 MHz bandwidth.

In embodiments, the bandwidth of the data packet is 160 MHz. The preamble puncturing indication information includes a first indicator and a second indicator. The first indicator indicates preamble puncturing information in a lowest frequency 80 MHz subchannel in the 160 MHz bandwidth; and the second indicator indicates preamble puncturing information in a highest frequency 80 MHz subchannel in the 160 MHz bandwidth.

In embodiments, the bandwidth of the data packet is 160 MHz. The preamble puncturing indication information includes a first indicator and a second indicator. The first indicator indicates preamble puncturing information of a first hole in the 160 MHz bandwidth; and the second indicator indicates preamble puncturing information of a second hole in the 160 MHz bandwidth.

In embodiments, the preamble puncturing indication information includes a first indicator and a second indicator. The first indicator indicates a size of preamble puncturing, and the second indicator indicates a location of preamble puncturing.

In embodiments, the size of preamble puncturing indicated by the first indicator is 20 MHz, and the location of preamble puncturing includes one or more of the following: a 20 MHz subchannel in the bandwidth of the data packet.

The size of preamble puncturing indicated by the first indicator is 40 MHz, and the location of preamble puncturing includes one or more of the following: a 40 MHz subchannel formed by any two 20 MHz subchannels in the bandwidth of the data packet.

The size of preamble puncturing indicated by the first indicator is 60 MHz, and the location of preamble puncturing includes one or more of the following: a 60 MHz subchannel formed by any three 20 MHz subchannels in the bandwidth of the data packet.

The size of preamble puncturing indicated by the first indicator is 80 MHz, and the location of preamble puncturing includes one or more of the following: an 80 MHz subchannel formed by any four 20 MHz subchannels in the bandwidth of the data packet.

In embodiments, the first indicator or the second indicator further indicates that there is no preamble puncturing.

In embodiments, the station performs a step of sending or receiving the data packet based on the preamble puncturing indication information when the data packet is transmitted in a non-OFDMA mode.

In embodiments, the station sends or receives the data packet based on a RU allocation subfield when the data packet is transmitted in an OFDMA mode. The interface 2902 is further configured to receive transmission mode indication information. The transmission mode indication information indicates a transmission mode of the data packet.

It can be learned that the data transmission apparatus may receive or send the data packet based on the preamble puncturing indication information for a non-OFDMA transmission; and receive or send the data packet based on the RU allocation subfield for an OFDMA transmission. This can reduce overhead for indicating an allocated RU.

In embodiments, the RU allocation subfield includes a RU indicator and a RU aggregation indicator. When a first RU indicated by the RU indicator is a 2×996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU; a third RU is aggregated with the first RU, where the third RU is a 996-tone RU adjacent to a low frequency of the first RU, or a 996-tone RU adjacent to a high frequency of the first RU; or a second RU and a third RU are aggregated with the first RU.

In embodiments, when the first RU indicated by the RU indicator is a 996-tone RU, the RU aggregation indicator indicates one or more of the following RU aggregations: no RU is aggregated with the first RU; or a second RU is aggregated with the first RU, where the second RU is a 484-tone RU adjacent to or not adjacent to the first RU.

It can be learned that the foregoing two embodiments can indicate aggregation of RUs crossing 160 MHz subchannels. This helps improve flexibility of allocating a resource to a user.

For related content of the foregoing implementations, refer to related content of the foregoing method embodiments. Details are not described herein again.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the protection scope of embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, a function of any one of the foregoing method embodiments is implemented.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may understand that various numerals such as "first" and "second" in this application are merely used for differentiation for ease of description, and are not used to limit the scope of embodiments of this application or represent a sequence.

The correspondences shown in the tables in this application may be configured, or may be predefined. Values of the information in the tables are merely examples, and other values may be configured. This is not limited to these embodiments of this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "build into", or "pre-burn".

A person of ordinary skill in the art may be aware that, in combination with units (e.g., circuits) and algorithm steps in the examples described in embodiments disclosed in this specification, this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiment. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving preamble puncturing indication information, wherein the preamble puncturing indication information comprises one or more indicators, an indicator of the one or more indicators corresponds to a piece of preamble puncturing information, and the preamble puncturing information comprises a size and a location of preamble puncturing, or that there is no preamble puncturing; and
sending or receiving a data packet based on the preamble puncturing indication information.

2. The method according to claim 1, wherein the indicator indicates one or more pieces of the preamble puncturing information in a 160 MHz channel as follows:
a 20 MHz subchannel in the 160 MHz channel;
a 40 MHz subchannel formed by any two 20 MHz subchannels in the 160 MHz channel;
a 60 MHz subchannel formed by any three 20 MHz subchannels in the 160 MHz channel;
an 80 MHz subchannel formed by any four 20 MHz subchannels in the 160 MHz channel; or
there is no preamble puncturing in the 160 MHz channel.

3. The method according to claim 2, wherein the 160 MHz channel comprises a highest frequency 80 MHz subchannel and a lowest frequency 80 MHz subchannel, and the indicator indicates the piece of the preamble puncturing information in the 160 MHz channel as follows:
a first middle frequency 40 MHz subchannel in the highest frequency 80 MHz subchannel, or a second middle frequency 40 MHz subchannel in the lowest frequency 80 MHz subchannel.

4. The method according to claim 2, wherein a bandwidth of the data packet is 320 MHz, and the one or more indicators comprise a first indicator and a second indicator, wherein:
the first indicator indicates a first piece of preamble puncturing information in a lowest frequency 160 MHz channel in the 320 MHz bandwidth; and
the second indicator indicates a second piece of preamble puncturing information in a highest frequency 160 MHz subchannel in the 320 MHz bandwidth.

5. The method according to claim 1, wherein the indicator indicates one or more pieces of the preamble puncturing information in an 80 MHz channel as follows:
a 20 MHz subchannel in the 80 MHz channel;
a 40 MHz subchannel formed by any two 20 MHz subchannels in the 80 MHz channel;
a 60 MHz subchannel formed by any three 20 MHz subchannels in the 80 MHz channel; or
there is no preamble puncturing in the 80 MHz channel.

6. The method according to claim 3, wherein a bandwidth of the data packet is 240 MHz, and the preamble puncturing indication information comprises a first indicator and a second indicator, wherein:
the first indicator indicates a first piece of preamble puncturing information in a lowest frequency 160 MHz subchannel in the 240 MHz bandwidth; and
the second indicator indicates a second piece of preamble puncturing information in a highest frequency 80 MHz subchannel in the 240 MHz bandwidth.

7. The method according to claim 2, wherein
a bandwidth of the data packet is 160 MHz, and the one or more indicators comprise a first indicator, wherein the first indicator indicates a first piece of preamble puncturing information in the 160 MHz bandwidth.

8. The method according to claim 5, wherein a bandwidth of the data packet is 160 MHz, and the one or more indicators comprise a first indicator and a second indicator, wherein:
the first indicator indicates a first piece of preamble puncturing information in a lowest frequency 80 MHz subchannel in the 160 MHz bandwidth; and
the second indicator indicates a second piece of preamble puncturing information in a highest frequency 80 MHz subchannel in the 160 MHz bandwidth.

9. The method according to claim 3, wherein a bandwidth of the data packet is 160 MHz, and the one or more indicators comprise a first indicator and a second indicator, wherein:
the first indicator indicates a first piece of preamble puncturing information of a first hole in the 160 MHz bandwidth; and
the second indicator indicates a second piece of preamble puncturing information of a second hole in the 160 MHz bandwidth.

10. The method according to claim 1, wherein:
the one or more indicators comprise a first indicator and a second indicator;
the first indicator indicates the size of preamble puncturing; and
the second indicator indicates the location of preamble puncturing.

11. The method according to claim 10, wherein
the size of preamble puncturing indicated by the first indicator is 20 MHz, and the location of preamble puncturing comprises:
a 20 MHz subchannel in a bandwidth of the data packet;
the size of preamble puncturing indicated by the first indicator is 40 MHz, and the location of preamble puncturing comprises: a 40 MHz subchannel formed by any two 20 MHz subchannels in the bandwidth of the data packet;
the size of preamble puncturing indicated by the first indicator is 60 MHz, and the location of preamble puncturing comprises: a 60 MHz subchannel formed by any three 20 MHz subchannels in the bandwidth of the data packet; or
the size of preamble puncturing indicated by the first indicator is 80 MHz, and the location of preamble puncturing comprises: an 80 MHz subchannel formed by any four 20 MHz subchannels in the bandwidth of the data packet.

12. The method according to claim 11, wherein the first indicator or the second indicator further indicates that there is no preamble puncturing.

13. The method according to claim 1, wherein the sending or receiving the data packet based on the preamble puncturing indication information is performed when the data packet is transmitted in a non-orthogonal frequency division multiple access (non-OFDMA) mode.

14. The method according to claim 1, wherein the method further comprises:
sending or receiving the data packet based on a resource unit allocation subfield when the data packet is transmitted in an orthogonal frequency division multiple access (OFDMA) mode.

15. The method according to claim 13, wherein the method further comprises:
receiving transmission mode indication information, wherein the transmission mode indication information indicates a transmission mode of the data packet.

16. The method according to claim 14, wherein the resource unit allocation subfield comprises a resource unit indicator and a resource unit aggregation indicator, wherein:
when a first resource unit indicated by the resource unit indicator is a 2×996-tone resource unit, the resource unit aggregation indicator indicates one or more of the following resource unit aggregations:
no resource unit is aggregated with the first resource unit;
a second resource unit is aggregated with the first resource unit, wherein the second resource unit is a 484-tone resource unit adjacent to or not adjacent to the first resource unit;
a third resource unit is aggregated with the first resource unit, wherein the third resource unit is a 996-tone resource unit adjacent to a low frequency of the first resource unit, or a 996-tone resource unit adjacent to a high frequency of the first resource unit; or
the second resource unit and the third resource unit are aggregated with the first resource unit.

17. The method according to claim 14, wherein
when a first resource unit indicated by a resource unit indicator is a 996-tone resource unit, a resource unit aggregation indicator indicates one or more of the following resource unit aggregations:
no resource unit is aggregated with the first resource unit; or
a second resource unit is aggregated with the first resource unit, wherein the second resource unit is a 484-tone resource unit adjacent to or not adjacent to the first resource unit.

18. A data transmission device, comprising a processor, a memory, and a transceiver, wherein
the transceiver is configured to receive preamble puncturing indication information, and send or receive a data packet based on the preamble puncturing indication information, wherein the preamble puncturing indication information indicates preamble puncturing information of the data packet, and the preamble puncturing information comprises a size and a location of preamble puncturing, or that there is no preamble puncturing;
the memory is configured to store program code; and
the processor is configured to invoke the program code from the memory, to perform the following steps:
receiving the preamble puncturing indication information, wherein the preamble puncturing indication information comprises one or more indicators, an indicator of the one or more indicators corresponds to a piece of preamble puncturing information, and the preamble puncturing information comprises the size and location of preamble puncturing, or that there is no preamble puncturing;
sending or receiving the data packet based on the preamble puncturing indication information.

19. The method according to claim 18, wherein the indicator indicates one or more pieces of the following preamble puncturing information in a 160 MHz channel:
a 20 MHz subchannel in the 160 MHz channel;
a 40 MHz subchannel formed by any two 20 MHz subchannels in the 160 MHz channel;
a 60 MHz subchannel formed by any three 20 MHz subchannels in the 160 MHz channel;
an 80 MHz subchannel formed by any four 20 MHz subchannels in the 160 MHz channel; or
there is no preamble puncturing in the 160 MHz channel.

20. A chip system, comprising a processor and an interface, wherein
the interface is configured to receive preamble puncturing indication information, wherein the preamble puncturing indication information comprises one or more indicators, an indicator of the one or more indicators corresponds to preamble puncturing information of a data packet, and the preamble puncturing information comprises a size and location of preamble puncturing, or that there is no preamble puncturing;
the processor is configured to determine a plurality of allocated resource units based on the preamble puncturing indication information; and
the interface is further configured to send or receive a data packet on the plurality of resource units.

* * * * *

UNITED STATES PATENT AND TRADEMARK OFFICE
CERTIFICATE OF CORRECTION

PATENT NO. : 12,231,234 B2  
APPLICATION NO. : 17/941624  
DATED : February 18, 2025  
INVENTOR(S) : Jian Yu et al.

Page 1 of 1

It is certified that error appears in the above-identified patent and that said Letters Patent is hereby corrected as shown below:

On the Title Page (71), Applicant, Line 2, delete "GuangDong (CN)" and insert -- Shenzhen (CN) --, therefor.

In the Claims

In Column 54, Claim 19, Line 21, delete "The method according to claim 18," and insert -- The device according to claim 18, --, therefor.

Signed and Sealed this  
First Day of July, 2025

Coke Morgan Stewart  
*Acting Director of the United States Patent and Trademark Office*